US011711146B2

(12) United States Patent
Murakami

(10) Patent No.: US 11,711,146 B2
(45) Date of Patent: Jul. 25, 2023

(54) TERMINAL AND COMMUNICATION METHOD

(71) Applicant: Panasonic Intellectual Property Corporation of America, Torrance, CA (US)

(72) Inventor: Yutaka Murakami, Kanagawa (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 17/695,360

(22) Filed: Mar. 15, 2022

(65) Prior Publication Data

US 2022/0209866 A1 Jun. 30, 2022

Related U.S. Application Data

(63) Continuation of application No. 17/089,624, filed on Nov. 4, 2020, now Pat. No. 11,309,963, which is a
(Continued)

(30) Foreign Application Priority Data

Dec. 16, 2016 (JP) ................................ 2016-244359

(51) Int. Cl.
*H04B 10/116* (2013.01)
*H04B 10/2575* (2013.01)
(Continued)

(52) U.S. Cl.
CPC ........ *H04B 10/116* (2013.01); *B64D 11/0015* (2013.01); *H04B 10/25752* (2013.01);
(Continued)

(58) Field of Classification Search
CPC ............ H04B 10/116; H04B 10/25752; B64D 11/0015; H04W 12/06; H04W 48/08;
(Continued)

(56) References Cited

U.S. PATENT DOCUMENTS

2009/0096857 A1  4/2009  Frisco et al.
2010/0222082 A1* 9/2010  Ishii ...................... H04W 48/20
                                                                455/456.5
(Continued)

FOREIGN PATENT DOCUMENTS

EP        2498550 A1    9/2012
JP     2016-504794 A    2/2016
(Continued)

OTHER PUBLICATIONS

Extended European Search Report dated Dec. 3, 2019 for the related European Patent Application No. 17881384.6.
(Continued)

*Primary Examiner* — Casey L Kretzer
(74) *Attorney, Agent, or Firm* — Seed IP Law Group LLP

(57) ABSTRACT

A terminal (1050) includes a light receiver (151) that receives a light signal emitted by an apparatus (1000), the light signal including an identifier (SSID) of at least one base station (470); a receiver (153) that performs a reception process on the received light signal to output reception data; a data analyzer (155) that selects one base station based on the identifier of the at least one base station that is included in the reception data; and a radio device (453) that establishes a wireless connection with the selected base station (470) by using the identifier of the base station (470) and wirelessly communicates with the base station (470).

12 Claims, 40 Drawing Sheets

Related U.S. Application Data continuation of application No. 16/987,925, filed on Aug. 7, 2020, now Pat. No. 10,862,585, which is a continuation of application No. 16/831,344, filed on Mar. 26, 2020, now Pat. No. 10,778,331, which is a continuation of application No. 16/337,158, filed as application No. PCT/JP2017/042718 on Nov. 29, 2017, now Pat. No. 10,644,795.

(51) Int. Cl.
| | |
|---|---|
| H04W 48/08 | (2009.01) |
| H04W 48/16 | (2009.01) |
| H04W 84/12 | (2009.01) |
| H04W 48/20 | (2009.01) |
| H04W 12/06 | (2021.01) |
| B64D 11/00 | (2006.01) |
| H04W 64/00 | (2009.01) |

(52) U.S. Cl.
CPC ........... *H04W 12/06* (2013.01); *H04W 48/08* (2013.01); *H04W 48/16* (2013.01); *H04W 48/20* (2013.01); *H04W 84/12* (2013.01); *H04W 64/00* (2013.01)

(58) Field of Classification Search
CPC ..... H04W 48/16; H04W 48/20; H04W 84/12; H04W 64/00
See application file for complete search history.

(56) References Cited

U.S. PATENT DOCUMENTS

| | | |
|---|---|---|
| 2012/0208462 A1 | 8/2012 | Lee et al. |
| 2013/0157687 A1 | 6/2013 | Mori |
| 2014/0031077 A1 | 1/2014 | Weinrib et al. |
| 2014/0094143 A1 | 4/2014 | Ayotte |
| 2014/0126911 A1 | 5/2014 | Jovicic et al. |
| 2014/0226983 A1 | 8/2014 | Vargas |
| 2015/0074540 A1 | 3/2015 | Moritomo |
| 2015/0170427 A1 | 6/2015 | Hansen et al. |
| 2016/0047890 A1* | 2/2016 | Ryan ................ H04W 4/40 398/118 |
| 2016/0095146 A1 | 3/2016 | Ren et al. |
| 2018/0139202 A1 | 5/2018 | Sethi et al. |

FOREIGN PATENT DOCUMENTS

| | | |
|---|---|---|
| JP | 2016-072855 A | 5/2016 |
| WO | 2009/041878 A1 | 4/2009 |
| WO | 2009/149761 A1 | 12/2009 |
| WO | 2016/186539 A1 | 11/2016 |

OTHER PUBLICATIONS

International Search Report of PCT application No. PCT/JP2017/042718 dated Dec. 26, 2017.
IEEE 802.11-16/0137r4, "NGP Use Case Document", Mar. 12, 2016.

* cited by examiner

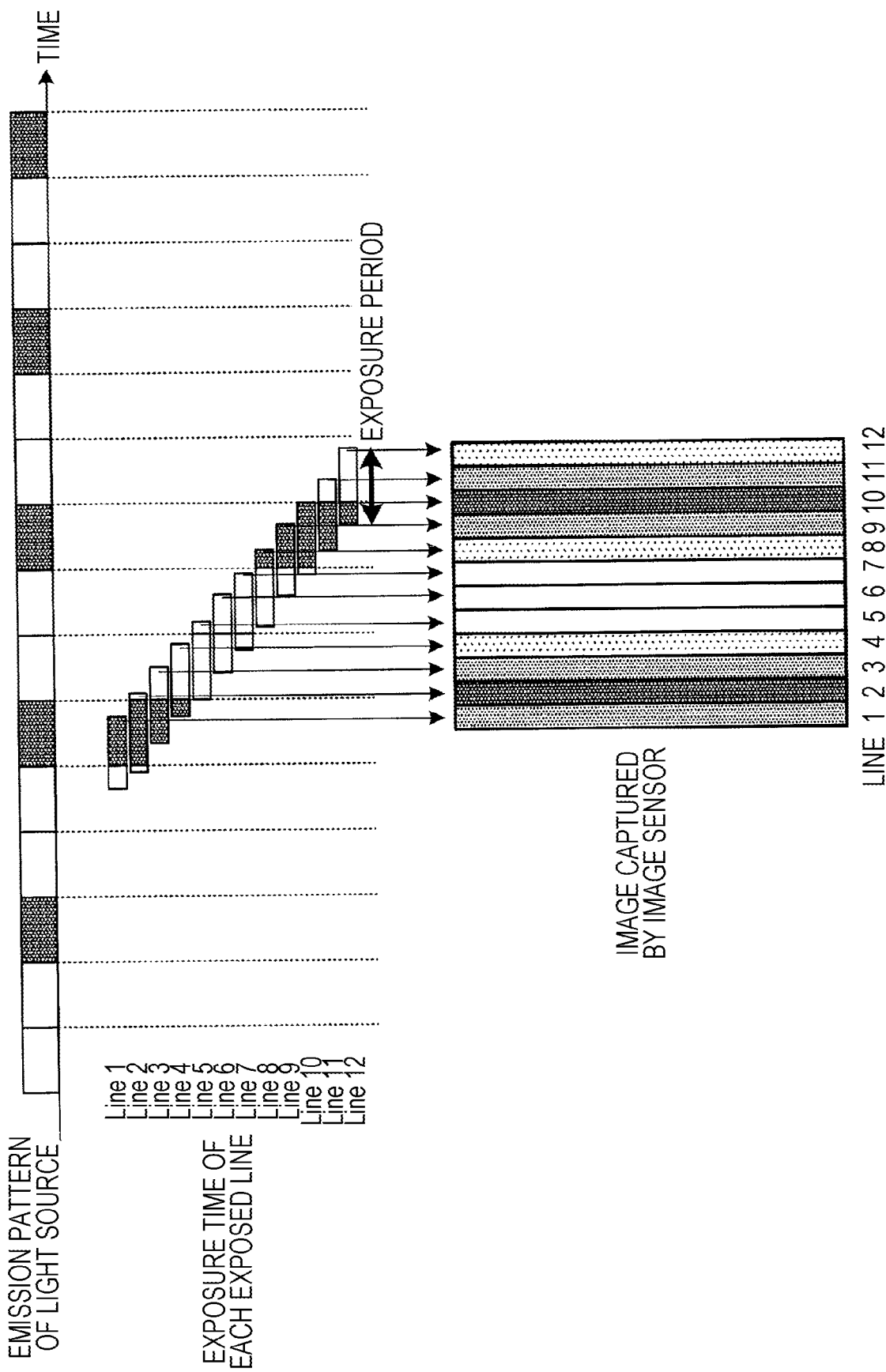

TERMINAL AND COMMUNICATION METHOD

TECHNICAL FIELD

The present disclosure relates to a terminal and a communication method.

BACKGROUND ART

A method using the Global Positioning System (GPS) is available as a method in which a terminal obtains information on the location or the like of the terminal. In the method using the GPS, the terminal receives a modulated signal transmitted by a satellite and performs positioning calculation, thereby estimating the location of the terminal. However, when it is difficult for the terminal to receive a radio wave transmitted by the satellite (for example, when the terminal is located indoors), it is difficult for the terminal to estimate its location.

As a method in which the terminal estimates its location in such a case, there is a method in which the terminal estimates information on its location or the like by using a radio wave transmitted by an access point (AP) of a wireless local area network (LAN), for example, as disclosed in NPL 1.

CITATION LIST

Non Patent Literature

NPL 1: "NGP use case document", IEEE 802.11-16/0137r4, March 2016

SUMMARY OF INVENTION

However, it is not easy for the terminal to obtain a service set identifier (SSID) of an access point that is safely accessible. Thus, there is a possibility that, when the terminal attempts to obtain information on its location or the like, the terminal may connect to an access point having an unsafe SSID, leading to a threat of information leakage or the like.

An embodiment of the present disclosure contributes to providing a terminal and a communication method that enable a terminal to safely obtain information.

A terminal according to an embodiment of the present disclosure includes: a light receiver that receives a light signal emitted by a transmitter, the light signal including an identifier of at least one base station; a data analyzing circuit that selects one base station based on the identifier of the at least one base station that is included in the received light signal; and a radio device that establishes a wireless connection with the selected base station by using the identifier of the base station and wirelessly communicates with the base station.

A communication method according to an embodiment of the present disclosure includes: receiving a light signal emitted by a transmitter, the light signal including an identifier of at least one base station; selecting one base station based on the identifier of the at least one base station that is included in the received light signal; and establishing a wireless connection with the selected base station by using the identifier of the base station and wirelessly communicating with the base station.

It should be noted that general or specific embodiments may be implemented as a system, a method, an integrated circuit, a computer program, a recording medium, or any selective combination thereof.

According to an embodiment of the present disclosure, the terminal is able to safely obtain information.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 3 is a diagram illustrating an example of a captured image when an exposure period is short.

DESCRIPTION OF EMBODIMENTS

Hereinafter, a detailed description will be given of embodiments of the present disclosure with reference to the drawings.

[Modulation/Demodulation Method in Visible Light Communication]

In the present embodiment, a visible light communication scheme is used in which a modulated signal is transmitted/received as a visible light signal.

First, an outline of the visible light communication scheme will be specifically described.

<Line-Scan Sampling>

A smartphone, a digital camera, or the like includes an image sensor, such as a complementary metal oxide semiconductor (CMOS) sensor, mounted therein. In an image captured by the CMOS sensor, the entire portion thereof does not strictly express a scene of the same time, but an amount of light received by the sensor is read out for each line. Thus, control is performed to start and finish receiving light with a time lag for each line, with the time required for reading being taken into consideration. That is, an image captured by the CMOS sensor is made up of many lines with slight time lags.

Figure 1:
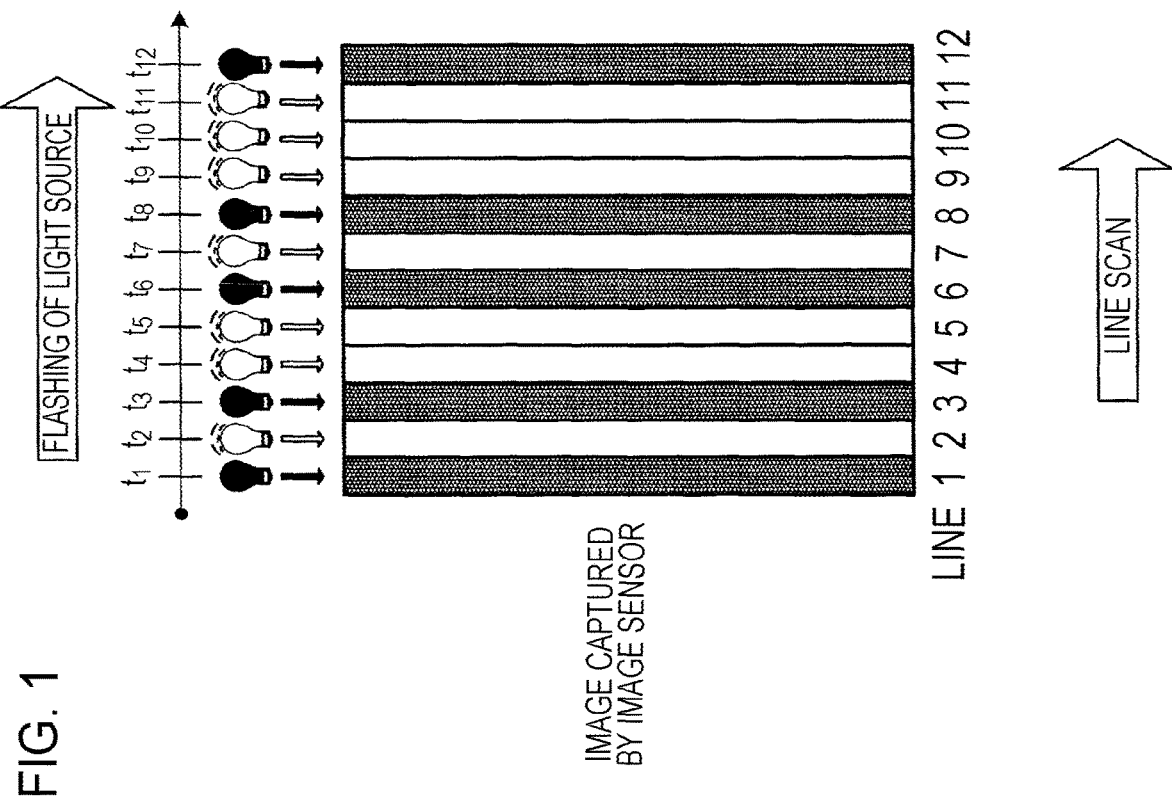
FIG. 1 is a diagram for describing the principle of line-scan sampling.

The visible light communication scheme used in the present embodiment utilizes the properties of the CMOS sensor and realizes higher speed in receiving a visible light signal. That is, in the visible light communication scheme, with use of a characteristic that an exposure period slightly varies among lines, the brightness and color of a light source at a plurality of time points can be measured for each line from a single image (an image captured by the image sensor), as illustrated in FIG. 1, and a signal modulated at a speed higher than a frame rate can be captured.

Hereinafter, this sampling method is referred to as "line-scan sampling", and a line of pixels exposed to light at the same timing is referred to as an "exposed line".

Figure 2:
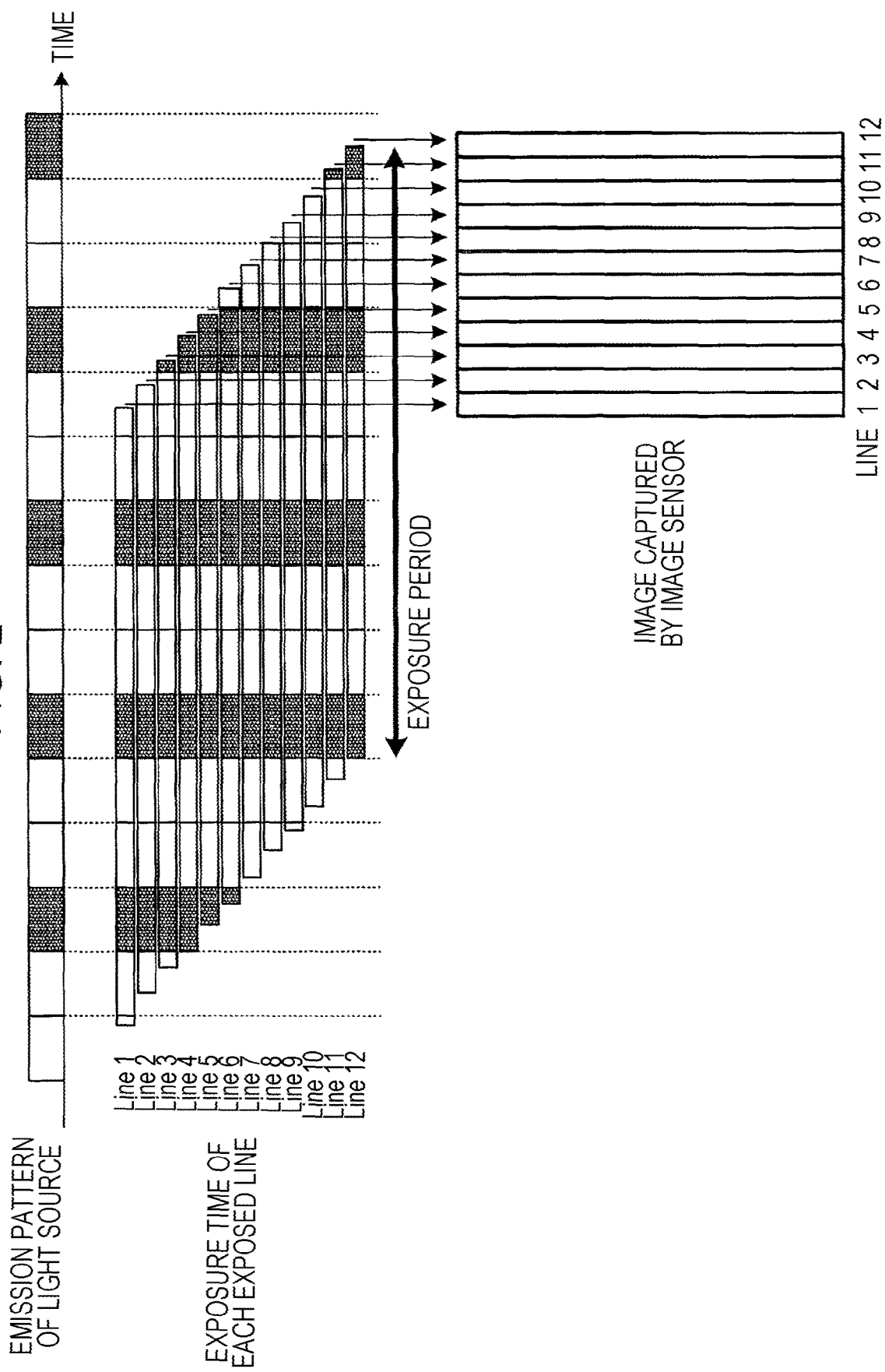
FIG. 2 is a diagram illustrating an example of a captured image when an exposure period is long.

Note that, in an image capturing setting at the time of capturing an image with a camera function (a video or still image shooting function), even if a light source flashing at high speed (pulse lighting) is photographed, the flash does not appear as a striped pattern along exposed lines. This is because, in this setting, an exposure period is much longer than a flash cycle (pulse width) of the light source, and thus, as illustrated in FIG. 2, changes in brightness resulting from the flash (emission pattern) of the light source are equalized and a difference in pixel values between exposed lines becomes very small, so that a substantially uniform image is created.

In contrast, as illustrated in FIG. 3, when an exposure period is set to a value substantially corresponding to the flash cycle of the light source, the flash state (emission pattern) of the light source can be observed as changes in brightness of exposure lines.

For example, an exposed line is designed so as to be parallel with the longitudinal direction of the image sensor. In this case, when it is assumed that the frame rate is 30 frames per second (fps), for example, 32400 or more samples per second are obtained at a resolution of 1920×1080, and 64800 or more samples per second are obtained at a resolution of 3840×2160.

<Light Source and Modulation Scheme>

In visible light communication, a light emitting diode (LED) can be used as a transmitter, for example. The LED has been becoming common as lighting or a back light source of a display and can be caused to flash at high speed.

However, it is not always possible to cause the light source used as a transmitter in visible light communication to freely flash for visible light communication. If flash in visible light communication is visually perceived by a human, an original function of the light source, such as a lighting function, is impaired. Thus, a transmission signal is required to be as bright as possible such that flash thereof is not perceived by the eyes of a human.

Figure 4A:
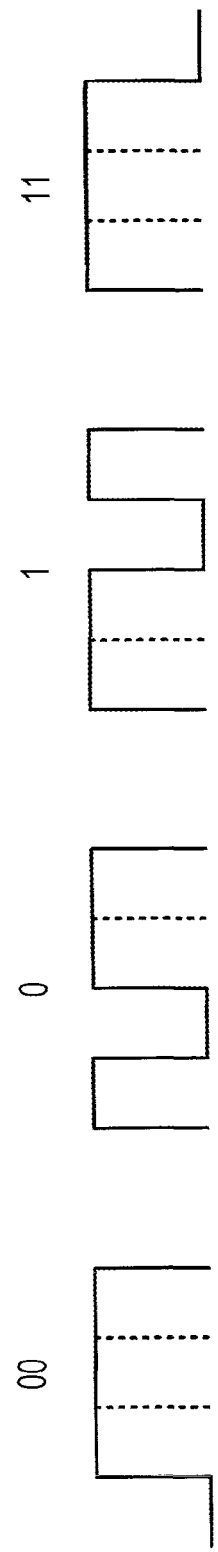
FIG. 4A is a diagram for describing 4 PPM.

As a modulation scheme responding to such a requirement, a modulation scheme called 4-pulse position modulation (4 PPM) is available, for example. 4 PPM is a scheme of expressing two bits by using a combination of four light or dark states of a light source, as illustrated in FIG. 4A. In 4 PPM, three states among four states are light and the remaining one state is dark, as illustrated in FIG. 4A. Thus, an average brightness is 3/4=75% regardless of the content of a signal.

Figure 4B:
FIG. 4B is a diagram for describing Manchester coding.

For comparison, Manchester coding illustrated in FIG. 4B is available as a similar scheme. Manchester coding is a scheme of expressing one bit by using two states. The modulation efficiency is 50%, which is the same as in 4

PPM. However, one of the two states is light and the other is dark, and thus an average brightness is 1/2=50%. That is, 4 PPM is more appropriate than Manchester coding as a modulation scheme in visible light communication.

<Example of Overall Configuration of Communication System>

Figure 5:
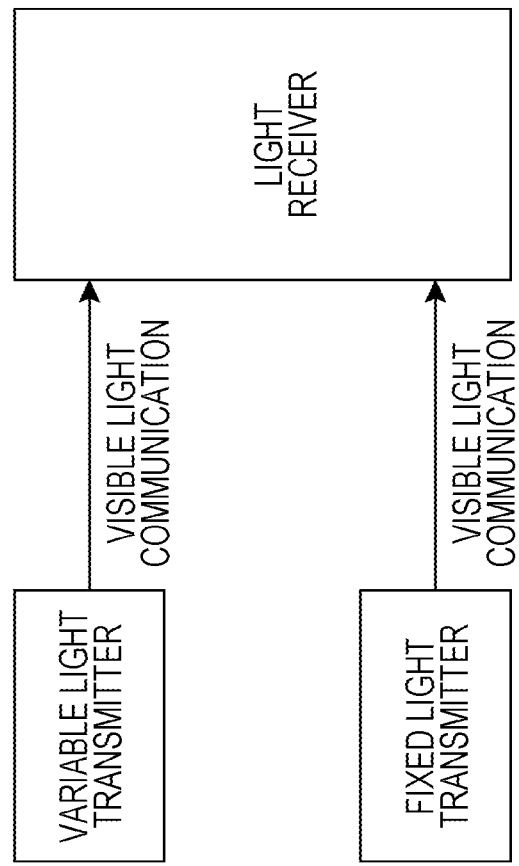
FIG. 5 is a diagram illustrating an example configuration of a visible light communication system.

As illustrated in FIG. 5, a communication system for performing visible light communication includes at least a transmitter that transmits (emits) a light signal and a receiver that receives the light signal. For example, there are two types of transmitters, a variable light transmitter that changes the light to be transmitted in accordance with video or content to be displayed, and a fixed light transmitter that continues transmitting fixed light.

The receiver receives the light signal from the transmitter, and is able to obtain related information associated with the light signal and to provide the related information to a user, for example.

An outline of the visible light communication scheme has been described above. A communication scheme applicable to optical communication described in the following embodiments is not limited to the above-described scheme. For example, a light emitting unit of a transmitter may transmit data by using a plurality of light sources. A receiver of a receiving device need not necessarily be an image sensor, such as a CMOS sensor, and may adopt, for example, a communication scheme in which a device capable of converting a light signal into an electric signal, such as a photodiode, can be used. In this case, it is not necessary to perform sampling by using the above-described line-scan sampling, and thus even a scheme requiring sampling of 32400 or more samples per second is applicable. Depending on application, a communication scheme using a radio wave of frequencies other than those of visible light, such as infrared light or ultraviolet light, may be used.

Embodiment 1

Figure 6:
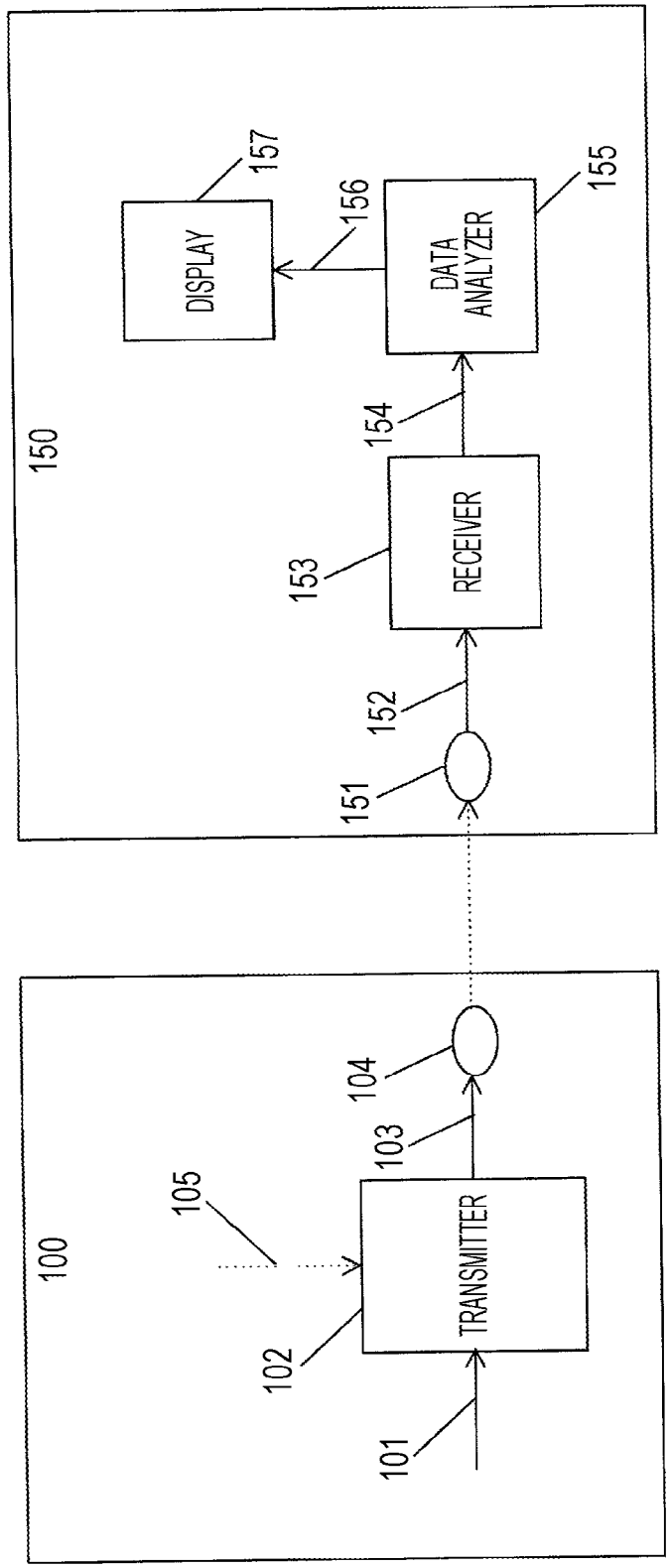
FIG. 6 is a diagram illustrating an example configuration of a communication system according to Embodiment 1.

FIG. 6 illustrates an example of the configurations of an apparatus 100 and a terminal 150 in the present embodiment.

[Configuration of Apparatus 100]

The apparatus 100 (corresponding to the transmitter in visible light communication) includes a visible light source, a lighting device, or a light (collectively referred to as a light source), such as a light emitting diode (LED). Hereinafter, the apparatus 100 may be referred to as a "first apparatus".

In the first apparatus 100 in FIG. 6, a transmitter 102 receives, for example, location-related or position-related information 101 as input. The transmitter 102 may receive time-related information 105 as input. The transmitter 102 may receive both the location-related or position-related information 101 and the time-related information 105 as input.

The transmitter 102 receives the location-related or position-related information 101 and/or the time-related information 105 as input, generates a (light) modulated signal 103 based on these input signals, and outputs the modulated signal 103. Subsequently, the modulated signal 103 is transmitted from, for example, a light source 104.

Now, a description will be given of examples of the location-related or position-related information 101.

Example 1

The location-related or position-related information 101 may be information on the latitude and/or the longitude of a location or position. For example, information "latitude 45° N, longitude 135° E" may be used as the location-related or position-related information 101.

Example 2

The location-related or position-related information 101 may be information on an address. For example, information "1-1-1, X town, Chiyoda-ku, Tokyo" may be used as the location-related or position-related information 101.

Example 3

The location-related or position-related information 101 may be information on a building or facility. For example, information "Tokyo tower", may be used as the location-related or position-related information 101.

Example 4

The location-related or position-related information 101 may be information about a location or position peculiar to something installed in a building or facility.

For example, it is assumed that there are spaces for parking five cars in a parking lot. In this case, a first parking space is called A-1, a second parking space is called A-2, a third parking space is called A-3, a fourth parking space is called A-4, and a fifth parking space is called A-5. In this case, for example, information "A-3" may be used as the location-related or position-related information 101.

Such an example is not limited to the case of a parking lot. For example, information about "areas, seats, shops, facilities, etc." in a concert hall, a stadium for baseball, soccer, tennis, or the like, an aircraft, a lounge in an airport, a train, a station, or the like may be used as the location-related or position-related information 101.

Examples of the location-related or position-related information 101 have been described above. The configuration of the location-related or position-related information 101 is not limited to the above-described examples.

[Configuration of Terminal 150]

The terminal 150 (corresponding to the receiver in visible light communication) in FIG. 6 receives the modulated signal 103 transmitted by the first apparatus 100.

A light receiver (light receiving device) 151 is, for example, an image sensor, such as a complementary metal oxide semiconductor (CMOS) sensor or an organic CMOS sensor. The light receiver 151 receives light including the modulated signal transmitted by the first apparatus 100 and outputs a reception signal 152.

The reception signal 152 output from the light receiver 151 may be a signal including information on an image or a video captured by the image sensor, or may be a signal output from another element that performs photoelectric conversion (that converts light into an electric signal). Hereinafter, when a description is given indicating that a device on the reception side receives a modulated signal without any specific explanation about a process performed by the light receiver 151, it means that the device on the reception side is the light receiver 151 and that photoelectric conversion (conversion from light into an electric signal) is performed on light including the modulated signal to obtain "a signal of an image or a video" and "a modulated signal for transmitting information". However, the above-described method is an example of a method in which the device on the reception side receives a modulated signal, and a method for receiving a modulated signal is not limited thereto.

A receiver 153 receives the reception signal 152 as input, performs processing, such as demodulation and error-correction decoding, on the modulated signal included in the reception signal 152, and outputs reception data 154.

A data analyzer 155 receives the reception data 154 as input, analyzes the reception data 154 to estimate the location/position of the terminal 150, for example, and outputs information 156 including at least location/position information on the terminal 150.

A display 157 receives the information 156 as input, and displays the location/position of the terminal 150 by using the location/position information on the terminal 150 included in the information 156.

[Frame Configuration]

Figure 7:
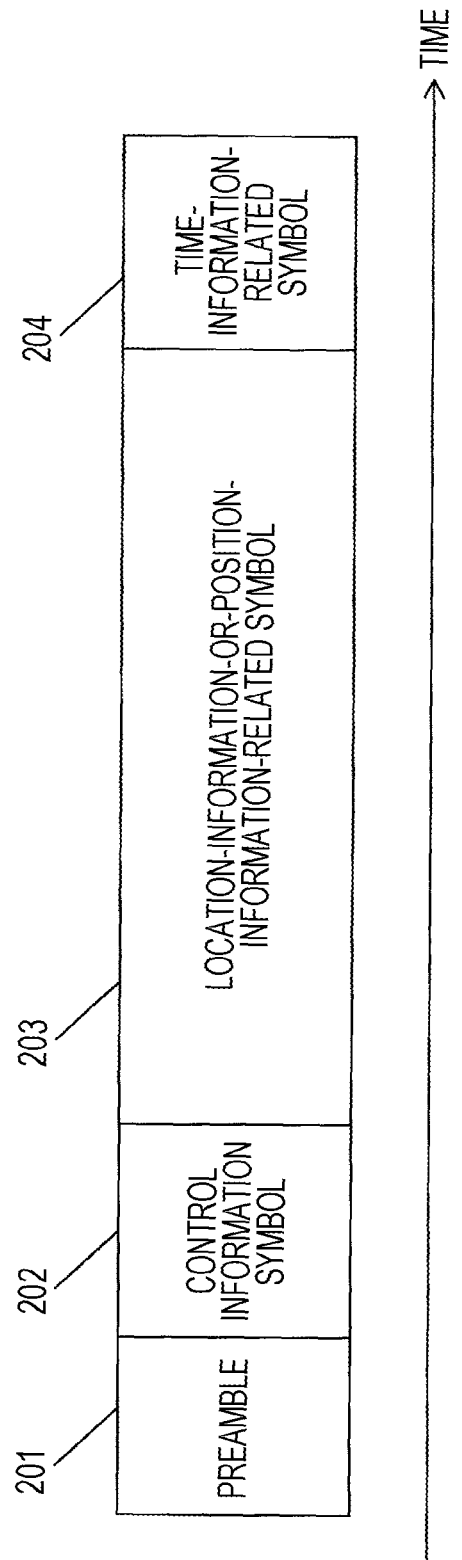
FIG. 7 is a diagram illustrating an example frame configuration according to Embodiment 1.

FIG. 7 illustrates an example of the frame configuration of the modulated signal transmitted by the first apparatus 100.

In FIG. 7, the horizontal axis indicates time. The first apparatus 100 transmits, for example, a preamble 201, and then transmits a control information symbol 202, a location-information-or-position-information-related symbol 203, and a time-information-related symbol 204.

The preamble 201 is a symbol by which the terminal 150 that receives the modulated signal transmitted by the first apparatus 100 performs, for example, signal detection, time synchronization, frame synchronization, and the like.

The control information symbol 202 is a symbol including, for example, data representing a method for configuring the modulated signal, a method of an error-correction coding scheme that is used, a method for configuring the frame, and the like.

The location-information-or-position-information-related symbol 203 is a symbol including the location-related or position-related information 101 illustrated in FIG. 6.

The frame may include a symbol other than the symbols 201, 202, and 203. For example, the frame may include the time-information-related symbol 204, as illustrated in FIG. 7. The time-information-related symbol 204 includes, for example, the time-related information 105 indicating the time when the first apparatus 100 transmits the modulated signal. The configuration of the frame of the modulated signal transmitted by the first apparatus 100 is not limited to that illustrated in FIG. 7, and the symbols included in the modulated signal are not limited to those illustrated in FIG. 7. The frame may include a symbol including other data/information.

[Advantages]

A description will be given of advantages that may be obtained when the first apparatus 100 transmits a modulated signal and the terminal 150 receives the modulated signal, as described above with reference to FIGS. 6 and 7.

The first apparatus 100 transmits a modulated signal by using visible light, and thus the terminal 150 capable of receiving the modulated signal is not so far from the location of the first apparatus 100. Thus, by obtaining location/position information transmitted by the first apparatus 100, the terminal 150 is able to easily obtain highly accurate position information (without performing complicated signal processing).

In addition, as a result of installing the first apparatus 100 at a location where a radio wave from a GPS satellite is difficult to receive, the terminal 150 is able to safely obtain highly accurate position information by receiving a modulated signal transmitted by the first apparatus 100 even in a situation where it is difficult to receive a radio wave from the GPS satellite.

Embodiment 2

In the present embodiment, a description will be given of a case where there are a plurality of first apparatuses 100, each being the one described in Embodiment 1.

Figure 8:
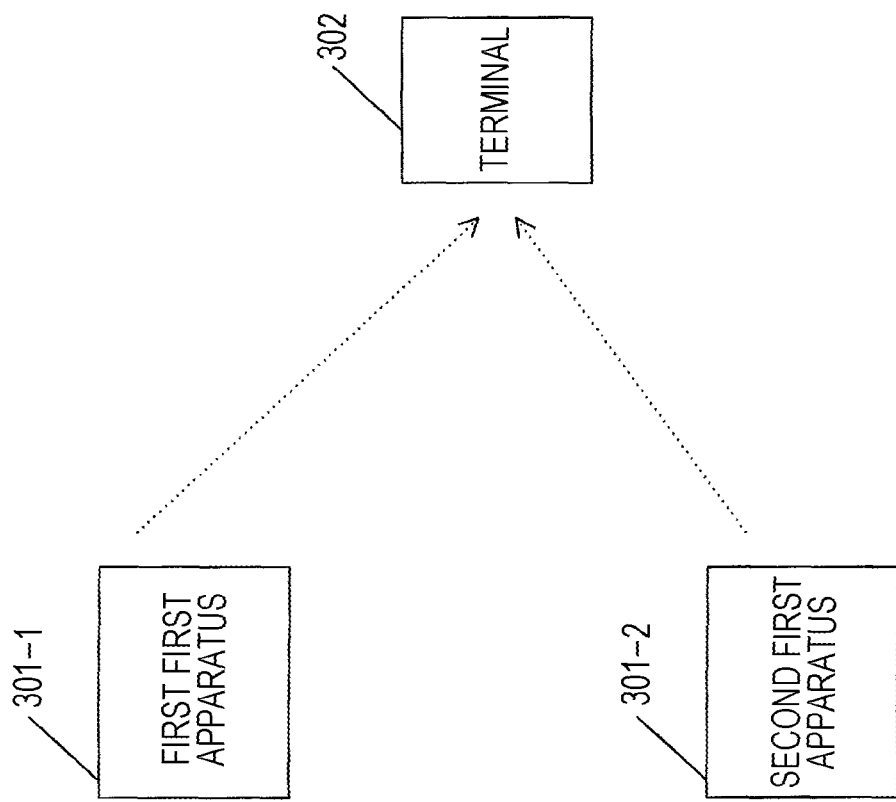
FIG. 8 is a diagram illustrating a positional relationship between apparatuses and a terminal according to Embodiment 2.

In the present embodiment, for example, a first first apparatus 301-1 having a configuration similar to that of the first apparatus 100 illustrated in FIG. 6 transmits a modulated signal, as illustrated in FIG. 8. A terminal 302 having a configuration similar to that of the terminal 150 illustrated in FIG. 6 receives the modulated signal transmitted by the first first apparatus 301-1 and obtains, for example, first first location/position-related information and first first time-related information.

Likewise, a second first apparatus 301-2 having a configuration similar to that of the first apparatus 100 illustrated in FIG. 6 transmits a modulated signal. The terminal 302 receives the modulated signal transmitted by the second first apparatus 301-2 and obtains, for example, second first location/position-related information and second first time-related information.

The terminal 302 is cable of calculating the distance between the first first apparatus 301-1 and the second first apparatus 301-2 in FIG. 8 by using the first first location/position-related information and the second first location/position-related information. In addition, the terminal 302 is cable of calculating the distance between the terminal 302 and the first first apparatus 301-1 based on the first first time-related information and, for example, the time when the terminal 302 receives the modulated signal transmitted by the first first apparatus 301-1. Likewise, the terminal 302 is cable of calculating the distance between the terminal 302 and the second first apparatus 301-2 based on the second first time-related information and, for example, the time when the terminal 302 receives the modulated signal transmitted by the second first apparatus 301-2.

The terminal 302 learns the position of the first first apparatus 301-1 from the first first location/position-related information. The terminal 302 learns the position of the second first apparatus 301-2 from the second first location/position-related information.

The terminal 302 learns "a triangle formed by the first first apparatus 301-1, the second first apparatus 301-2, and the terminal 302" from "the distance between the first first apparatus 301-1 and the second first apparatus 301-2", "the distance between the first first apparatus 301-1 and the terminal 302", and "the distance between the second first apparatus 301-2 and the terminal 302".

Thus, the terminal 302 is cable of accurately calculating and obtaining the position of the terminal 302 based on "the position of the first first apparatus 301-1", "the position of the second first apparatus 301-2", and "the triangle formed by the first first apparatus 301-1, the second first apparatus 301-2, and the terminal 302".

Note that a geodetic surveying method in which the terminal 302 obtains location/position information is not limited to that described above, and any other method may be used for geodetic surveying. Examples of the geodetic surveying method include triangulation, traversing, trilateration, and leveling.

As described above, in the present embodiment, the terminal 302 obtains the above-described information from the plurality of apparatuses 301 each including a light source for transmitting location information, thereby being able to estimate the position of the terminal 302 with high accuracy.

In the present embodiment, as described in Embodiment 1, as a result of installing the apparatus 301 including a light source that transmits location information at a location where a radio wave from a GPS satellite is difficult to receive, the terminal 302 is able to safely obtain highly accurate position information by receiving a modulated signal transmitted by the apparatus 301 even in a situation where it is difficult to receive a radio wave from the GPS satellite.

In the above-described example, the terminal 302 receives the modulated signals transmitted by the two apparatuses 301. The operation can be similarly performed when the terminal 302 receives modulated signals transmitted by three or more apparatuses 301. As the number of apparatuses 301 increases, the accuracy with which the terminal 302 calculates position information increases advantageously.

Embodiment 3

Figure 9:
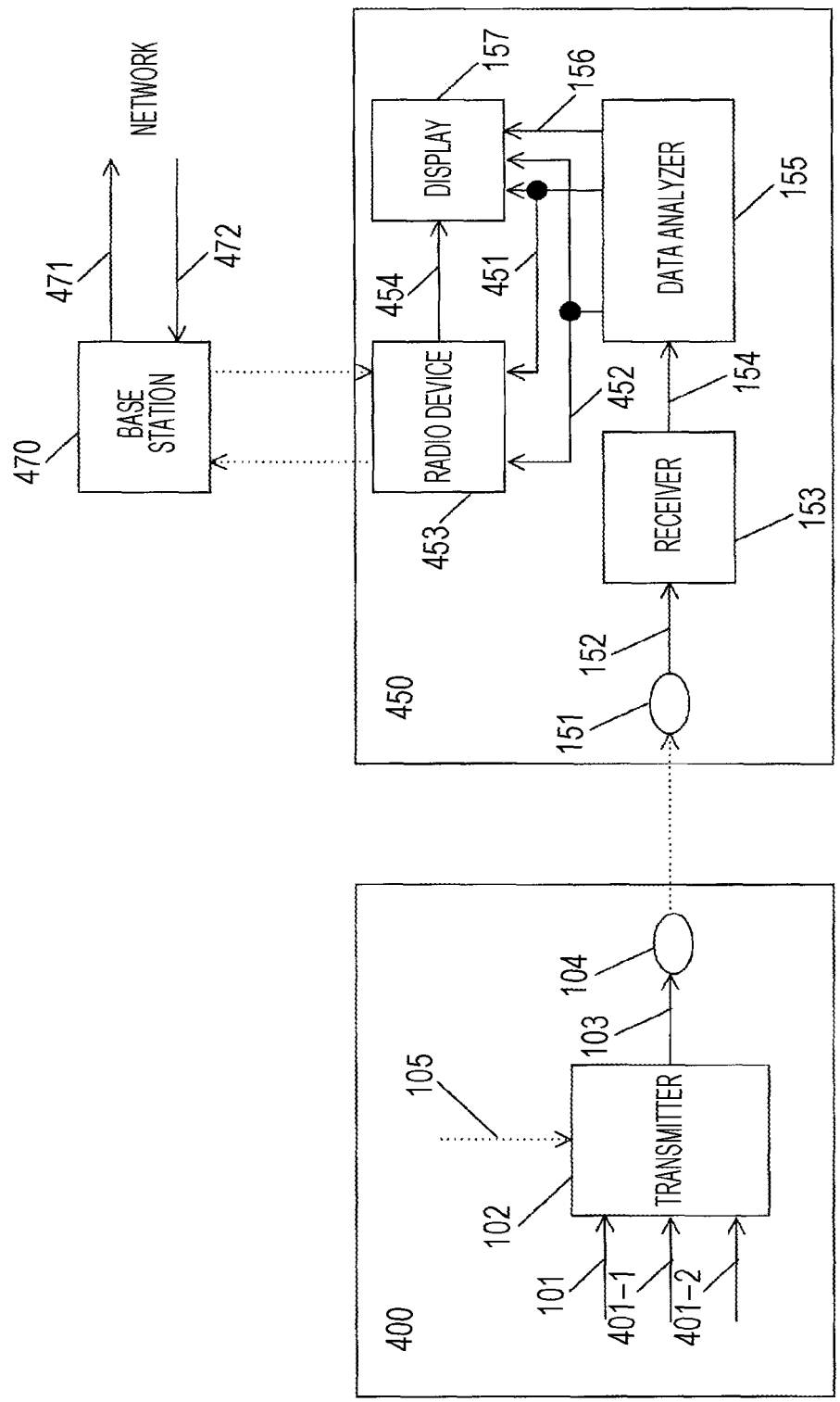
FIG. 9 is a diagram illustrating an example configuration of a communication system according to Embodiment 3.

FIG. 9 illustrates an example of the configurations of an apparatus 400, a terminal 450, and a base station 470 (or an access point (AP)) that communicates with the terminal 450 in the present embodiment.

The apparatus 400 includes, for example, a visible light source, a lighting device, a light source, or a light, such as an LED. Hereinafter, the apparatus 400 may be referred to as a "first apparatus".

In the first apparatus 400 illustrated in FIG. 9, the components that operate similarly to those of the first apparatus 100 illustrated in FIG. 6 are denoted by the same numerals. In the terminal 450 illustrated in FIG. 9, the components that operate similarly to those of the terminal 150 illustrated in FIG. 6 are denoted by the same numerals.

In the first apparatus 400 in FIG. 9, the transmitter 102 receives, for example, the location-related or position-related information 101, service set identifier (SSID)-related information 401-1, which is an identifier of the base station 470, and access-destination-related information 401-2 as input. In addition, the transmitter 102 may receive the time-related information 105 as input.

The transmitter 102 receives the location-related or position-related information 101, the SSID-related information 401-1, and the access-destination-related information 401-2, and/or the time-related information 105 as input, generates the (light) modulated signal 103 based on these input signals, and outputs the modulated signal 103. The modulated signal 103 is transmitted, for example, from the light source 104.

Examples of the location-related or position-related information 101 have been described in Embodiment 1, and thus the description thereof is omitted here.

Next, a description will be given of the SSID-related information 401-1 and the access-destination-related information 401-2.

First, a description will be given of the SSID-related information 401-1.

The SSID-related information 401-1 is information indicating the SSID of the base station 470 in FIG. 9. Here, when it is determined that the SSID notified of using a light signal is the SSID of a safe base station, the first apparatus 400 is able to provide the terminal 450 with access to the base station 470, which is a safe access destination. Accordingly, the terminal 450 in FIG. 9 is able to safely obtain information from the base station 470.

On the other hand, the first apparatus 400 is able to limit the terminal that accesses the base station 470 to a terminal positioned in a space where a light signal transmitted (emitted) by the first apparatus 400 can be received.

When the terminal 450 receives a light signal transmitted in a predetermined scheme, the terminal 450 may determine that the notified SSID is the SSID of a safe base station. The terminal 450 may separately perform a process of determining whether or not the notified SSID is safe. For example, the first apparatus 400 may transmit a light signal including a predetermined identifier, and the terminal 450 may determine, based on the received identifier, whether or not the notified SSID is the SSID of a safe base station. The terminal 450 does not necessarily perform the process of determining whether or not the base station is safe. With use of the characteristics of visible light, a user may select a safe first apparatus 400, and the terminal 450 may receive a light signal from the first apparatus 400 to obtain the SSID of a safe base station.

FIG. 9 illustrates a single base station 470. Also when one or more base stations (or APs) other than the base station 470 exist, the terminal 450 accesses the base station 470 by using an SSID obtained from the first apparatus 400 and obtains information.

Next, a description will be given of the access-destination-related information 401-2.

The access-destination-related information 401-2 is information about an access destination from which the terminal 450 obtains information after accessing the base station 470. A specific operation example of the present embodiment will be described below.

The SSID-related information 401-1 and the access-destination-related information 401-2 have been described above.

The terminal 450 receives the modulated signal 103 transmitted by the first apparatus 400.

The light receiver 151 is, for example, an image sensor, such as a CMOS sensor or an organic CMOS sensor. The light receiver 151 receives light including a modulated signal transmitted by the first apparatus 400 and outputs the reception signal 152.

The receiver 153 receives the reception signal 152 received by the light receiver 151 as input, performs processing, such as demodulation and error-correction decoding, on the modulated signal included in the reception signal 152, and outputs the reception data 154.

The data analyzer 155 receives the reception data 154 as input, and estimates, for example, the location/position of the terminal 450 from the reception data 154. Subsequently, the data analyzer 155 outputs the information 156 including at least the location/position information on the terminal 450, SSID-related information 451, and access-destination-related information 452.

The display 157 receives the information 156 including the location/position information on the terminal 450, the SSID-related information 451, and the access-destination-related information 452 as input, and displays, for example, the location/position of the terminal 450, the SSID of a communication partner that a radio device 453 included in the terminal 450 is to access, and/or an access destination (hereinafter, this display operation is referred to as a "first display operation").

For example, after the first display operation, the radio device 453 receives the SSID-related information 451 and the access-destination-related information 452 as input. Subsequently, the radio device 453 establishes a connection with the communication partner by using, for example, a radio wave based on the SSID-related information 451. In the case of FIG. 9, the radio device 453 establishes a connection with the base station 470.

Subsequently, the radio device 453 generates a modulated signal from data including information about the access destination based on the access-destination-related information 452, and transmits the modulated signal to the base station 470 by using, for example, a radio wave.

In FIG. 9, the base station 470, which is the communication partner of the terminal 450, receives the modulated signal transmitted by the radio device 453 included in the terminal 450.

Subsequently, the base station 470 performs processing, such as demodulation and error-correction decoding, on the received modulated signal, and outputs reception data 471 including the information on the access destination transmitted by the terminal 450. The base station 470 accesses a desired access destination via a network based on the information on the access destination, and, for example, obtains desired information 472 from the access destination. The base station 470 receives the desired information 472 as input, generates a modulated signal from the desired information 472, and transmits the modulated signal to the terminal 450 (the radio device 453) by using, for example, a radio wave.

The radio device 453 of the terminal 450 receives the modulated signal transmitted by the base station 470, performs processing, such as demodulation and error-correction decoding, and obtains the desired information 472.

For example, it is assumed that the desired information 472 is a map, a map/floor guide of a building, a map/floor guide of a facility, a map/floor guide of a parking lot, or information on "areas, seats, shops, and facilities" in a concert hall, a stadium, an aircraft, a lounge in an airport, a train, a station, or the like.

The display 157 receives information 454 including the desired information 472, the information 156 including at least the location/position information on the terminal 450, and the SSID-related information 451 as input. After the first display operation, the display 157 performs display while mapping the position of the terminal 450 on a map, floor guide, information on a facility, information on seats, or information on shops, based on the desired information 472 and the information 156 including at least the location/position information on the terminal 450.

Figure 10:
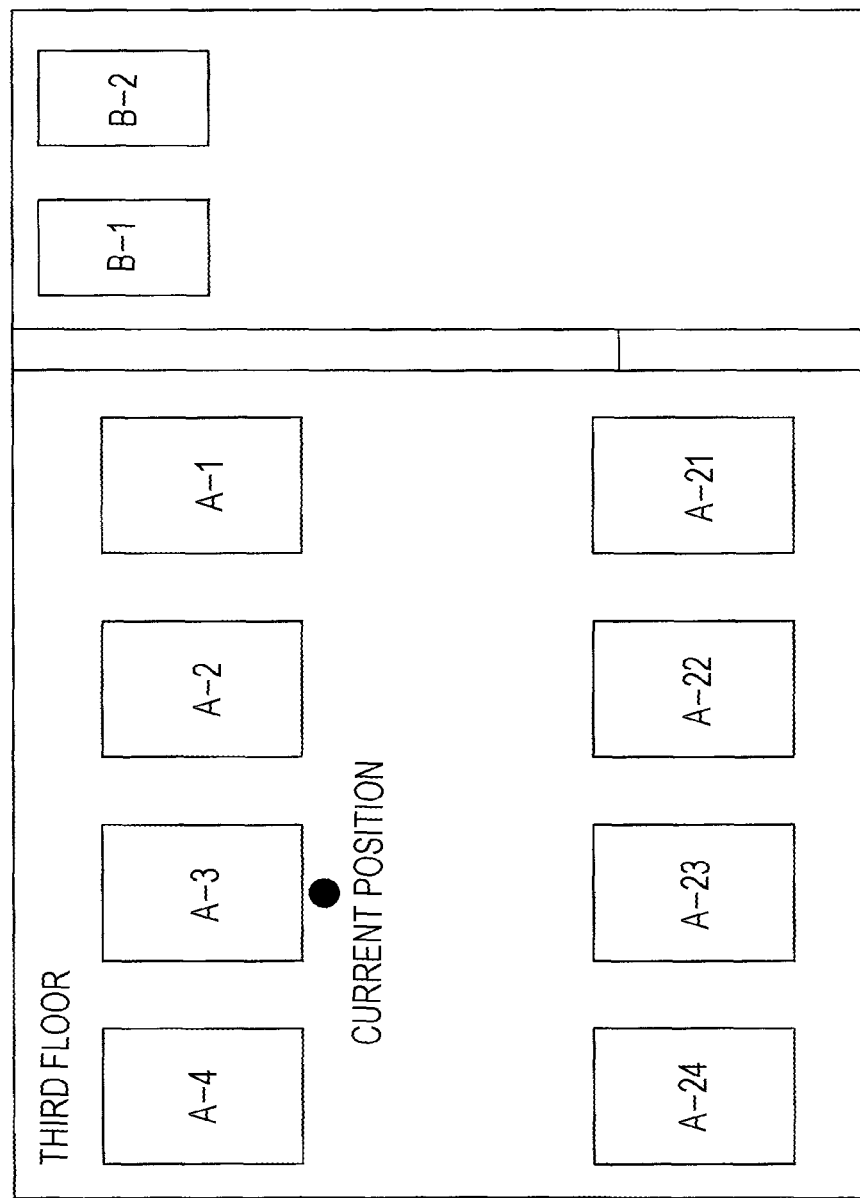
FIG. 10 is a diagram illustrating a display example of a display according to Embodiment 3.

FIG. 10 illustrates a specific display example of the display 157.

The display in FIG. 10 shows a "third floor". Each of A-1, A-2, A-3, A-4, A-21, A-22, A-23, and A-24 denotes the position of a parking space for a car. Each of B-1 and B-2 denotes the position of an elevator. The information on a map including the positions of the parking spaces and the elevators is an example of the desired information 454 (472).

As illustrated in FIG. 10, the display 157 displays the current position of the terminal 450 while mapping it on the map. The current position is information that is obtained from the information 156 including at least the location/position information on the terminal 450.

Figure 11:
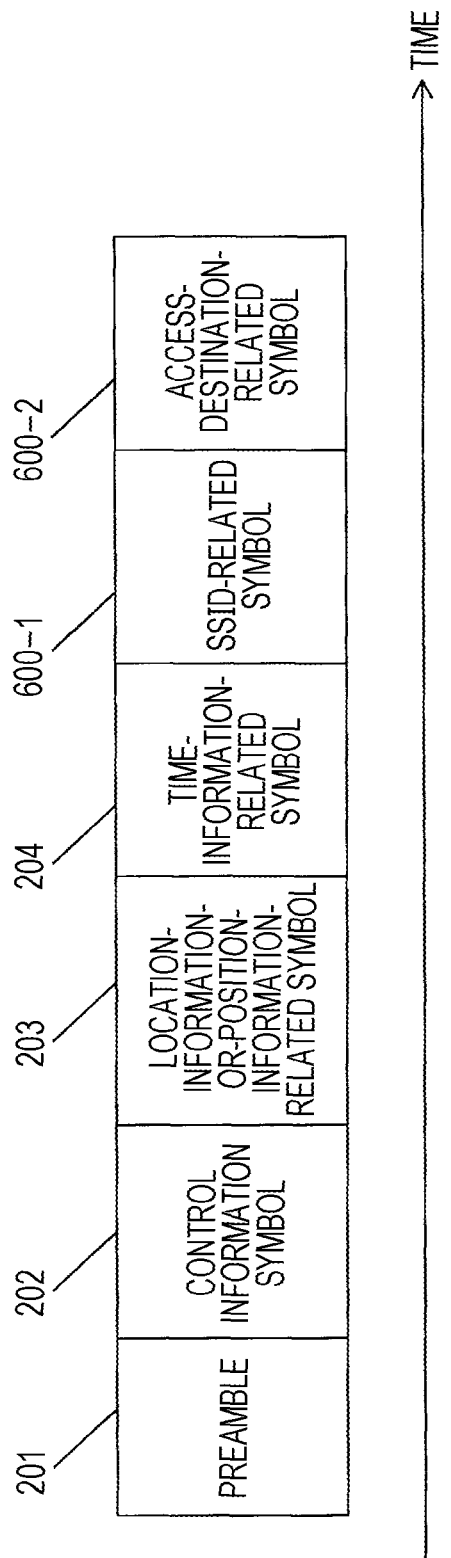
FIG. 11 is a diagram illustrating an example frame configuration of a modulated signal transmitted by a first apparatus according to Embodiment 3.

FIG. 11 illustrates an example of the frame configuration of the modulated signal transmitted by the first apparatus 400 illustrated in FIG. 9. In FIG. 11, the horizontal axis indicates time. In FIG. 11, the symbols for transmitting information similar to that in FIG. 7 are denoted by the same numerals, and the description thereof is omitted.

The first apparatus 400 transmits an SSID-related symbol 600-1 and an access-destination-related symbol 600-2, in addition to the preamble 201, the control information symbol 202, the location-information-or-position-information-related symbol 203, and the time-information-related symbol 204.

The SSID-related symbol 600-1 is a symbol for transmitting the SSID-related information 401-1 in FIG. 9, and the access-destination-related symbol 600-2 is a symbol for transmitting the access-destination-related information 401-2 in FIG. 9. The frame in FIG. 11 may include a symbol other than the symbols illustrated in FIG. 11. The frame configuration, including the order in which the symbols are transmitted, is not limited to the configuration in FIG. 11.

Figure 12:
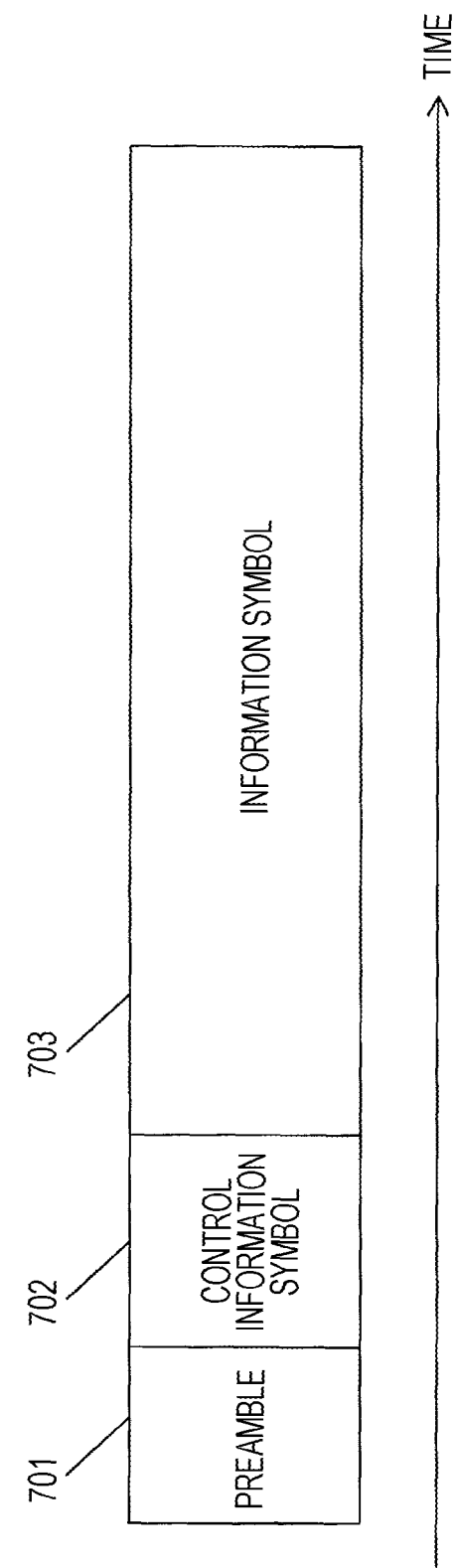
FIG. 12 is a diagram illustrating an example frame configuration of a modulated signal transmitted by a base station according to Embodiment 3.

FIG. 12 illustrates an example of the frame configuration of the modulated signal transmitted by the base station 470 illustrated in FIG. 9. In FIG. 12, the horizontal axis indicates time.

As illustrated in FIG. 12, the base station 470 transmits, for example, a preamble 701, and then transmits a control information symbol 702 and an information symbol 703.

The preamble 701 is a symbol by which the terminal 450 that receives the modulated signal transmitted by the base station 470 performs, for example, signal detection, time synchronization, frame synchronization, frequency synchronization, frequency offset estimation, and the like.

The control information symbol 702 is a symbol including, for example, data of information about an error-correction coding scheme and a modulation scheme that are used to generate the modulated signal, and information about the frame configuration. The radio device 453 of the terminal 450 performs demodulation or the like on the modulated signal based on the information of the control information symbol 702.

The information symbol 703 is a symbol for transmitting information. In the present embodiment, the information symbol 703 is a symbol for transmitting the desired information 472 described above.

The base station 470 illustrated in FIG. 9 may transmit a frame including a symbol other than the symbols illustrated in FIG. 12. For example, the base station 470 may transmit a frame in which a pilot symbol (reference symbol) is included in a middle of the information symbol 703. The frame configuration, including the order in which the symbols are transmitted, is not limited to the configuration in FIG. 12. In FIG. 12, a plurality of symbols may exist in the frequency axis direction. That is, symbols may exist at a plurality of frequencies (a plurality of carriers) in FIG. 12.

In addition, for example, the modulated signal that is transmitted by the first apparatus 400 and that has the frame configuration illustrated in FIG. 11 may be repeatedly transmitted at a regular interval, for example. Accordingly, a plurality of terminals 450 are able to perform the above-described operation.

Figure 13:
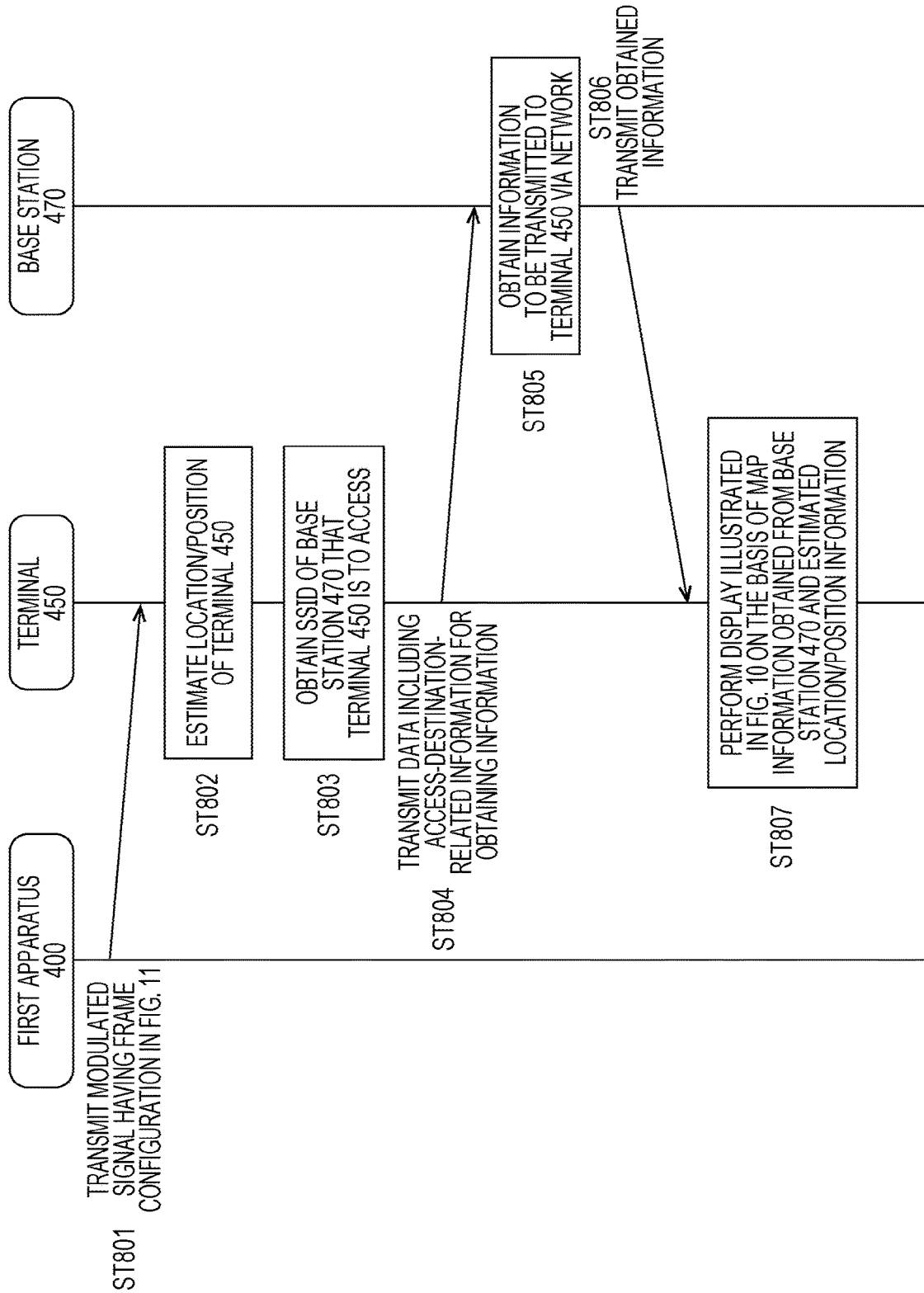
FIG. 13 is a flowchart illustrating an example process in the communication system according to Embodiment 3.

FIG. 13 is a flowchart illustrating an example of a process performed by the "first apparatus 400", the "terminal 450", and the "base station 470" illustrated in FIG. 9 described above.

First, the first apparatus 400 transmits a modulated signal having the frame configuration illustrated in FIG. 11 (ST801).

Subsequently, the terminal 450 receives the modulated signal transmitted by the first apparatus 400 and estimates the location/position of the terminal 450 (ST802).

Also, the terminal 450 receives the modulated signal transmitted by the first apparatus 400 and obtains the SSID of the base station 470 that the terminal 450 is to access (ST803).

Subsequently, the terminal 450 transmits, to the base station 470, a modulated signal including data including the access-destination-related information 452 for obtaining information, such as a map, by using a radio wave, for example (ST804).

The base station 470 receives the modulated signal transmitted by the terminal 450, obtains information on the access destination, accesses a desired access destination via a network, and obtains desired information, such as a map (the information to be transmitted to the terminal 450) (ST805).

Subsequently, the base station 470 transmits a modulated signal including the obtained desired information, such as a map, to the terminal 450 by using, for example, a radio wave (ST806).

The terminal 450 receives the modulated signal transmitted by the base station 470 and obtains information, such as a map. Subsequently, the terminal 450 performs display illustrated in FIG. 10 based on the information, such as a map, and the already obtained location/position information on the terminal 450 (ST807).

Next, a description will be given of an operation example in a case where a plurality of first apparatuses 400 and the base station 470 are installed in the location illustrated in FIG. 10.

Figure 14:
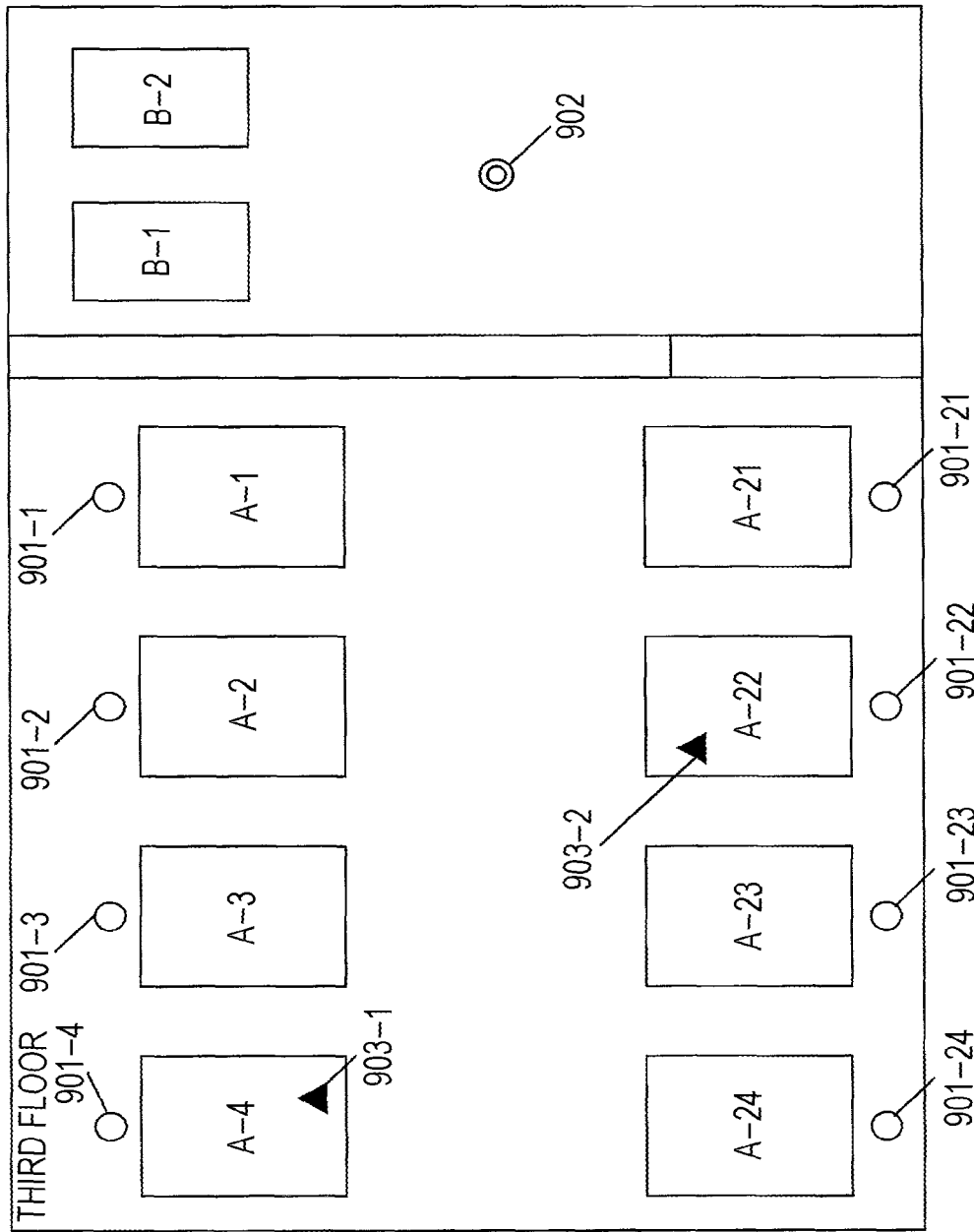
FIG. 14 is a diagram illustrating a display example of the display according to Embodiment 3.

FIG. 14 illustrates a map of a location similar to that in FIG. 10. That is, FIG. 14 illustrates a map of the "third floor" as described in FIG. 10. In FIG. 14, A-1, A-2, A-3, A-4, A-21, A-22, A-23, and A-24 denote parking spaces for cars, and B-1 and B-2 denote elevators.

At the position of a single circle 901-1 in FIG. 14, a first apparatus having a configuration similar to that of the first apparatus 400 illustrated in FIG. 9 is installed. Hereinafter, the first apparatus having a configuration similar to that of the first apparatus 400 and installed at the position denoted by 901-1 will be referred to as a "first first apparatus 400". The first first apparatus 400 has information "A-1" as location-related information or position-related information, and transmits the information "A-1".

At the position of a single circle 901-2 in FIG. 14, a first apparatus having a configuration similar to that of the first apparatus 400 in FIG. 9 is installed. Hereinafter, the first apparatus having a configuration similar to that of the first apparatus 400 and installed at the position denoted by 901-2 will be referred to as a "second first apparatus 400". The second first apparatus 400 has information "A-2" as location-related information or position-related information, and transmits the information "A-2".

At the position of a single circle 901-3 in FIG. 14, a first apparatus having a configuration similar to that of the first apparatus 400 in FIG. 9 is installed. Hereinafter, the first apparatus having a configuration similar to that of the first apparatus 400 and installed at the position denoted by 901-3 will be referred to as a "third first apparatus 400". The third first apparatus 400 has information "A-3" as location-related information or position-related information, and transmits the information "A-3".

At the position of a single circle 901-4 in FIG. 14, a first apparatus having a configuration similar to that of the first apparatus 400 in FIG. 9 is installed. Hereinafter, the first apparatus having a configuration similar to that of the first apparatus 400 and installed at the position denoted by 901-4 will be referred to as a "fourth first apparatus 400". The fourth first apparatus 400 has information "A-4" as location-related information or position-related information, and transmits the information "A-4".

At the position of a single circle 901-21 in FIG. 14, a first apparatus having a configuration similar to that of the first apparatus 400 in FIG. 9 is installed. Hereinafter, the first apparatus having a configuration similar to that of the first apparatus 400 and installed at the position denoted by 901-21 will be referred to as a "twenty-first first apparatus 400". The twenty-first first apparatus 400 has information "A-21" as location-related information or position-related information, and transmits the information "A-21".

At the position of a single circle 901-22 in FIG. 14, a first apparatus having a configuration similar to that of the first apparatus 400 in FIG. 9 is installed. Hereinafter, the first apparatus having a configuration similar to that of the first apparatus 400 and installed at the position denoted by 901-22 will be referred to as a "twenty-second first apparatus 400". The twenty-second first apparatus 400 has information "A-22" as location-related information or position-related information, and transmits the information "A-22".

At the position of a single circle 901-23 in FIG. 14, a first apparatus having a configuration similar to that of the first apparatus 400 in FIG. 9 is installed. Hereinafter, the first apparatus having a configuration similar to that of the first apparatus 400 and installed at the position denoted by 901-23 will be referred to as a "twenty-third first apparatus 400". The twenty-third first apparatus 400 has information "A-23" as location-related information or position-related information, and transmits the information "A-23".

At the position of a single circle 901-24 in FIG. 14, a first apparatus having a configuration similar to that of the first apparatus 400 in FIG. 9 is installed. Hereinafter, the first apparatus having a configuration similar to that of the first apparatus 400 and installed at the position denoted by 901-24 will be referred to as a "twenty-fourth first apparatus 400". The twenty-fourth first apparatus 400 has information "A-24" as location-related information or position-related information, and transmits the information "A-24".

At the position of a double circle 902 in FIG. 14, a base station (or AP) having a configuration similar to that of the base station 470 in FIG. 9 is installed. Hereinafter, the base station (or AP) having a configuration similar to that of the base station 470 in FIG. 9 will be simply referred to as a "base station 470". Here, it is assumed that the SSID of the base station 470 installed at the position denoted by 902 is "abcdef".

The terminal 450 existing near the position indicated in the map in FIG. 14 may access the base station 470 installed at the position denoted by 902 in FIG. 14 when performing wireless communication.

Thus, the "first first apparatus 400" installed at 901-1 in FIG. 14 transmits "abcdef" as SSID-related information (see 401-1 in FIG. 9).

Likewise, the "second first apparatus 400" installed at 901-2 in FIG. 14 transmits "abcdef" as SSID-related information (see 401-1 in FIG. 9).

The "third first apparatus 400" installed at 901-3 in FIG. 14 transmits "abcdef" as SSID-related information (see 401-1 in FIG. 9).

The "fourth first apparatus 400" installed at 901-4 in FIG. 14 transmits "abcdef" as SSID-related information (see 401-1 in FIG. 9).

The "twenty-first first apparatus 400" installed at 901-21 in FIG. 14 transmits "abcdef" as SSID-related information (see 401-1 in FIG. 9).

The "twenty-second first apparatus 400" installed at 901-22 in FIG. 14 transmits "abcdef" as SSID-related information (see 401-1 in FIG. 9).

The "twenty-third first apparatus 400" installed at 901-23 in FIG. 14 transmits "abcdef" as SSID-related information (see 401-1 in FIG. 9).

The "twenty-fourth first apparatus 400" installed at 901-24 in FIG. 14 transmits "abcdef" as SSID-related information (see 401-1 in FIG. 9).

Hereinafter, a specific operation example will be described.

It is assumed that a terminal having a configuration similar to that of the terminal 450 in FIG. 9 (hereinafter simply referred to as a "terminal 450") exists at the position denoted by 903-1 in FIG. 14. In this case, the terminal 450 receives a modulated signal transmitted by the "fourth first apparatus 400" at the position denoted by 901-4 in FIG. 14 and obtains position information "A-4". Also, the terminal 450 receives a modulated signal transmitted by the "fourth first apparatus 400" at the position denoted by 901-4 in FIG. 14 and obtains SSID information "abcdef". Accordingly, the terminal 450 accesses the base station 470 positioned at 902 in FIG. 14. In addition, the terminal 450 obtains information, such as a map, from the base station 470 positioned at 902 in FIG. 14. Subsequently, the terminal 450 displays the map information and position information (see, for example, FIG. 10, which merely illustrates a display example).

Likewise, it is assumed that a terminal having a configuration similar to that of the terminal 450 in FIG. 9 (hereinafter simply referred to as a "terminal 450") exists at the position denoted by 903-2 in FIG. 14. In this case, the terminal 450 receives a modulated signal transmitted by the "twenty-second first apparatus 400" at the position denoted by 901-22 in FIG. 14 and obtains position information "A-22". Also, the terminal 450 receives a modulated signal transmitted by the "fourth first apparatus 400" at the position denoted by 901-22 in FIG. 14 and obtains SSID information "abcdef". Accordingly, the terminal 450 accesses the base station 470 positioned at 902 in FIG. 14. In addition, the terminal 450 obtains information, such as a map, from the base station 470 positioned at 902 in FIG. 14. Subsequently, the terminal 450 displays the map information and position information (see, for example, FIG. 10, which merely illustrates a display example).

The terminal 450 may record the map (neighborhood information) and position information illustrated in FIG. 14 on a storage unit (not illustrated) included in the terminal 450 such that the information recorded on the storage unit can be retrieved when required by a user using the terminal 450. Accordingly, the user is able to utilize the map (neighborhood information) and position information more conveniently.

As described above, the first apparatus 400 transmits a modulated signal by using visible light, and thus the terminal 450 capable of receiving the modulated signal is limited to a terminal that is within the range where the light signal can be received from the position of the first apparatus 400. Thus, the terminal 450 is able to easily (without performing complicated signal processing) obtain highly accurate position information by receiving the location/position information transmitted by the first apparatus 400.

When the first apparatus 400 is installed at a location where a radio wave from a GPS satellite is difficult to receive, the terminal 450 is able to safely obtain highly accurate position information by receiving a modulated signal transmitted by the first apparatus 400 even in a situation where it is difficult to receive a radio wave from the GPS satellite.

Furthermore, the terminal 450 is able to safely obtain information by establishing a connection with the base station (or AP) 470 and obtaining information based on the SSID information transmitted by the first apparatus 400. This is because, when the terminal 450 obtains information from a modulated signal of visible light, the user is able to easily recognize the first apparatus 400 that has transmitted the modulated signal by visually perceiving it because the modulated signal is visible light, and also the user is able to easily determine whether the source of the information is safe. On the other hand, for example, when the SSID is obtained from a modulated signal of a radio wave transmitted through a wireless LAN, it is difficult for the user to determine the apparatus that has transmitted the radio wave. Therefore, visible light communication is more suitable for obtaining an SSID than wireless LAN communication in terms of ensuring the safety of information.

A plurality of signals may further be input to the radio device 453 of the terminal 450 in FIG. 9. For example, a control signal for controlling the radio device 453, information to be transmitted to the base station 470, and so forth may be input to the radio device 453. At this time, the radio device 453 may start communication based on the control signal, for example. As described above, in the present embodiment, the configuration of the first apparatus is not limited to the configuration of the first apparatus 400 in FIG. 9, the configuration of the terminal is not limited to the configuration of the terminal 450 in FIG. 9, and the connection destination and configuration of the base station are not limited to the connection destination and configuration of the base station 470 illustrated in FIG. 9.

FIG. 9 illustrates a case where there is a single base station 470, but there may be a plurality of base stations (or APs) accessible to the terminal 450 (safe base stations). At this time, the SSID-related symbol transmitted by the first apparatus 400 in FIG. 9 may include information indicating the SSIDs of the plurality of base stations (or APs). In this case, a list of the SSIDs of the plurality of base stations and/or a list of a plurality of access destinations is displayed on the display 157 of the terminal 450 in FIG. 9, as an access destination display operation (the foregoing "first display operation"). Based on the information indicating the SSIDs of the plurality of base stations (or APs), the terminal 450 in FIG. 9 may select one or more base stations to be actually connected in a wireless manner (i.e., may simultaneously establish connections with the plurality of base stations).

For example, it is assumed that there are three base stations 470. Here, the three base stations 470 are referred to as a base station #A, a base station #B, and a base station #C. Also, it is assumed that the SSID of the base station #A is "abcdef", the SSID of the base station #B is "ghijk", and the SSID of the base station #C is "pqrstu". In this case, the SSID-related symbol 600-1 in the frame configuration illustrated in FIG. 11 of the modulated signal transmitted by the first apparatus 400 includes information indicating that "the SSID of the base station #A is 'abcdef'", "the SSID of the base station #B is 'ghijk'", and "the SSID of the base station #C is 'pqrstu'". The terminal 450 in FIG. 9 receives the SSID-related symbol 600-1 and selects one or more base stations 470 to be actually connected in a wireless manner, based on the information indicating that "the SSID of the base station #A is 'abcdef'", "the SSID of the base station #B is 'ghijk'", and "the SSID of the base station #C is 'pqrstu'".

Embodiment 4

Figure 15:
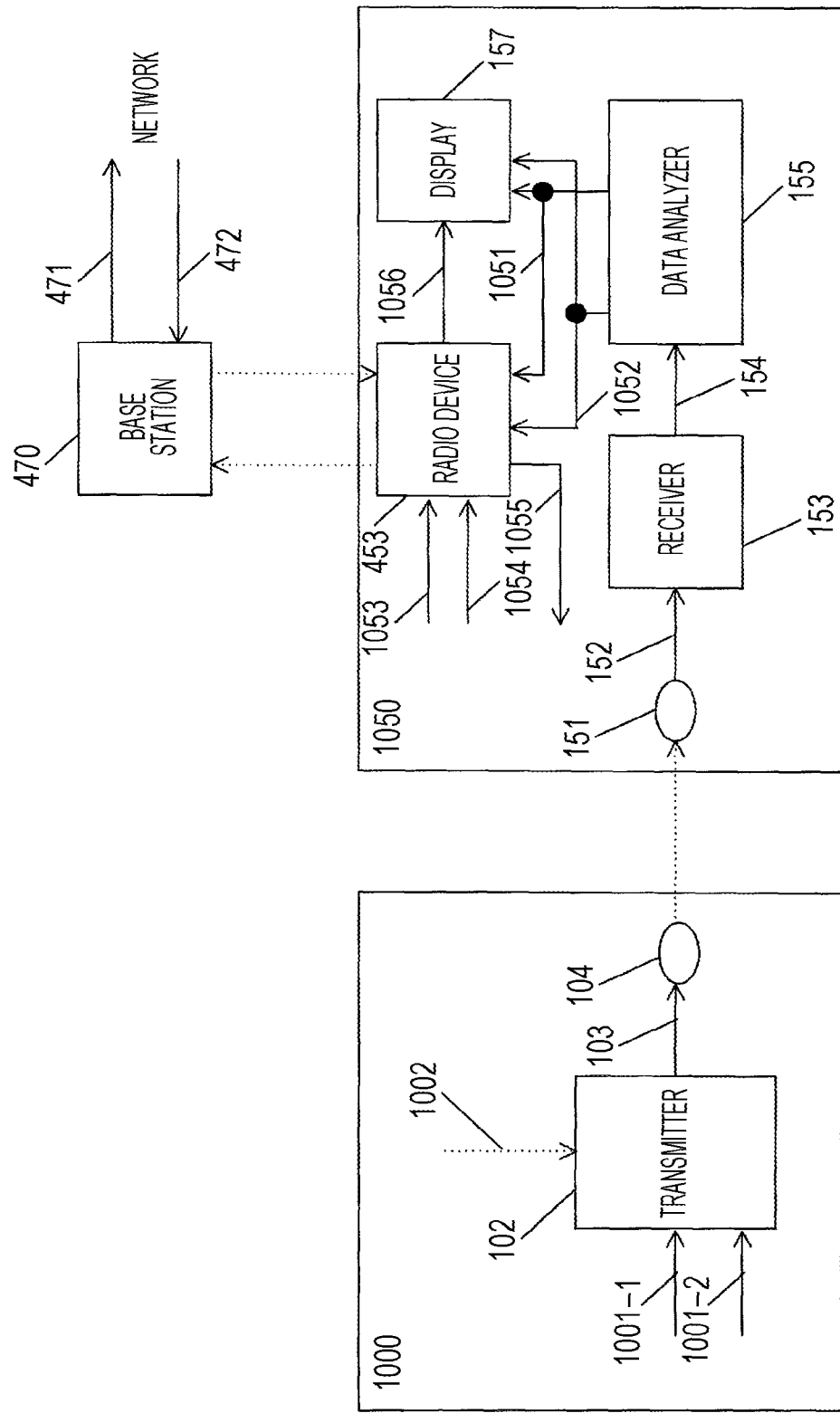
FIG. 15 is a diagram illustrating an example configuration of a communication system according to Embodiment 4.

FIG. 15 is a diagram illustrating an example of the configuration of a communication system in the present embodiment.

The communication system in FIG. 15 includes, for example, an apparatus 1000, a terminal 1050, and the base station (or AP) 470 that communicates with the terminal 1050.

The apparatus 1000 includes, for example, a visible light source, a lighting device, a light source, or a light (hereinafter referred to as the light source 104), such as an LED. Hereinafter, the apparatus 1000 may be referred to as a "second apparatus" in the present embodiment.

In the second apparatus 1000 illustrated in FIG. 15, the components that operate similarly to those of the first apparatus 100 illustrated in FIG. 6 are denoted by the same numerals. In the terminal 1050 illustrated in FIG. 15, the components that operate similarly to those of the terminal 150 illustrated in FIG. 6 are denoted by the same numerals. It is assumed that the communication between the radio device 453 of the terminal 1050 and the base station 470 illustrated in FIG. 15 is performed by using a radio wave, for example.

In the second apparatus 1000 in FIG. 15, the transmitter 102 receives SSID-related information 1001-1, encryption-key-related information 1001-2, and data 1002 as input, generates the (light) modulated signal 103 based on these input signals, and outputs the modulated signal 103. The modulated signal 103 is transmitted, for example, from the light source 104.

Next, a description will be given of the SSID-related information 1001-1 and the encryption-key-related information 1001-2.

First, a description will be given of the SSID-related information 1001-1.

The SSID-related information 1001-1 is information indicating the SSID of the base station 470 in FIG. 15. For example, the base station 470 transmits a modulated signal to the terminal 1050 by using a radio wave and receives a modulated signal from the terminal 1050 by using a radio wave. That is, the second apparatus 1000 is able to provide the terminal 1050 with access to the base station 470, which is a safe access destination. Accordingly, the terminal 1050 in FIG. 15 is able to safely obtain information from the base station 470.

On the other hand, the second apparatus 1000 is able to limit the terminal that accesses the base station 470 to a terminal positioned in a space where a light signal transmitted (emitted) by the second apparatus 1000 can be received.

When the terminal 1050 receives a light signal transmitted in a predetermined scheme, the terminal 1050 may determine that the notified SSID is the SSID of a safe base station. The terminal 1050 may separately perform a process of determining whether or not the notified SSID is safe. For example, the second apparatus 1000 may transmit a light signal including a predetermined identifier, and the terminal 1050 may determine, based on the received identifier, whether or not the notified SSID is the SSID of a safe base station.

FIG. 15 illustrates a single base station 470. For example, also when a base station (or AP) other than the base station 470 exists, the terminal 1050 accesses the base station 470 by using the SSID obtained from the second apparatus 1000 and obtains information.

Next, a description will be given of the encryption-key-related information 1001-2.

The encryption-key-related information 1001-2 is information about an encryption key that is necessary for the terminal 1050 to communicate with the base station 470. The terminal 1050 obtains the encryption-key-related information 1001-2 from the second apparatus 1000, thereby becoming able to perform encrypted communication with the base station 470.

The SSID-related information 1001-1 and the encryption-key-related information 1001-2 have been described above.

The terminal 1050 in FIG. 15 receives a modulated signal transmitted by the second apparatus 1000. In the terminal 1050 in FIG. 15, the components that operate similarly to those of the terminal 150 in FIG. 6 or those of the terminal 450 in FIG. 9 are denoted by the same numerals.

The light receiver 151 included in the terminal 1050 is, for example, an image sensor, such as a CMOS sensor or an organic CMOS sensor. The light receiver 151 receives light including the modulated signal transmitted by the second apparatus 1000 and outputs the reception signal 152.

The receiver 153 receives the reception signal 152 received by the light receiver 151 as input, performs processing, such as demodulation and error-correction decoding, on the modulated signal included in the reception signal 152, and outputs the reception data 154.

The data analyzer 155 receives the reception data 154 as input and outputs, for example, SSID information 1051 on a base station as a connection destination and encryption key information 1052 for communicating with the base station as the connection destination, which are included in the reception data 154. For example, in a wireless local area network (LAN), Wired Equivalent Privacy (WEP), Wi-Fi Protected Access (WPA), and Wi-Fi Protected Access 2 (WPA2) (Pre-Shared Key (PSK) mode, Extended Authentication Protocol (EAP) mode) are available as an encryption scheme. Note that the encryption scheme is not limited thereto.

The display 157 receives the SSID information 1051 and the encryption key information 1052 as input, and displays, for example, the SSID and the encryption key of a communication partner that the radio device 453 included in the terminal 1050 is to access (this display operation is referred to as a "first display operation" in the present embodiment).

For example, after the first display operation, the radio device 453 receives the SSID information 1051 and the encryption key information 1052 as input, and establishes a connection with the base station 470 (for example, a radio wave is used for the connection). At this time, when the base station 470 communicates with the radio device 453 included in the terminal 1050, the base station 470 transmits a modulated signal by using a radio wave, for example.

After that, the radio device 453 receives data 1053 and a control signal 1054 as input, modulates the data 1053 in accordance with control indicated by the control signal 1054, and transmits a modulated signal by using a radio wave.

Subsequently, for example, the base station 470 performs data transmission (471) by using a network and data reception (472) by using the network. After that, for example, the base station 470 transmits a modulated signal to the terminal 1050 by using a radio wave.

The radio device 453 included in the terminal 1050 performs processing, such as demodulation and error-correction decoding, on the modulated signal received by using a radio wave, and obtains reception data 1056. The display 157 performs display based on the reception data 1056.

Figure 16:
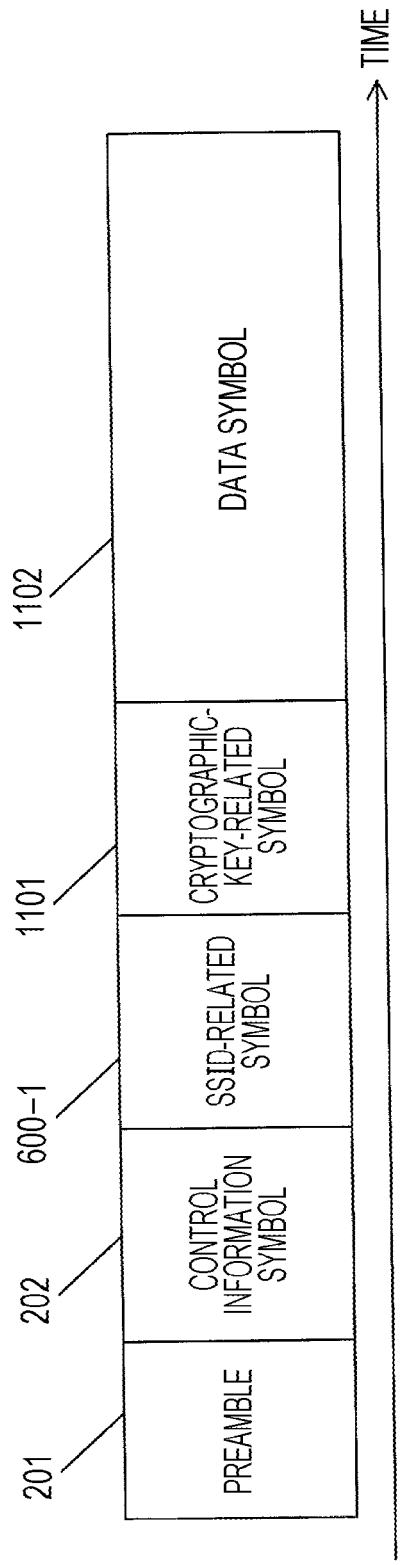
FIG. 16 is a diagram illustrating an example frame configuration of a modulated signal transmitted by a first apparatus according to Embodiment 4.

FIG. 16 illustrates an example of the frame configuration of the modulated signal transmitted by the second apparatus 1000 illustrated in FIG. 15. In FIG. 16, the horizontal axis indicates time. In FIG. 16, the symbols similar to those in FIG. 7 or 11 are denoted by the same numerals, and the description thereof is omitted.

The SSID-related symbol 600-1 is a symbol for transmitting the SSID-related information 1001-1 in FIG. 15, and a encryption-key-related symbol 1101 is a symbol for transmitting the encryption-key-related information 1001-2 in FIG. 15. A data symbol 1102 is a symbol for transmitting the data 1002 in FIG. 15.

The second apparatus 1000 transmits the preamble 201, the control information symbol 202, the SSID-related symbol 600-1, the encryption-key-related symbol 1101, and the data symbol 1102. The second apparatus 1000 may transmit a frame including a symbol other than the symbols illustrated in FIG. 16. The frame configuration, including the order in which the symbols are transmitted, is not limited to the configuration in FIG. 16.

Figure 17:
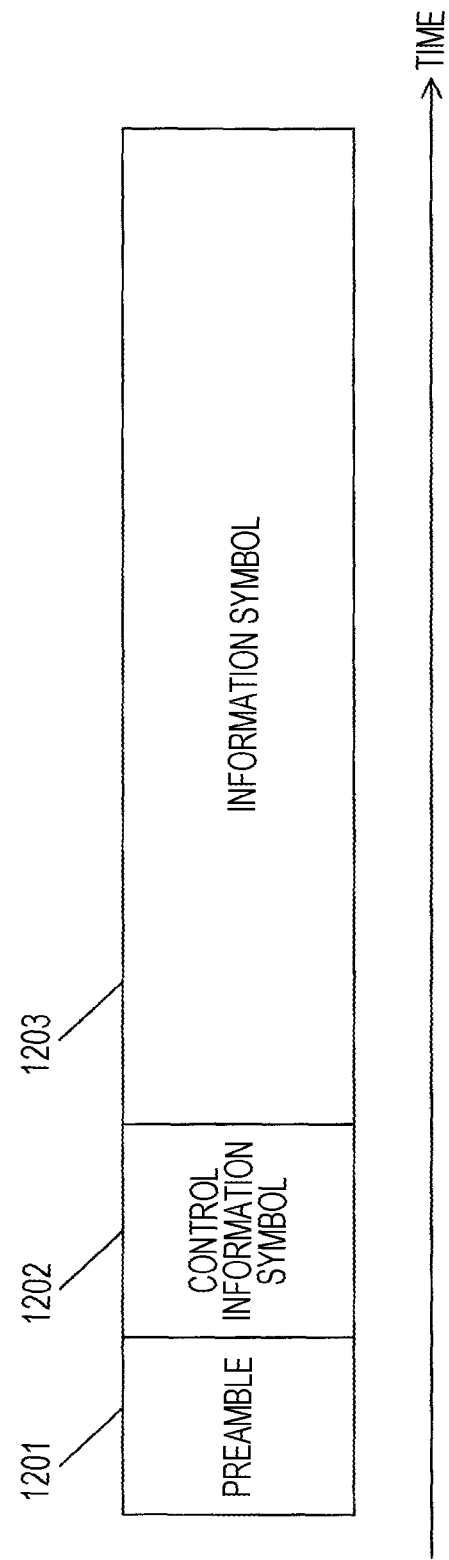
FIG. 17 is a diagram illustrating an example frame configuration of a modulated signal transmitted by a radio device of a terminal according to Embodiment 4.

FIG. 17 illustrates an example of the frame configuration of the modulated signal transmitted by the radio device 453 included in the terminal 1050 in FIG. 15. In FIG. 17, the horizontal axis indicates time.

As illustrated in FIG. 17, the radio device 453 included in the terminal 1050 transmits, for example, a preamble 1201, and then transmits a control information symbol 1202 and an information symbol 1203.

The preamble 1201 is a symbol by which the base station 470 that receives the modulated signal transmitted by radio device 453 of the terminal 1050 performs, for example, signal detection, time synchronization, frame synchronization, frequency synchronization, frequency offset estimation, and the like.

The control information symbol 1202 is a symbol including, for example, data of information about an error-correction coding scheme and a modulation scheme that are used to generate the modulated signal, information about the frame configuration, and information about a transmission method. The base station 470 performs demodulation or the like on the modulated signal based on the information included in the control information symbol 1202.

The information symbol 1203 is a symbol by which the radio device 453 of the terminal 1050 transmits data.

The radio device 453 of the terminal 1050 may transmit a frame including a symbol other than the symbols illustrated in FIG. 17. For example, the radio device 453 may transmit a frame in which a pilot symbol (reference symbol) is included in a middle of the information symbol 1203. The frame configuration, including the order in which the symbols are transmitted, is not limited to the configuration in FIG. 17. In FIG. 17, a plurality of symbols may exist in the frequency axis direction. That is, symbols may exist at a plurality of frequencies (a plurality of carriers) in FIG. 17. In addition, in Embodiment 3, the frame configuration in FIG. 17 may be used when the radio device 453 included in the terminal 450 in FIG. 9 transmits a modulated signal.

The frame configuration of the modulated signal transmitted by the base station 470 in the present embodiment is similar to the frame configuration in FIG. 12 described in Embodiment 3. That is, as illustrated in FIG. 12, the base station 470 transmits, for example, the preamble 701, and then transmits the control information symbol 702 and the information symbol 703.

The preamble 701 is a symbol by which the radio device 453 of the terminal 1050 that receives the modulated signal transmitted by the base station 470 performs, for example, signal detection, time synchronization, frame synchronization, frequency synchronization, frequency offset estimation, and the like.

The control information symbol 702 is a symbol including, for example, data of information about an error-correction coding scheme and a modulation scheme that are used to generate the modulated signal, information about the frame configuration, and information about a transmission method. The radio device 453 of the terminal 1050 performs demodulation or the like on the modulated signal based on the information of the control information symbol 702.

The information symbol 703 is a symbol by which the base station 470 transmits data.

The base station 470 illustrated in FIG. 15 may transmit a frame including a symbol other than the symbols illustrated in FIG. 12. For example, the base station 470 may transmit a frame in which a pilot symbol (reference symbol) is included in a middle of the information symbol 703. The frame configuration, including the order in which the symbols are transmitted, is not limited to the configuration in FIG. 12. In FIG. 12, a plurality of symbols may exist in the frequency axis direction. That is, symbols may exist at a plurality of frequencies (a plurality of carriers) in FIG. 12.

In addition, for example, the modulated signal that is transmitted by the second apparatus 1000 and that has the frame configuration in FIG. 16 may be repeatedly transmitted at a regular interval, for example. Accordingly, a plurality of terminals 1050 are able to perform the above-described operation.

Figure 18:
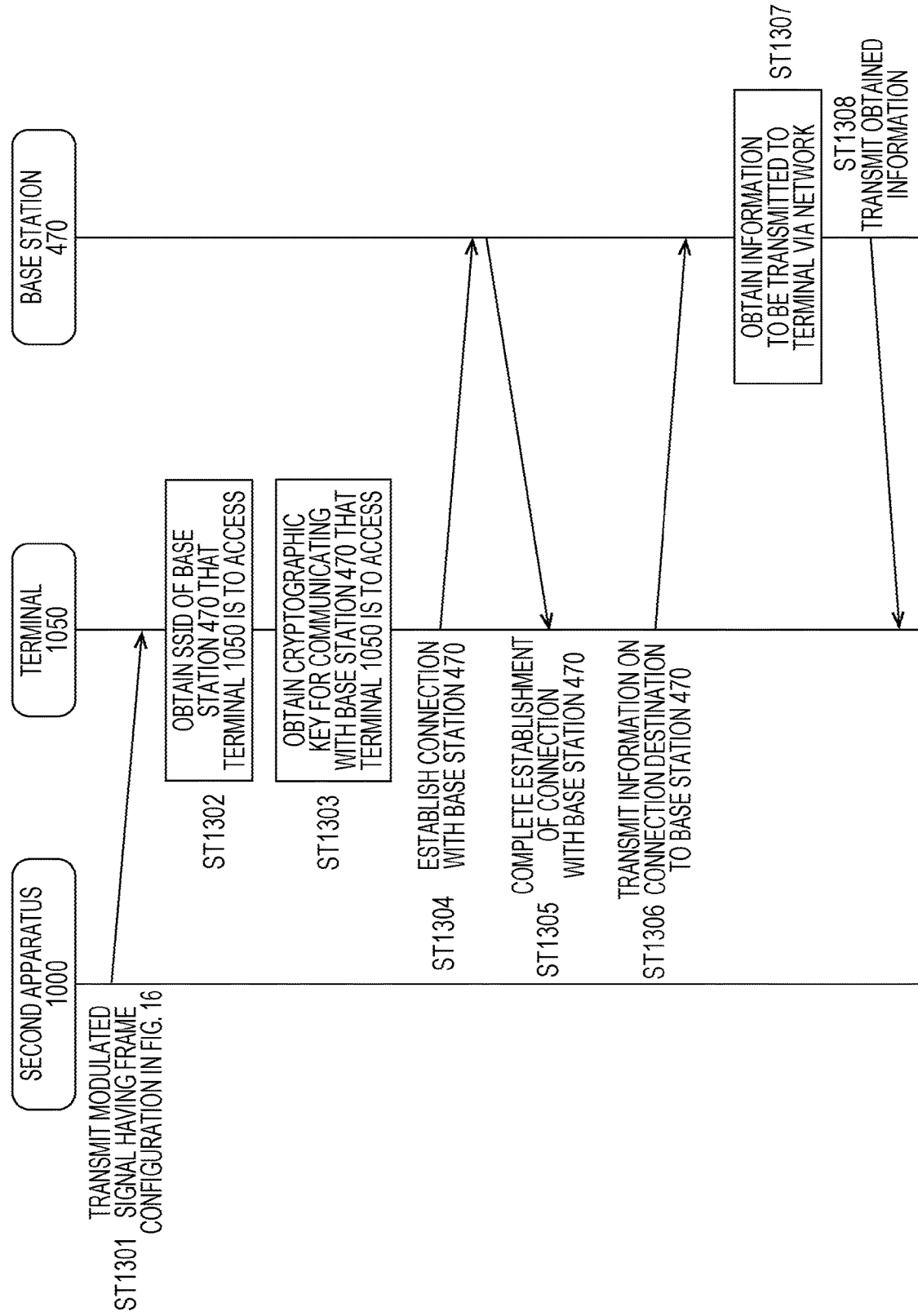
FIG. 18 is a flowchart illustrating an example process in the communication system according to Embodiment 4.

FIG. 18 is a flowchart illustrating an example of a process performed by the "second apparatus 1000", the "terminal 1050", and the "base station 470" illustrated in FIG. 15.

First, the second apparatus 1000 transmits a modulated signal having the frame configuration illustrated in FIG. 16 (ST1301).

Subsequently, the terminal 1050 receives the modulated signal transmitted by the second apparatus 1000 and obtains the SSID of the base station 470 that the terminal 1050 is to access (ST1302).

Also, the terminal 1050 obtains an encryption key to be used for communication with the base station 470 that the terminal 1050 is to access (ST1303).

Subsequently, the terminal 1050 establishes a connection through a radio wave with the base station 470 (ST1304). The establishment of the connection with the base station 470 is completed upon receipt of a response from the base station 470 by the terminal 1050 (ST1305).

Subsequently, the terminal 1050 transmits information on the connection destination to the base station 470 by using a radio wave (ST1306).

The base station 470 obtains information to be transmitted to the terminal 1050 from the network (ST1307).

Subsequently, the base station 470 transmits the obtained information to the terminal 1050 by using a radio wave, and the terminal 1050 obtains the information (ST1308). The terminal 1050 obtains necessary information from the network via the base station 470 when necessary, for example.

As described above, based on the SSID information and the encryption key information transmitted by the second apparatus 1000, the terminal 1050 establishes a connection with the base station 470 and obtains information, thereby being able to safely obtain the information via the base station 470 that is safety-guaranteed. This is because, when the terminal 1050 obtains information from a modulated signal of visible light, the user is able to easily determine whether or not the source of the information is safe because modulated signal is visible light. In contrast, for example, when the SSID is obtained from a modulated signal of a radio wave transmitted through a wireless LAN, it is difficult for the user to determine the apparatus that has transmitted the radio wave. Therefore, visible light communication is more suitable for obtaining the SSID than wireless LAN communication in terms of ensuring the safety of information.

In the present embodiment, a description has been given of a case where the second apparatus 1000 transmits encryption key information. However, when the base station 470 does not perform encrypted communication using an encryption key, for example, it is sufficient that the second apparatus 1000 transmit only SSID-related information, not encryption key information. In this case, a similar operation can be performed only by removing the component related to the encryption key among the above-described components.

The configuration of the second apparatus is not limited to the configuration of the second apparatus 1000 illustrated in FIG. 15, the configuration of the terminal is not limited to the configuration of the terminal 1050 illustrated in FIG. 15, and the connection destination and the configuration of the base station are not limited to the connection destination and the configuration of the base station 470 illustrated in FIG. 15.

FIG. 15 illustrates a case where there is a single base station 470, but there may be a plurality of base stations (or APs) accessible to the terminal 1050 (safe base stations). The plurality of base stations and the terminal 1050 each transmit/receive a modulated signal by using a radio wave. At this time, the SSID-related symbol transmitted by the second apparatus 1000 in FIG. 15 may include information indicating the SSIDs of the plurality of base stations (or APs). In this case, a list of the SSIDs of the plurality of base stations and/or a list of a plurality of access destinations is displayed on the display 157 of the terminal 1050 in FIG. 15, as an access destination display operation. The encryption-key-related symbol transmitted by the second apparatus 1000 in FIG. 15 may include information indicating the encryption keys that are used to connect to the plurality of base stations (or APs). Based on the information indicating the SSIDs and encryption keys of the plurality of base stations, the terminal 1050 in FIG. 15 may select one or more base stations to be actually connected in a wireless manner (for example, by using a radio wave) (i.e., may simultaneously establish connections with the plurality of base stations).

For example, it is assumed that there are three base stations 470. Here, the three base stations 470 are referred to as a base station #A, a base station #B, and a base station #C. Also, it is assumed that the SSID of the base station #A is "abcdef", the SSID of the base station #B is "ghijk", and the SSID of the base station #C is "pqrstu". Also, it is assumed that the encryption key for connecting to the base station #A is "123", the encryption key for connecting to the base station #B is "456", and the encryption key for connecting to the base station #C is "789".

In this case, the SSID-related symbol 600-1 in the frame configuration illustrated in FIG. 16 of the modulated signal transmitted by the second apparatus 1000 includes information indicating that "the SSID of the base station #A is 'abcdef'", "the SSID of the base station #B is 'ghijk'", and "the SSID of the base station #C is 'pqrstu'". The encryption-key-related symbol 1101 in the frame configuration in FIG. 16 includes information indicating that "the encryption key for connecting to the base station #A is '123'", "the encryption key for connecting to the base station #B is '456'", and "the encryption key for connecting to the base station #C is '789'".

The terminal 1050 in FIG. 15 receives the SSID-related symbol 600-1 and obtains the information indicating that "the SSID of the base station #A is 'abcdef'", "the SSID of the base station #B is 'ghijk'", and "the SSID of the base station #C is 'pqrstu'". Also, the terminal 1050 receives the encryption-key-related symbol 1101 and obtains the information indicating that "the encryption key for connecting to the base station #A is '123'", "the encryption key for connecting to the base station #B is '456'", and "the encryption key for connecting to the base station #C is '789'". Based on these pieces of information, the terminal 1050 selects one or more base stations to be actually connected in a wireless manner (for example, by using a radio wave), and establishes the connection.

As in the present embodiment, with the base station 470 to be accessed by the terminal 1050 being set by using a light source, such as an LED, it becomes unnecessary to provide a mode for a special setting for performing a procedure for connection through wireless communication between the terminal 1050 and the base station 470 on a modulated signal for wireless communication transmitted by the terminal 1050. Also, it becomes unnecessary to provide a mode for a special setting for performing a procedure for connection through wireless communication between the terminal 1050 and the base station 470 on a modulated signal transmitted by the base station 470. Accordingly, in the present embodiment, the data transmission efficiency of wireless communication can be increased.

As described above, the encryption key may be an encryption key for an SSID of a wireless LAN, or may be an encryption key for limiting a connection style, a service style, a connection range of a network, or the like. That is, it is sufficient that an encryption key be introduced to limit something.

Embodiment 5

Figure 19:
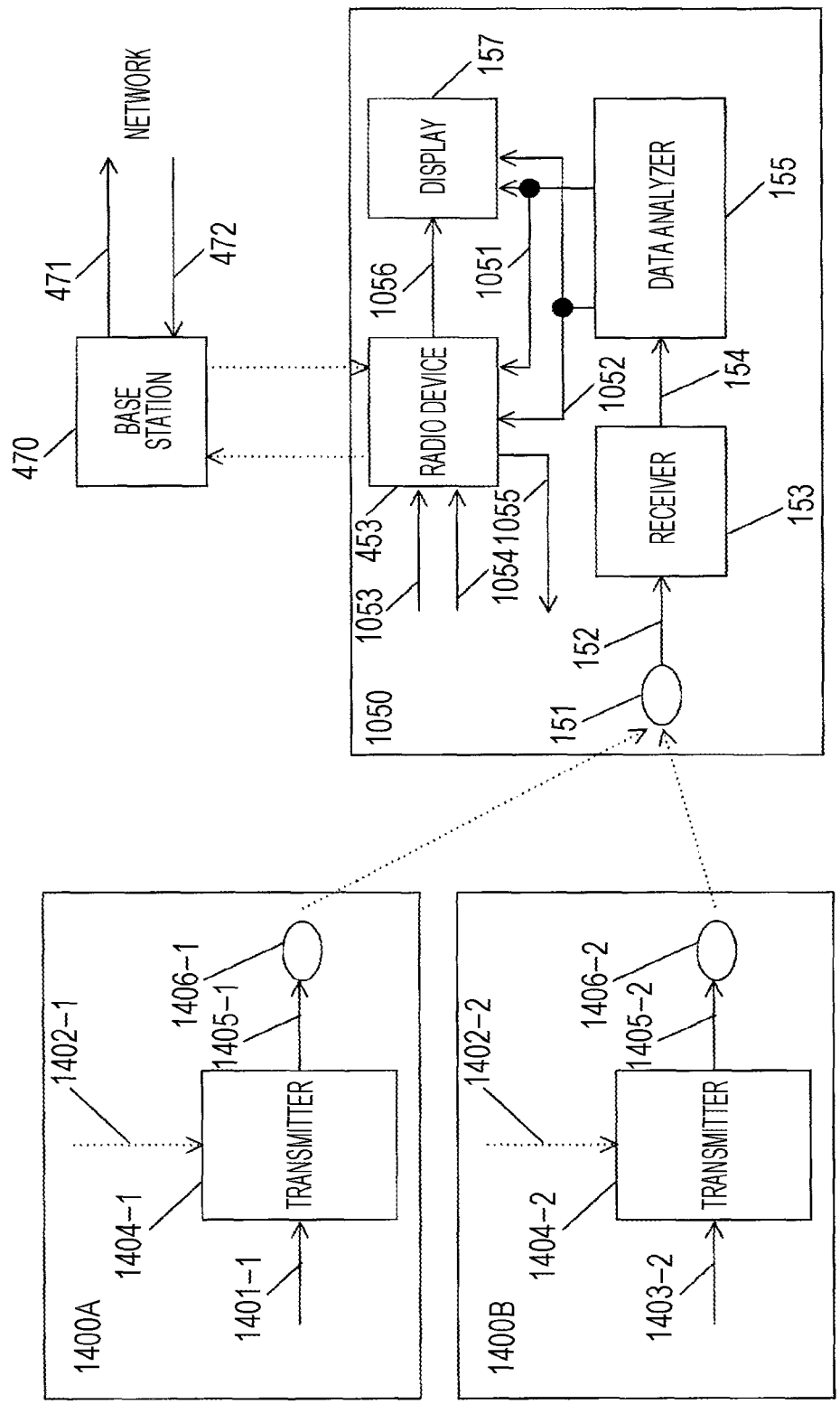
FIG. 19 is a diagram illustrating an example configuration of a communication system according to Embodiment 5.

FIG. 19 is a diagram illustrating an example of the configuration of a communication system in the present embodiment.

The communication system in FIG. 19 includes, for example, apparatuses 1400A and 1400B, the terminal 1050, and the base station (or AP) 470 that communicates with the terminal 1050.

The apparatuses 1400A and 1400B each include, for example, a visible light source, a lighting device, a light source, or a light (hereinafter referred to as light sources 1406-1 and 1406-2), such as an LED. Hereinafter, the apparatus 1400A will be referred to as a "third apparatus" in the present embodiment, and the apparatus 1400B will be referred to as a "fourth apparatus" in the present embodiment.

In the terminal 1050 illustrated in FIG. 19, the components that operate similarly to those of the terminal 150 illustrated in FIG. 6 or the terminal 1050 illustrated in FIG. 15 are denoted by the same numerals. In the base station (or AP) 470 illustrated in FIG. 19, the components that operate similarly to those of the base station 470 illustrated in FIG. 9 are denoted by the same numerals as in FIG. 9. It is assumed that the communication between the radio device 453 of the terminal 1050 and the base station 470 illustrated in FIG. 19 is performed by using a radio wave, for example.

In the third apparatus 1400A in FIG. 19, a transmitter 1404-1 receives SSID-related information 1401-1 and data 1402-1 as input, generates a (light) modulated signal 1405-1 based on these input signals, and outputs the modulated signal 1405-1. The modulated signal 1405-1 is transmitted, for example, from the light source 1406-1.

In the fourth apparatus 1400B in FIG. 19, a transmitter 1404-2 receives encryption-key-related information 1403-2 and data 1402-2 as input, generates a (light) modulated signal 1405-2 based on these input signals, and outputs the modulated signal 1405-2. The modulated signal 1405-2 is transmitted, for example, from the light source 1406-2.

Next, a description will be given of the SSID-related information 1401-1 and the encryption-key-related information 1403-2.

First, a description will be given of the SSID-related information 1401-1.

The SSID-related information 1401-1 is information indicating the SSID of the base station 470 in FIG. 19. That is, the third apparatus 1400A is able to provide the terminal 1050 with access to the base station 470, which is a safe access destination using a radio wave. Accordingly, the terminal 1050 in FIG. 19 is able to safely obtain information from the base station 470.

When the terminal 1050 receives a light signal transmitted in a predetermined scheme, the terminal 1050 may determine that the notified SSID is the SSID of a safe base station. The terminal 1050 may separately perform a process of determining whether or not the notified SSID is safe. For example, the third apparatus 1400A may transmit a light signal including a predetermined identifier, and the terminal 1050 may determine, based on the received identifier, whether or not the notified SSID is the SSID of a safe base station.

FIG. 19 illustrates a single base station 470. For example, also when a base station (or AP) other than the base station 470 exists, the terminal 1050 accesses the base station 470 by using the SSID obtained from the third apparatus 1400A and the encryption key obtained from the fourth apparatus 1400B and obtains information.

Next, a description will be given of the encryption-key-related information 1403-2.

The encryption-key-related information 1403-2 is information about an encryption key that is necessary for the terminal 1050 to communicate with the base station 470 by using a radio wave. The terminal 1050 obtains the encryption-key-related information 1403-2 from the fourth apparatus 1400B, thereby becoming able to perform encrypted communication with the base station 470.

The SSID-related information 1401-1 and the encryption-key-related information 1403-2 have been described above.

The terminal 1050 in FIG. 19 receives a modulated signal transmitted by the third apparatus 1400A.

The light receiver 151 included in the terminal 1050 is, for example, an image sensor, such as a CMOS sensor or an organic CMOS sensor. The light receiver 151 receives light including the modulated signal transmitted by the third apparatus 1400A and outputs the reception signal 152.

The receiver 153 receives the reception signal 152 received by the light receiver 151 as input, performs processing, such as demodulation and error-correction decoding, on the modulated signal included in the reception signal 152, and outputs the reception data 154.

The data analyzer 155 receives the reception data 154 as input and outputs, for example, the SSID information 1051 on a base station as a connection destination, which is included in the reception data. The radio device 453 obtains, from the SSID information 1051, the SSID information on the base station 470 to be connected to the radio device 453 by using a radio wave.

The terminal 1050 in FIG. 19 receives a modulated signal transmitted by the fourth apparatus 1400B.

The light receiver 151 included in the terminal 1050 is, for example, an image sensor, such as a CMOS sensor or an organic CMOS sensor. The light receiver 151 receives light including the modulated signal transmitted by the fourth apparatus 1400B and outputs the reception signal 152.

The receiver 153 receives the reception signal 152 received by the light receiver 151 as input, performs processing, such as demodulation and error-correction decoding, on the modulated signal included in the reception signal 152, and outputs the reception data 154.

The data analyzer 155 receives the reception data 154 as input and outputs, for example, the encryption key information 1052 for communicating with the base station as a connection destination, which is included in the reception data. For example, in a wireless local area network (LAN), Wired Equivalent Privacy (WEP), Wi-Fi Protected Access (WPA), and Wi-Fi Protected Access 2 (WPA2) (Pre-Shared Key (PSK) mode, Extended Authentication Protocol (EAP) mode) are available as an encryption scheme. Note that the encryption scheme is not limited thereto.

The radio device 453 included in the terminal 1050 obtains, from the encryption key information 1052 for communicating with the base station as the connection destination (for example, through a radio wave), the encryption key information on the base station 470 to be connected to the radio device 453.

The display 157 receives the SSID information 1051 and the encryption key information 1052 as input, and displays, for example, the SSID and the encryption key of a communication partner that the radio device 453 included in the terminal 1050 is to access (this display operation is referred to as a "first display operation" in the present embodiment).

For example, after the first display operation, the radio device 453 receives the SSID information 1051 and the encryption key information 1052 as input, and establishes a connection through a radio wave with the base station 470. At this time, when the base station 470 communicates with the radio device 453 included in the terminal 1050, the base station 470 transmits a modulated signal by using a radio wave, for example.

After that, the radio device 453 receives the data 1053 and the control signal 1054 as input, modulates the data 1053 in accordance with control indicated by the control signal 1054, and transmits a modulated signal by using a radio wave.

Subsequently, for example, the base station 470 performs data transmission (471) by using a network and data reception (472) by using the network. After that, for example, the base station 470 transmits a modulated signal to the terminal 1050 by using a radio wave.

The radio device 453 included in the terminal 1050 performs processing, such as demodulation and error-correction decoding, on the modulated signal received by using a radio wave, and obtains the reception data 1056. The display 157 performs display based on the reception data 1056.

Figure 20:
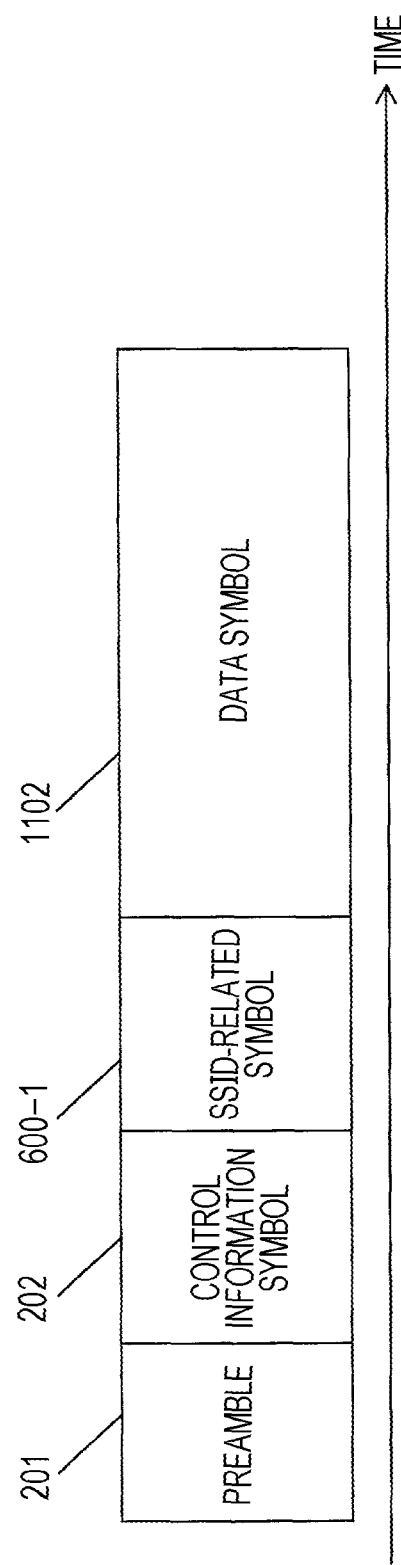
FIG. 20 is a diagram illustrating an example frame configuration of a modulated signal including an SSID and transmitted by a third apparatus according to Embodiment 5.

FIG. 20 illustrates an example of the frame configuration of the modulated signal transmitted by the third apparatus 1400A illustrated in FIG. 19. In FIG. 20, the horizontal axis indicates time. In FIG. 20, the symbols similar to those in FIG. 7, 11 or 16 are denoted by the same numerals, and the description thereof is omitted.

The SSID-related symbol 600-1 is a symbol for transmitting the SSID-related information 1401-1 in FIG. 19. The data symbol 1102 is a symbol for transmitting the data 1402-1.

The third apparatus 1400A transmits the preamble 201, the control information symbol 202, the SSID-related symbol 600-1, and the data symbol 1102. The third apparatus 1400A may transmit a frame including a symbol other than the symbols illustrated in FIG. 20. The frame configuration, including the order in which the symbols are transmitted, is not limited to the configuration in FIG. 20.

Figure 21:
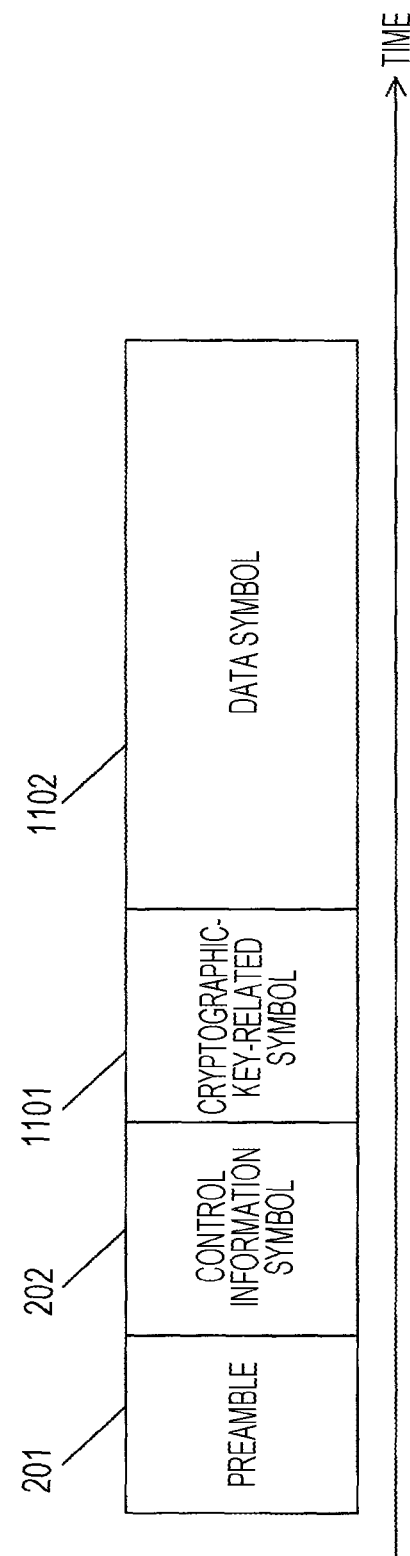
FIG. 21 is a diagram illustrating an example frame configuration of a modulated signal including an encryption key and transmitted by the third apparatus according to Embodiment 5.

FIG. 21 illustrates an example of the frame configuration of the modulated signal transmitted by the fourth apparatus 1400B illustrated in FIG. 19. In FIG. 21, the horizontal axis indicates time. In FIG. 21, the symbols similar to those in FIG. 7 or 16 are denoted by the same numerals, and the description thereof is omitted.

The encryption-key-related symbol 1101 is a symbol for transmitting the encryption-key-related information 1403-2 in FIG. 19. The data symbol 1102 is a symbol for transmitting the data 1402-2.

The fourth apparatus 1400B transmits the preamble 201, the control information symbol 202, the encryption-key-related symbol 1101, and the data symbol 1102. The fourth apparatus 1400B in FIG. 19 may transmit a frame including a symbol other than the symbols illustrated in FIG. 21. The frame configuration, including the order in which the symbols are transmitted, is not limited to the configuration in FIG. 21.

The frame configuration of the modulated signal transmitted by the radio device 453 in the present embodiment is similar to the frame configuration in FIG. 17 described in Embodiment 4. That is, as illustrated in FIG. 17, the radio device 453 included in the terminal 1050 transmits, for example, the preamble 1201, and then transmits the control information symbol 1202 and the information symbol 1203.

The preamble 1201 is a symbol by which the base station (or AP) 470 that receives the modulated signal transmitted by radio device 453 of the terminal 1050 in FIG. 19 performs, for example, signal detection, time synchronization, frame synchronization, frequency synchronization, frequency offset estimation, and the like.

The control information symbol 1202 is a symbol including, for example, data of information about an error-correction coding scheme and a modulation scheme that are used to generate the modulated signal, information about the frame configuration, and information about a transmission method. The base station 470 performs demodulation or the like on the modulated signal based on the information included in the control information symbol 1202.

The information symbol 1203 is a symbol by which the radio device 453 of the terminal 1050 transmits data.

The radio device 453 of the terminal 1050 illustrated in FIG. 19 may transmit a frame including a symbol other than the symbols illustrated in FIG. 17. For example, the radio device 453 may transmit a frame in which a pilot symbol (reference symbol) is included in a middle of the information symbol 1203. The frame configuration, including the order in which the symbols are transmitted, is not limited to the configuration in FIG. 17. In FIG. 17, a plurality of symbols may exist in the frequency axis direction. That is, symbols may exist at a plurality of frequencies (a plurality of carriers) in FIG. 17.

The frame configuration of the modulated signal transmitted by the base station 470 in the present embodiment is similar to the frame configuration in FIG. 12 described in Embodiment 3. That is, as illustrated in FIG. 12, the base station 470 transmits, for example, the preamble 701, and then transmits the control information symbol 702 and the information symbol 703.

The preamble 701 is a symbol by which the radio device 453 of the terminal 1050 in FIG. 19 that receives the modulated signal transmitted by the base station 470 performs, for example, signal detection, time synchronization, frame synchronization, frequency synchronization, frequency offset estimation, and the like.

The control information symbol 702 is a symbol including, for example, data of information about an error-correction coding scheme and a modulation scheme that are used to generate the modulated signal, information about the frame configuration, and information about a transmission method. The radio device 453 of the terminal 1050 in FIG. 19 performs demodulation or the like on the modulated signal based on the information of the control information symbol 702.

The information symbol 703 is a symbol by which the base station 470 in FIG. 19 transmits data.

The base station 470 illustrated in FIG. 19 may transmit a frame including a symbol other than the symbols illustrated in FIG. 12. For example, the base station 470 may transmit a frame in which a pilot symbol (reference symbol) is included in a middle of the information symbol 703. The frame configuration, including the order in which the symbols are transmitted, is not limited to the configuration in FIG. 12. In FIG. 12, a plurality of symbols may exist in the frequency axis direction. That is, symbols may exist at a plurality of frequencies (a plurality of carriers) in FIG. 12.

In addition, for example, the modulated signal that is transmitted by the third apparatus 1400A and that has the frame configuration in FIG. 20 may be repeatedly transmitted at a regular interval, for example. Accordingly, a plurality of terminals 1050 are able to perform the above-described operation. Likewise, the modulated signal that is transmitted by the fourth apparatus 1400B and that has the frame configuration in FIG. 21 may be repeatedly transmitted at a regular interval, for example. Accordingly, a plurality of terminals 1050 are able to perform the above-described operation.

Figure 22:
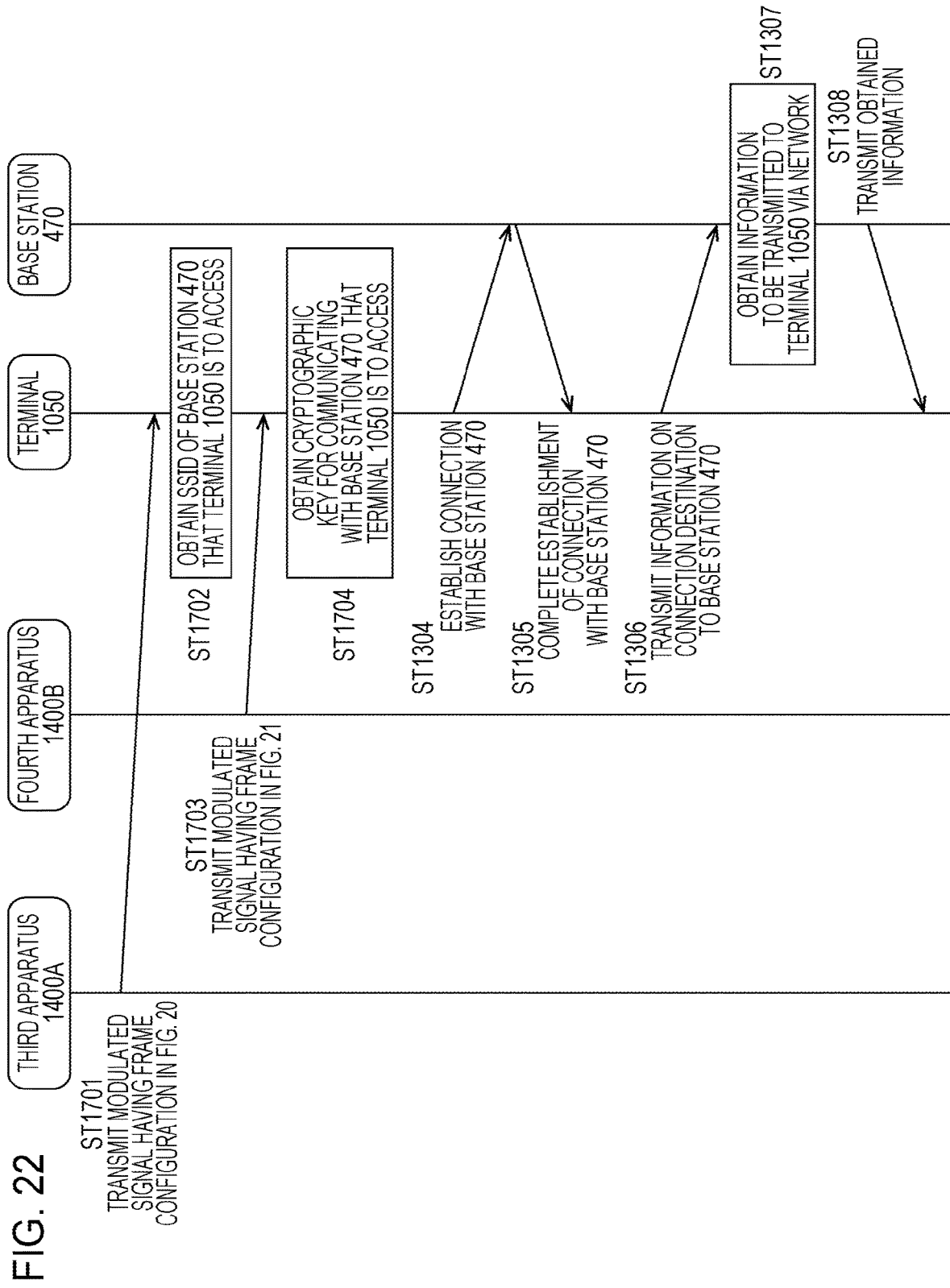
FIG. 22 is a flowchart illustrating an example process in the communication system according to Embodiment 5.

FIG. 22 is a flowchart illustrating a first example of a process performed by the "third apparatus 1400A", the "fourth apparatus 1400B", the "terminal 1050", and the "base station 470" illustrated in FIG. 19. In FIG. 22, the steps similar to those in FIG. 18 are denoted by the same numerals.

First, the third apparatus 1400A transmits a modulated signal having the frame configuration illustrated in FIG. 20 (ST1701).

Subsequently, the terminal 1050 receives the modulated signal transmitted by the third apparatus 1400A and obtains the SSID of the base station 470 that the terminal 1050 is to access (ST1702).

Subsequently, the fourth apparatus 1400B transmits a modulated signal having the frame configuration illustrated in FIG. 21 (ST1703).

Subsequently, the terminal 1050 receives the modulated signal transmitted by the fourth apparatus 1400B and obtains the encryption key to be used for the communication with the base station 470 that the terminal 1050 is to access (ST1704).

Subsequently, the terminal 1050 establishes a connection through a radio wave with the base station 470 (ST1304). The establishment of the connection through a radio wave with the base station 470 is completed upon receipt of a response from the base station 470 by the terminal 1050 (ST1305).

Subsequently, the terminal 1050 transmits information on the connection destination to the base station 470 by using a radio wave (ST1306).

The base station 470 obtains information to be transmitted to the terminal 1050 from the network (ST1307).

Subsequently, the base station 470 transmits the obtained information to the terminal 1050 by using a radio wave, and the terminal 1050 obtains the information (ST1308). The terminal 1050 obtains necessary information from the network via the base station 470 when necessary, for example.

Figure 23:
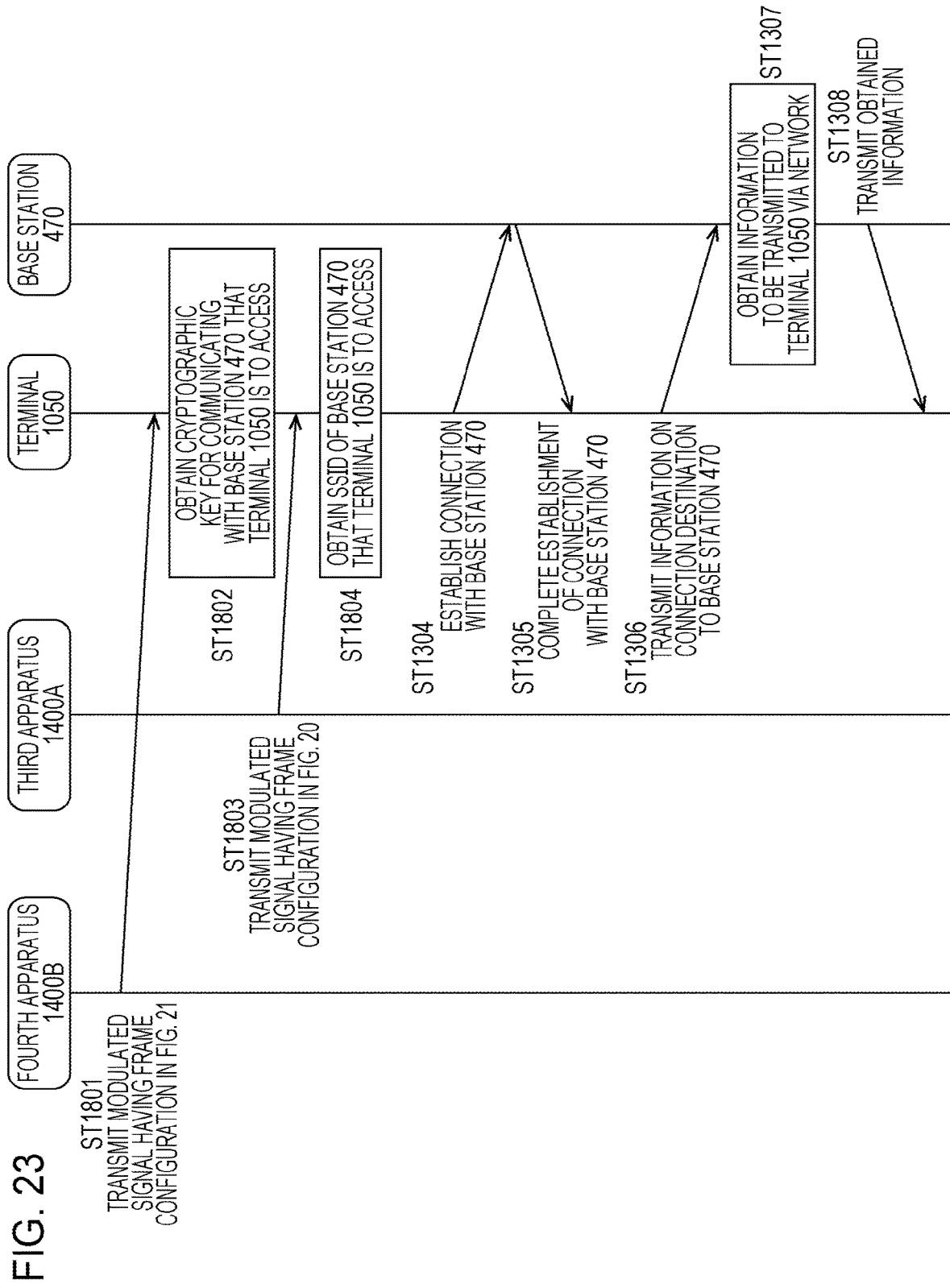
FIG. 23 is a flowchart illustrating another example process in the communication system according to Embodiment 5.

FIG. 23 is a flowchart illustrating a second example of a process performed by the "third apparatus 1400A", the "fourth apparatus 1400B", the "terminal 1050", and the "base station 470" illustrated in FIG. 19. In FIG. 23, the steps similar to those in FIG. 18 are denoted by the same numerals.

First, the fourth apparatus 1400B transmits a modulated signal having the frame configuration illustrated in FIG. 21 (ST1801).

Subsequently, the terminal 1050 receives the modulated signal transmitted by the fourth apparatus 1400B and obtains the encryption key to be used for the communication with the base station 470 that the terminal 1050 is to access (ST1802).

Subsequently, the third apparatus 1400A transmits a modulated signal having the frame configuration illustrated in FIG. 20 (ST1803).

Subsequently, the terminal 1050 receives the modulated signal transmitted by the third apparatus 1400A and obtains the SSID of the base station 470 that the terminal 1050 is to access (ST1804).

Subsequently, the terminal 1050 establishes a connection through a radio wave with the base station 470 (ST1304). The establishment of the connection through a radio wave with the base station 470 is completed upon receipt of a response from the base station 470 by the terminal 1050 (ST1305).

Subsequently, the terminal 1050 transmits information on the connection destination to the base station 470 by using a radio wave (ST1306).

The base station 470 obtains information to be transmitted to the terminal 1050 from the network (ST1307).

Subsequently, the base station 470 transmits the obtained information to the terminal 1050 by using a radio wave, and the terminal 1050 obtains the information (ST1308). The terminal 1050 obtains necessary information from the network via the base station 470 when necessary, for example.

As described above, based on the SSID transmitted by the third apparatus 1400A and the encryption key information transmitted by the fourth apparatus 1400B, the terminal 1050 establishes a connection with the base station 470 and obtains information. That is, the apparatus from which the terminal 1050 obtains SSID information is different from the apparatus from which the terminal 1050 obtains encryption key information, and thus information can be safely obtained via the base station 470 that is safety-guaranteed. This is because, when the terminal 1050 obtains information from a modulated signal of visible light, the user is able to easily determine whether or not the source of the information is safe because modulated signal is visible light. In contrast, for example, when the SSID is obtained from a modulated signal of a radio wave transmitted through a wireless LAN, it is difficult for the user to determine the apparatus that has transmitted the radio wave. Therefore, visible light communication is more suitable for obtaining the SSID than wireless LAN communication in terms of ensuring the safety of information.

In the present embodiment, a description has been given of a case where the fourth apparatus 1400B transmits encryption key information. However, for example, when the base station 470 does not perform encrypted communication using an encryption key, it is sufficient that the third apparatus 1400A transmit only SSID-related information, and the fourth apparatus 1400B does not need to transmit cryptographic key information. In this case, a similar operation can be performed only by removing the component related to the encryption key among the above-described components.

As in the present embodiment, when the apparatus that transmits SSID-related information (the third apparatus 1400A) and the apparatus that transmits encryption-key-related information (the fourth apparatus 1400B) are different from each other, the terminal 1050 is able to communicate with the base station 470 more safely.

Figure 24:
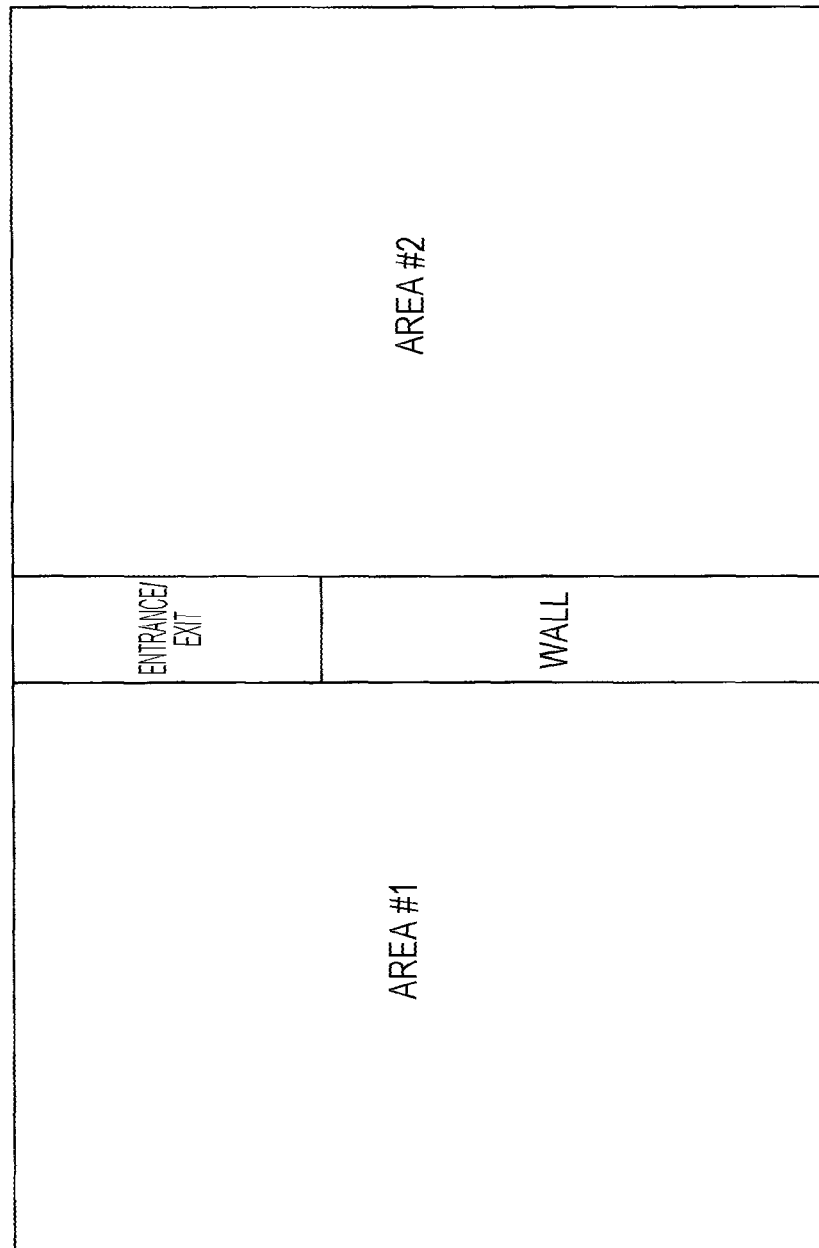
FIG. 24 is a diagram illustrating an example of a space in which the communication system according to Embodiment 5 is disposed.

For example, it is assumed that there is a space illustrated in FIG. 24. In FIG. 24, there are an area #1 and an area #2, and there is an entrance/exit and a wall between the area #1 and the area #2. That is, in the space in FIG. 24, a movement from the area #1 to the area #2, and a movement from the area #2 to the area #1 is possible only through the entrance/exit.

It is assumed that the base station 470, the third apparatus 1400A, and the fourth apparatus 1400B are installed in the area #1 in FIG. 24. On the other hand, it is assumed that only the third apparatus 1400A is installed in the area #2. In addition, it is assumed that, in FIG. 24, the radio wave transmitted by the base station 470 can be received in each of the area #1 and the area #2.

At this time, the terminal 1050 existing in the area #1 where the fourth apparatus 1400B is installed becomes able to communicate with the base station 470 by obtaining the encryption key of the base station 470 from the fourth apparatus 1400B. If the terminal 1050 that has established a connection with the base station 470 in the area #1 moves to the area #2, the terminal 1050 is able to communicate with the base station 470 by using an encryption key that has been obtained from the fourth apparatus 1400B in the area #1. If the terminal 1050 that has established a connection with the base station 470 in the area #1 moves to an area other than the area #1 and the area #2 and then returns to either the area #1 or the area #2, the terminal 1050 is able to communicate with the base station 470 by using the encryption key that has been obtained from the fourth apparatus 1400B in the area #1.

On the other hand, the terminal 1050 that is not able to enter the area #1 is not able to obtain an encryption key from the fourth apparatus 1400B. In this case, the terminal 1050 has only the SSID of the base station (or AP) 470. In this case, for example, the terminal 1050 may be allowed to communicate with the base station 470 by using a service that is available when having only the SSID of the base station 470. The service that is available when having only the SSID of the base station 470 may be more limited than a service that is available when having both the SSID and the encryption key.

Thus, only the terminal 1050 that has been able to enter the area #1 is able to communicate with the base station 470. Accordingly, the safety in communication can be ensured. In addition, it becomes possible to establish a system in which a different service can be provided in each area.

If the terminal 1050 changes the encryption key for communicating with the base station 470 (for example, in each time section), the terminal 1050 holding an encryption key before change is not able to communicate with the base station 470. With such an operation, communication can be performed more safely.

The configuration of the third apparatus and the configuration of the fourth apparatus are not limited to the configuration of the third apparatus 1400A and the configuration of the fourth apparatus 1400B illustrated in FIG. 19, respectively. The configuration of the terminal is not limited to the configuration of the terminal 1050 illustrated in FIG. 19. The connection destination and the configuration of the base station are not limited to the connection destination and the configuration of the base station 470 illustrated in FIG. 19.

FIG. 19 illustrates a case where there is a single base station 470, but there may be a plurality of base stations (or APs) accessible to the terminal 1050 (safe base stations). At this time, the SSID-related symbol transmitted by the third apparatus 1400A in FIG. 19 may include information indicating the SSIDs of the plurality of base stations 470. The encryption-key-related symbol transmitted by the fourth apparatus 1400B in FIG. 19 may include information about encryption keys to be used to connect to the plurality of base stations. In this case, a list of the SSIDs of the plurality of base stations and/or a list of a plurality of access destinations is displayed on the display 157 of the terminal 1050 in FIG. 19, as an access destination display operation (the above-described "first display operation"). Based on the information on the SSIDs and encryption keys of the plurality of base stations, the terminal 1050 in FIG. 19 may select one or more base stations to be actually connected in a wireless manner (i.e., may simultaneously establish connections with the plurality of base stations).

For example, it is assumed that there are three base stations 470. Here, the three base stations 470 are referred to as a base station #A, a base station #B, and a base station #C. Also, it is assumed that the SSID of the base station #A is "abcdef", the SSID of the base station #B is "ghijk", and the SSID of the base station #C is "pqrstu". Also, it is assumed that the encryption key for connecting to the base station #A is "123", the encryption key for connecting to the base station #B is "456", and the encryption key for connecting to the base station #C is "789".

In this case, the SSID-related symbol 600-1 in the frame configuration in FIG. 20 of the modulated signal transmitted by the third apparatus 1400A includes information indicating that "the SSID of the base station #A is 'abcdef'", "the SSID of the base station #B is 'ghijk'", and "the SSID of the base station #C is 'pqrstu'". The encryption-key-related symbol 1101 in the frame configuration in FIG. 21 of the modulated signal transmitted by the fourth apparatus 1400B includes information indicating that "the encryption key for connecting to the base station #A is '123'", "the encryption key for connecting to the base station #B is '456'", and "the encryption key for connecting to the base station #C is '789'".

The terminal 1050 in FIG. 19 receives the SSID-related symbol 600-1 and obtains the information indicating that "the SSID of the base station #A is 'abcdef'", "the SSID of the base station #B is 'ghijk'", and "the SSID of the base station #C is 'pqrstu'". Also, the terminal 1050 receives the encryption-key-related symbol 1101 and obtains the information indicating that "the encryption key for connecting to the base station #A is '123'", "the encryption key for connecting to the base station #B is '456'", and "the encryption key for connecting to the base station #C is '789'". Based on these pieces of information, the terminal 1050 selects a base station to be connected in a wireless manner (for example, by using a radio wave), and establishes the connection.

As in the present embodiment, with the base station 470 to be accessed by the terminal 1050 being set by using a light source, such as an LED, it becomes unnecessary to provide a mode for a special setting for performing a procedure for connection through wireless communication between the terminal 1050 and the base station 470 on a modulated signal for wireless communication transmitted by the terminal 1050. Also, it becomes unnecessary to provide a mode for a special setting for performing a procedure for connection through wireless communication between the terminal 1050 and the base station 470 on a modulated signal transmitted by the base station 470. Accordingly, in the present embodiment, the data transmission efficiency of wireless communication can be increased.

As described above, the encryption key may be an encryption key for an SSID of a wireless LAN, or may be an encryption key for limiting a connection style, a service style, a connection range of a network, or the like. That is, it is sufficient that an encryption key be introduced to limit something.

Embodiment 6

Figure 25:
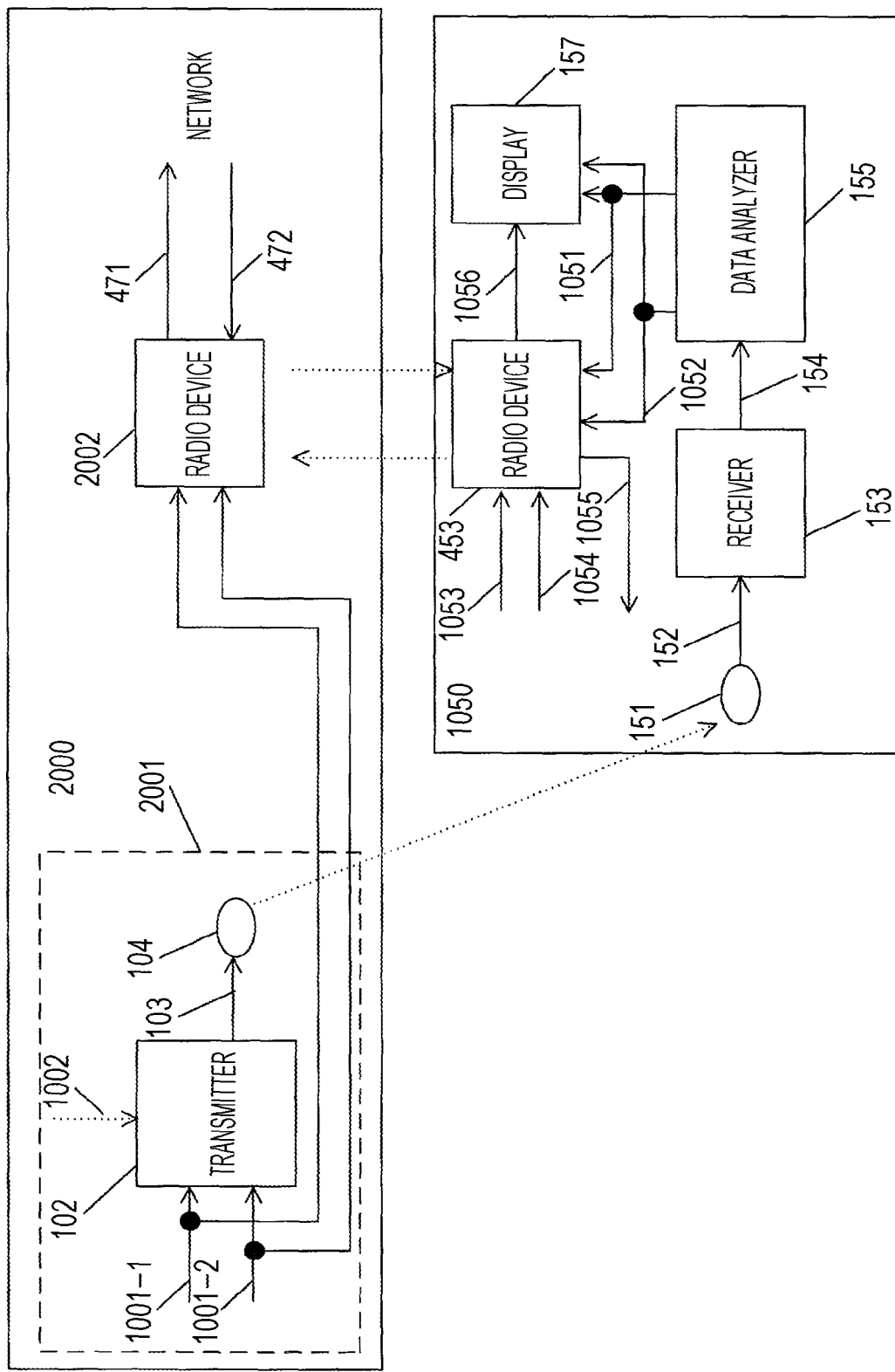
FIG. 25 is a diagram illustrating an example configuration of a communication system according to Embodiment 6.

FIG. 25 is a diagram illustrating an example of the configuration of a communication system in the present embodiment.

The communication system in FIG. 25 includes, for example, a base station 2000 and the terminal 1050. The base station 2000 includes a transmission device 2001 and a radio device 2002. In FIG. 25, the components that operate similarly to those in FIG. 6 or 15 are denoted by the same numerals. The communication between the radio device 2002 and the radio device 453 in FIG. 25 is performed by using a radio wave, for example.

The transmission device 2001 of the base station (or AP) 2000 in FIG. 25 includes, for example, a visible light source, a lighting device, a light source, or a light (hereinafter referred to as the light source 104), such as an LED. First, a description will be given of an operation of the transmission device 2001 (i.e., "the portion related to a visible light source, a lighting device, a light source, or a light, such as an LED").

In the transmission device 2001, the transmitter 102 receives the SSID-related information 1001-1, the encryption-key-related information 1001-2, and the data 1002 as input. Based on these input signals, the transmitter 102 generates the (light) modulated signal 103 and outputs the modulated signal 103. The modulated signal 103 is transmitted, for example, from the light source 104.

Next, a description will be given of the SSID-related information 1001-1 and the encryption-key-related information 1001-2.

First, a description will be given of the SSID-related information 1001-1.

The SSID-related information 1001-1 is information indicating the SSID of the radio device 2002 using a radio wave of the base station 2000 in FIG. 25. That is, the transmission device 2001 is able to provide the terminal 1050 with access to the radio device 2002, which is a safe wireless access destination. Accordingly, the terminal 1050 in FIG. 25 is able to safely obtain information from the radio device 2002.

On the other hand, the transmission device 2001 is able to limit the terminal that accesses the radio device 2002 to a terminal positioned in a space where a light signal transmitted (emitted) by the transmission device 2001 can be received.

When the terminal 1050 receives a light signal transmitted in a predetermined scheme, the terminal 1050 may determine that the notified SSID is the SSID of a safe base station. The terminal 1050 may separately perform a process of determining whether or not the notified SSID is safe. For example, the transmission device 2001 may transmit a light signal including a predetermined identifier, and the terminal

1050 may determine, based on the received identifier, whether or not the notified SSID is the SSID of a safe base station.

FIG. 25 illustrates a single base station 2000. For example, also when a base station (or AP) other than the base station 2000 exists, the terminal 1050 accesses the radio device 2002 of the base station 2000 by using the SSID and the encryption key obtained from the transmission device 2001 and obtains information.

Next, a description will be given of the encryption-key-related information 1001-2.

The encryption-key-related information 1001-2 is information about an encryption key that is necessary for the terminal 1050 to communicate with the radio device 2002. The terminal 1050 obtains the encryption-key-related information 1001-2 from the transmission device 2001, thereby becoming able to perform encrypted communication with the radio device 2002.

The SSID-related information 1001-1 and the encryption-key-related information 1001-2 have been described above.

The terminal 1050 in FIG. 25 receives a modulated signal transmitted by the transmission device 2001. In the terminal 1050 in FIG. 25, the components that operate similarly to those of the terminal 150 in FIG. 6 or those of the terminal 1050 in FIG. 15 are denoted by the same numerals.

The light receiver 151 included in the terminal 1050 is, for example, an image sensor, such as a CMOS sensor or an organic CMOS sensor. The light receiver 151 receives light including the modulated signal transmitted by the transmission device 2001 and outputs the reception signal 152.

The receiver 153 receives the reception signal 152 received by the light receiver 151 as input, performs processing, such as demodulation and error-correction decoding, on the modulated signal included in the reception signal 152, and outputs the reception data 154.

The data analyzer 155 receives the reception data 154 as input and outputs, for example, the SSID information 1051 on the radio device 2002 of the base station 2000 as a connection destination and the encryption key information 1052 for communicating with the radio device 2002 of the base station 2000 as the connection destination, which are included in the reception data. For example, in a wireless local area network (LAN), Wired Equivalent Privacy (WEP), Wi-Fi Protected Access (WPA), and Wi-Fi Protected Access 2 (WPA2) (Pre-Shared Key (PSK) mode, Extended Authentication Protocol (EAP) mode) are available as an encryption scheme. Note that the encryption scheme is not limited thereto.

The display 157 receives the SSID information 1051 and the encryption key information 1052 as input, and displays, for example, the SSID and the encryption key of a communication partner that the radio device 453 included in the terminal 1050 is to access (this display operation is referred to as a "first display operation" in the present embodiment).

For example, after the first display operation, the radio device 453 receives the SSID information 1051 and the encryption key information 1052 as input, and establishes a connection with the radio device 2002 of base station 2000 (for example, a radio wave is used for the connection). At this time, when the radio device 2002 of the base station 2000 communicates with the radio device 453 included in the terminal 1050, the radio device 2002 transmits a modulated signal by using a radio wave, for example.

After that, the radio device 453 receives the data 1053 and the control signal 1054 as input, modulates the data 1053 in accordance with control indicated by the control signal 1054, and transmits a modulated signal by using a radio wave.

Subsequently, for example, the radio device 2002 of the base station 2000 performs data transmission (471) by using a network and data reception (472) by using the network. After that, for example, the radio device 2002 of the base station 2000 transmits a modulated signal to the terminal 1050 by using a radio wave.

The radio device 453 included in the terminal 1050 performs processing, such as demodulation and error-correction decoding, on the modulated signal received by using a radio wave, and obtains the reception data 1056. The display 157 performs display based on the reception data 1056.

The frame configuration of the modulated signal transmitted by the radio device 2002 of the base station 2000 in the present embodiment is similar to the frame configuration in FIG. 16 described in Embodiment 4. That is, in FIG. 16, the SSID-related symbol 600-1 is a symbol for transmitting the SSID-related information 1001-1 in FIG. 25, and the encryption-key-related symbol 1101 is a symbol for transmitting the encryption-key-related information 1001-2 in FIG. 25. The data symbol 1102 is a symbol for transmitting the data 1002 in FIG. 25.

As illustrated in FIG. 16, the radio device 2002 of the base station 2000 transmits the preamble 201, the control information symbol 202, the SSID-related symbol 600-1, the encryption-key-related symbol 1101, and the data symbol 1102. The radio device 2002 of the base station 2000 may transmit a frame including a symbol other than the symbols illustrated in FIG. 16. The frame configuration, including the order in which the symbols are transmitted, is not limited to the configuration in FIG. 16.

The frame configuration of the modulated signal transmitted by the radio device 453 of the base station 1050 in the present embodiment is similar to the frame configuration in FIG. 17 described in Embodiment 4. That is, as illustrated in FIG. 17, the radio device 453 included in the terminal 1050 in FIG. 25 transmits, for example, the preamble 1201, and then transmits the control information symbol 1202 and the information symbol 1203.

At this time, the preamble 1201 is a symbol by which the radio device 2002 of the base station 2000 that receives the modulated signal transmitted by radio device 453 performs, for example, signal detection, time synchronization, frame synchronization, frequency synchronization, frequency offset estimation, and the like.

The control information symbol 1202 is a symbol including, for example, data of information about an error-correction coding scheme and a modulation scheme that are used by the terminal 1050 to generate the modulated signal, information about the frame configuration, and information about a transmission method. The radio device 2002 of the base station 2000 performs demodulation or the like on the modulated signal based on the information included in the control information symbol 1202.

The information symbol 1203 is a symbol by which the radio device 453 of the terminal 1050 transmits data.

The radio device 453 of the terminal 1050 may transmit a frame including a symbol other than the symbols illustrated in FIG. 17. For example, the radio device 453 may transmit a frame in which a pilot symbol (reference symbol) is included in a middle of the information symbol 1203. The frame configuration, including the order in which the symbols are transmitted, is not limited to the configuration in FIG. 17. In FIG. 17, a plurality of symbols may exist in the frequency axis direction. That is, symbols may exist at a plurality of frequencies (a plurality of carriers) in FIG. 17.

The frame configuration of the modulated signal transmitted by the radio device 2002 in the present embodiment is similar to the frame configuration in FIG. 12 described in Embodiment 3. That is, as illustrated in FIG. 12, the radio device 2002 transmits, for example, the preamble 701, and then transmits the control information symbol 702 and the information symbol 703.

The preamble 701 is a symbol by which the radio device 453 of the terminal 1050 that receives the modulated signal transmitted by the radio device 2002 performs, for example, signal detection, time synchronization, frame synchronization, frequency synchronization, frequency offset estimation, and the like.

The control information symbol 702 is a symbol including, for example, data of information about an error-correction coding scheme and a modulation scheme that are used to generate the modulated signal, information about the frame configuration, and information about a transmission method. The radio device 453 of the terminal 1050 performs demodulation or the like on the modulated signal based on the information of the control information symbol 702.

The information symbol 703 is a symbol by which the radio device 2002 transmits data.

The radio device 2002 of the base station 2000 illustrated in FIG. 25 may transmit a frame including a symbol other than the symbols illustrated in FIG. 12. For example, the radio device 2002 may transmit a frame in which a pilot symbol (reference symbol) is included in a middle of the information symbol 703. The frame configuration, including the order in which the symbols are transmitted, is not limited to the configuration in FIG. 12. In FIG. 12, a plurality of symbols may exist in the frequency axis direction. That is, symbols may exist at a plurality of frequencies (a plurality of carriers) in FIG. 12.

In addition, for example, the modulated signal that is transmitted by the transmission device 2001 and that has the frame configuration in FIG. 16 may be repeatedly transmitted at a regular interval, for example. Accordingly, a plurality of terminals 1050 are able to perform the above-described operation.

Figure 26:
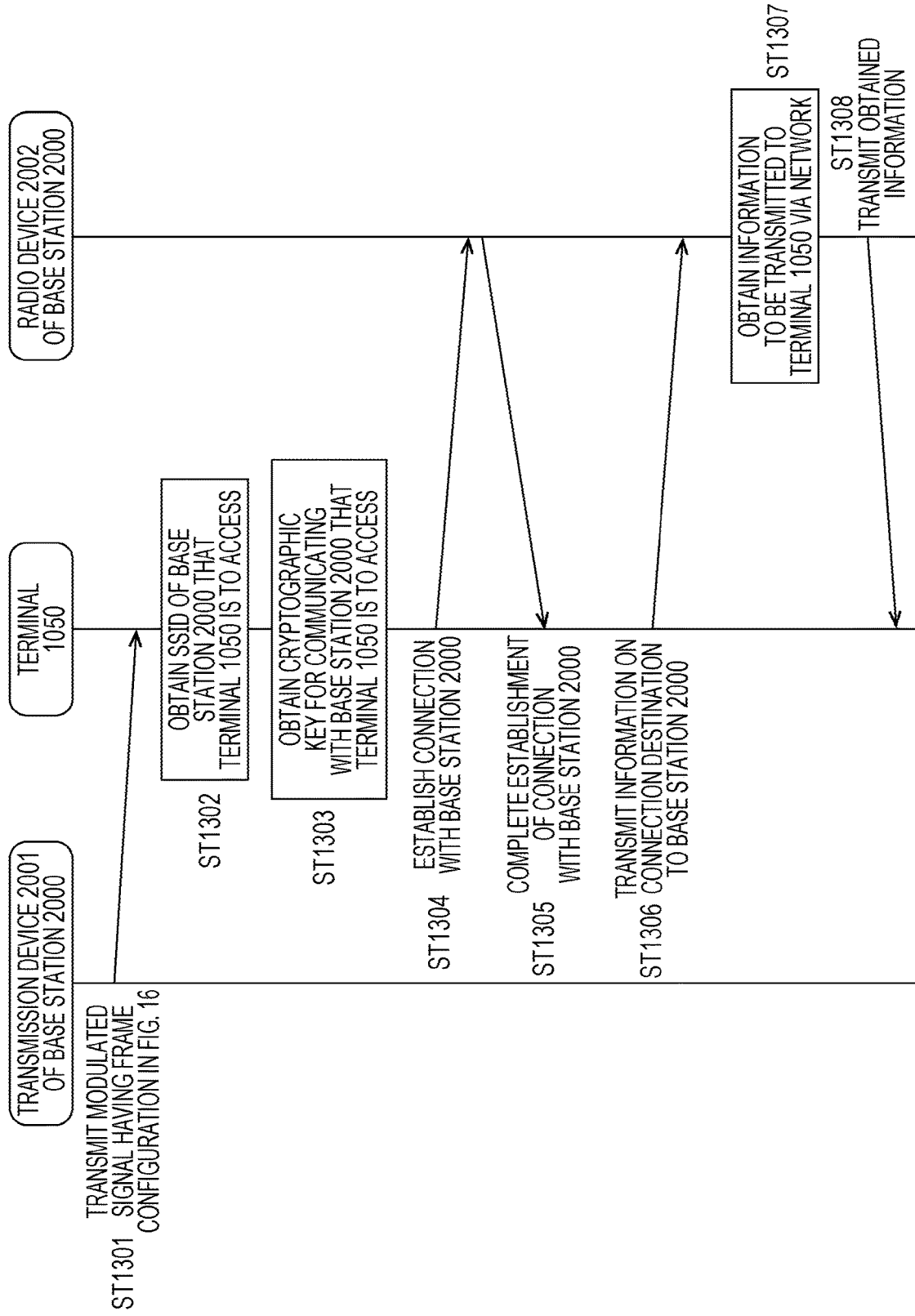
FIG. 26 is a flowchart illustrating an example process in the communication system according to Embodiment 6.

FIG. 26 is a flowchart illustrating an example of a process performed by the "transmission device 2001 of the base station 2000", the "terminal 1050", and the "radio device 2002 of the base station 2000" illustrated in FIG. 25.

First, the transmission device 2001 transmits a modulated signal having the frame configuration in FIG. 16 (ST1301).

Subsequently, the terminal 1050 receives the modulated signal transmitted by the transmission device 2001 and obtains the SSID of the base station 2000 (radio device 2002) that the terminal 1050 is to access (ST1302).

Also, the terminal 1050 obtains an encryption key to be used for communication with the base station 2000 (radio device 2002) that the terminal 1050 is to access (ST1303).

Subsequently, the terminal 1050 establishes a connection through a radio wave with the radio device 2002 of the base station 2000 (ST1304). The establishment of the connection between the terminal 1050 and the radio device 2002 of the base station 2000 is completed upon receipt of a response from the radio device 2002 of the base station 2000 by the terminal 1050 (ST1305).

Subsequently, the terminal 1050 transmits information on the connection destination to the radio device 2002 of the base station 2000 by using a radio wave (ST1306).

The radio device 2002 of the base station 2000 obtains information to be transmitted to the terminal 1050 from the network (ST1307).

Subsequently, the radio device 2002 of the base station 2000 transmits the obtained information to the terminal 1050 by using a radio wave, and the terminal 1050 obtains the information (ST1308). The terminal 1050 obtains necessary information from the network via the radio device 2002 of the base station 2000 when necessary, for example.

As described above, based on the SSID information and the encryption key information transmitted by the transmission device 2001 of the base station 2000, the terminal 1050 establishes a connection with the radio device 2002 of the base station 2000 and obtains information, thereby being able to safely obtain the information via the base station 2000 that is safety-guaranteed. This is because, when the terminal 1050 obtains information from a modulated signal of visible light, the user is able to easily determine whether or not the source of the information is safe because the modulated signal is visible light. In contrast, for example, when the SSID is obtained from a modulated signal of a radio wave transmitted through a wireless LAN, it is difficult for the user to determine the apparatus that has transmitted the radio wave. Therefore, visible light communication is more suitable for obtaining the SSID than wireless LAN communication in terms of ensuring the safety of information.

In the present embodiment, a description has been given of a case where the transmission device 2001 transmits encryption key information. However, for example, when the radio device 2002 of the base station 2000 does not perform encrypted communication using an encryption key, it is sufficient that the transmission device 2001 transmit only SSID-related information, not encryption key information. In this case, a similar operation can be performed only by removing the component related to the encryption key among the components of the transmission device 2001.

As illustrated in FIG. 25, the SSID and the encryption key of the radio device 2002 of the base station 2000 may be configured to be rewritable. For example, in FIG. 25, the SSID-related information 1001-1 and the encryption-key-related information 1001-2 are input to the radio device 2002. The radio device 2002 of the base station 2000 rewrites the SSID and the encryption key by using the SSID-related information 1001-1 and the encryption-key-related information 1001-2 that have been input. Accordingly, the safety of the communication between the terminal 1050 and the radio device 2002 of the base station 2000 is further ensured. In FIG. 25, the radio device 2002 of the base station 2000 has a function of rewriting the SSID and the encryption key, but the radio device 2002 may be unable to rewrite both or either of the SSID and the encryption key.

The configuration of the transmission device is not limited to the configuration of the transmission device 2001 illustrated in FIG. 25, the configuration of the terminal is not limited to the configuration of the terminal 1050 illustrated in FIG. 25, and the connection destination and the configuration of the radio device are not limited to the connection destination and the configuration of the radio device 2002 illustrated in FIG. 25.

FIG. 25 illustrates a case where there is a single base station 2000, but there may be radio devices 2002 of a plurality of base stations (or APs) 2000 accessible to the terminal 1050 (safe base stations). The radio devices 2002 of the plurality of base stations 2000 and the terminal 1050 each transmit/receive a modulated signal by using a radio wave. At this time, the SSID-related symbol transmitted by the transmission device 2001 in FIG. 25 may include information indicating the SSIDs of the radio devices 2002 of the plurality of base stations 2000. The encryption-key-related symbol transmitted by the transmission device 2001 in FIG. 25 may include information indicating the encryption keys that are used to connect to the radio devices 2002 of the plurality of base stations 2000. Based on the information indicating the SSIDs and encryption keys of the radio devices 2002 of the plurality of base stations 2000, the terminal 1050 in FIG. 25 may select the radio device 2002 of the base station 2000 to be connected in a wireless manner (for example, by using a radio wave) (or may establish connections with the radio devices of the plurality of base stations).

For example, it is assumed that there are three base stations 2000 each including the radio device 2002. Here, the radio devices 2002 of the three base stations 2000 are referred to as a radio device #A, a radio device #B, and a radio device #C. Also, it is assumed that the SSID of the radio device #A is "abcdef", the SSID of the radio device #B is "ghijk", and the SSID of the radio device #C is "pqrstu". Also, it is assumed that the encryption key for connecting to the radio device #A is "123", the radio device for connecting to the radio device #B is "456", and the encryption key for connecting to the radio device #C is "789".

In this case, the SSID-related symbol 600-1 in the frame configuration in FIG. 16 of the modulated signal transmitted by the transmission device 2001 includes information indicating that "the SSID of the radio device #A is 'abcdef'", "the SSID of the radio device #B is 'ghijk'", and "the SSID of the radio device #C is 'pqrstu'". The encryption-key-related symbol 1101 in the frame configuration in FIG. 16 includes information indicating that "the encryption key for connecting to the radio device #A is '123'", "the encryption key for connecting to the radio device #B is '456'", and "the encryption key for connecting to the radio device #C is '789'".

The terminal 1050 in FIG. 25 receives the SSID-related symbol 600-1 and obtains the information indicating that "the SSID of the radio device #A is 'abcdef'", "the SSID of the radio device #B is 'ghijk'", and "the SSID of the radio device #C is 'pqrstu'". Also, the terminal 1050 receives the encryption-key-related symbol 1101 and obtains the information indicating that "the encryption key for connecting to the radio device #A is '123'", "the encryption key for connecting to the radio device #B is '456'", and "the encryption key for connecting to the radio device #C is '789'". Based on these pieces of information, the terminal 1050 selects a base station to be connected in a wireless manner (for example, by using a radio wave), and establishes the connection.

As in the present embodiment, with the radio device 2002 of the base station 2000 to be accessed by the terminal 1050 being set by using a light source, such as an LED, it becomes unnecessary to provide a mode for a special setting for performing a procedure for connection through wireless communication between the terminal 1050 and the base station 2000 on a modulated signal for wireless communication transmitted by the terminal 1050. Also, it becomes unnecessary to provide a mode for a special setting for performing a procedure for connection through wireless communication between the terminal 1050 and the base station 2000 on a modulated signal transmitted by the base station 2000. Accordingly, in the present embodiment, the data transmission efficiency of wireless communication can be increased.

As described above, the encryption key may be an encryption key for an SSID of a wireless LAN, or may be an encryption key for limiting a connection style, a service style, a connection range of a network, or the like. That is, it is sufficient that an encryption key be introduced to limit something.

Embodiment 7

Figure 27:
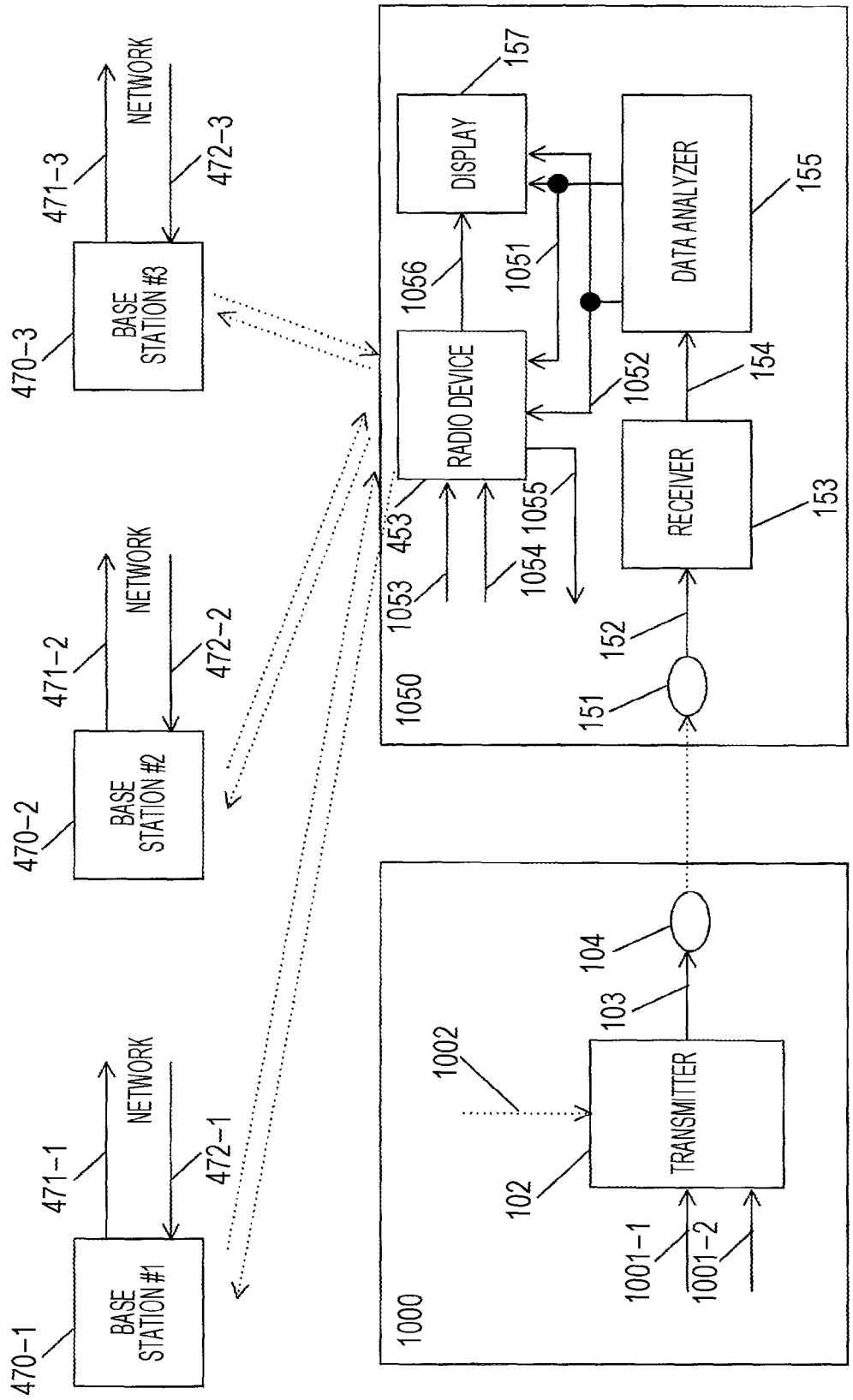
FIG. 27 is a diagram illustrating an example configuration of a communication system according to Embodiment 7.

FIG. 27 is a diagram illustrating an example of the configuration of a communication system in the present embodiment.

The communication system in FIG. 27 includes the apparatus 1000, the terminal 1050, and a base station (or AP) 470-1 (base station #1), a base station (or AP) 470-2 (base station #2), and a base station (or AP) 470-3 (base station #3) that communicates with the terminal 1050. In FIG. 27, the components that operate similarly to those in FIG. 6, 9, or 15 are denoted by the same numerals.

The apparatus 1000 includes, for example, a visible light, a lighting device, a light source, or a light (light source 104), such as an LED. Hereinafter, the apparatus 1000 will be referred to as a "fifth apparatus" in the present embodiment. It is assumed that the communication between the radio device 453 and the base station 470-1 (base station #1), the communication between the radio device 453 and the base station 470-2 (base station #2), and the communication between the radio device 453 and the base station 470-3 (base station #3) in FIG. 27 are performed by using a radio wave, for example.

In the fifth apparatus 1000 in FIG. 27, the transmitter 102 receives the SSID-related information 1001-1, the encryption-key-related information 1001-2, and the data 1002 as input, generates the (light) modulated signal 103 based on these input signals, and outputs the modulated signal 103. The modulated signal 103 is transmitted, for example, from the light source 104.

Next, a description will be given of the SSID-related information 1001-1 and the encryption-key-related information 1001-2.

First, a description will be given of the SSID-related information 1001-1.

The SSID-related information 1001-1 includes, for example, information indicating the SSID of the base station 470-1 (base station #1), information indicating the SSID of the base station 470-2 (base station #2), and information indicating the SSID of the base station 470-3 (base station #3) in FIG. 27. For example, each of the base stations 470-1, 470-2, and 470-3 transmits a modulated signal by using a radio wave and receives a modulated signal, which is a radio wave. That is, the fifth apparatus 1000 is able to provide the terminal 1050 with access to the base stations 470-1, 470-2, and 470-3, which are safe access destinations. Accordingly, the terminal 1050 in FIG. 27 is able to safely obtain information from the base stations 470-1, 470-2, and 470-3.

On the other hand, the fifth apparatus 1000 is able to limit the terminal that accesses the base stations 470-1, 470-2, and 470-3 to a terminal positioned in a space where a light signal transmitted (emitted) by the fifth apparatus 1000 can be received.

When the terminal 1050 receives a light signal transmitted in a predetermined scheme, the terminal 1050 may determine that the notified SSID is the SSID of a safe base station. The terminal 1050 may separately perform a process of determining whether or not the notified SSID is safe. For example, the fifth apparatus 1000 may transmit a light signal including a predetermined identifier, and the terminal 1050 may determine, based on the received identifier, whether or not the notified SSID is the SSID of a safe base station.

In FIG. 27, there are the base stations 470-1, 470-2, and 470-3. For example, there may be a base station (or AP) other than the base stations 470-1, 470-2, and 470-3.

Next, a description will be given of the encryption-key-related information 1001-2.

The encryption-key-related information 1001-2 is information about an encryption key that is necessary for the terminal 1050 to communicate with the base stations 470-1, 470-2, and 470-3. The terminal 1050 obtains the encryption-key-related information 1001-2 from the fifth apparatus 1000, thereby becoming able to perform encrypted communication "between the terminal 1050 and the base station 470-1", "between the terminal 1050 and the base station 470-2", and "between the terminal 1050 and the base station 470-3".

The SSID-related information 1001-1 and the encryption-key-related information 1001-2 have been described above.

The terminal 1050 in FIG. 27 receives a modulated signal transmitted by the fifth apparatus 1000. In the terminal 1050 in FIG. 27, the components that operate similarly to those of the terminal 150 in FIG. 6 or those of the terminal 450 in FIG. 9 are denoted by the same numerals.

The light receiver 151 included in the terminal 1050 is, for example, an image sensor, such as a CMOS sensor or an organic CMOS sensor. The light receiver 151 receives light including the modulated signal transmitted by the fifth apparatus 1000 and outputs the reception signal 152.

The receiver 153 receives the reception signal 152 received by the light receiver 151 as input, performs processing, such as demodulation and error-correction decoding, on the modulated signal included in the reception signal 152, and outputs the reception data 154.

The data analyzer 155 receives the reception data 154 as input and outputs, for example, the SSID information 1051 on the base stations 470-1, 470-2, and 470-3 as connection destinations and the encryption key information 1052 for communicating with the base stations 470-1, 470-2, and 470-3 as the connection destinations, which are included in the reception data 154. For example, in a wireless local area network (LAN), Wired Equivalent Privacy (WEP), Wi-Fi Protected Access (WPA), and Wi-Fi Protected Access 2 (WPA2) (Pre-Shared Key (PSK) mode, Extended Authentication Protocol (EAP) mode) are available as an encryption scheme. Note that the encryption scheme is not limited thereto.

The display 157 receives the SSID information 1051 and the encryption key information 1052 as input, and displays, for example, the SSID and the encryption key of a communication partner that the radio device 453 included in the terminal 1050 is to access (this display operation is referred to as a "first display operation" in the present embodiment).

For example, after the first display operation, the radio device 453 receives the SSID information 1051 and the encryption key information 1052 as input, and establishes a connection with any of the base stations 470-1, 470-2, and 470-3 (for example, a radio wave is used for the connection). At this time, when the connected base station 470 communicates with the radio device 453 included in the terminal 1050, the base station 470 transmits a modulated signal by using a radio wave, for example.

After that, the radio device 453 receives the data 1053 and the control signal 1054 as input, modulates the data 1053 in accordance with control indicated by the control signal 1054, and transmits a modulated signal as a radio wave.

Subsequently, for example, the connected base station 470 performs data transmission (any of 471-1, 471-2, and 471-3) by using a network and data reception (472-1, 472-2, and 472-3) by using the network. After that, for example, the connected base station 470 transmits a modulated signal to the terminal 1050 by using a radio wave.

The radio device 453 included in the terminal 1050 performs processing, such as demodulation and error-correction decoding, on the modulated signal received by using a radio wave, and obtains the reception data 1056. The display 157 performs display based on the reception data 1056.

Figure 28:
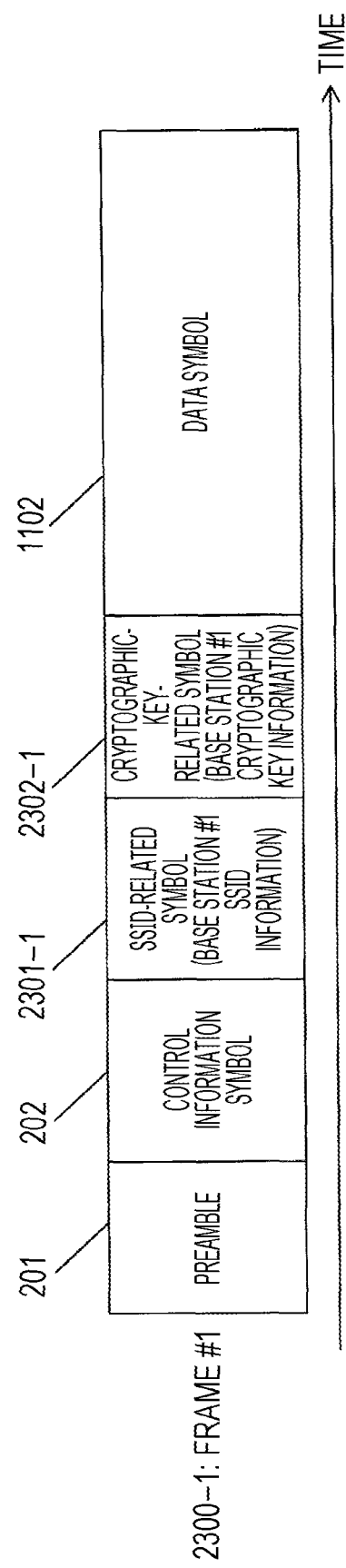
FIG. 28 is a diagram illustrating an example frame configuration of a modulated signal transmitted by a fifth apparatus according to Embodiment 7.
Figure 29:
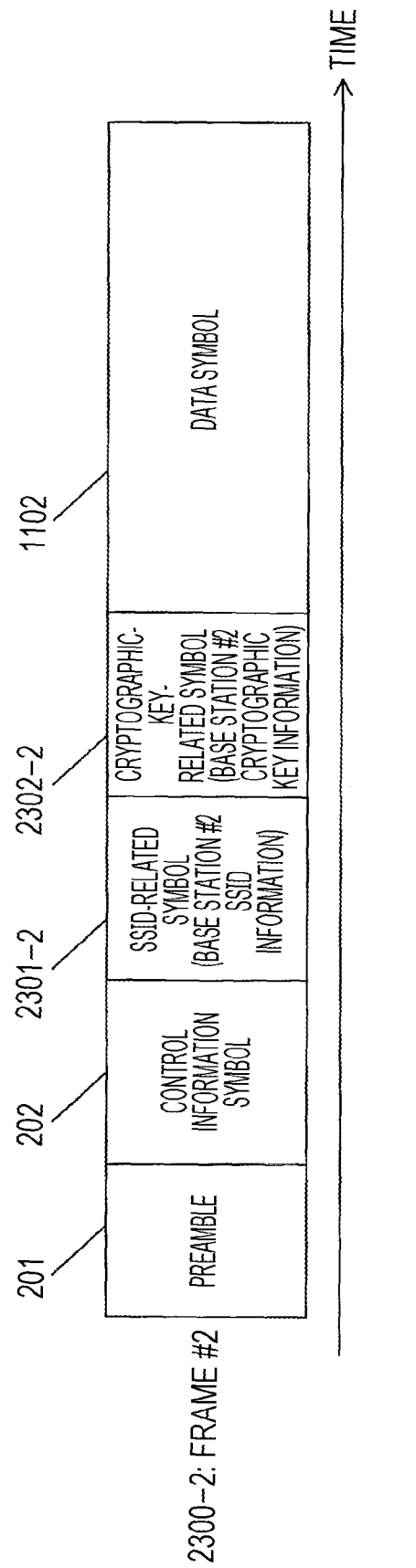
FIG. 29 is a diagram illustrating an example frame configuration of a modulated signal transmitted by the fifth apparatus according to Embodiment 7.
Figure 30:
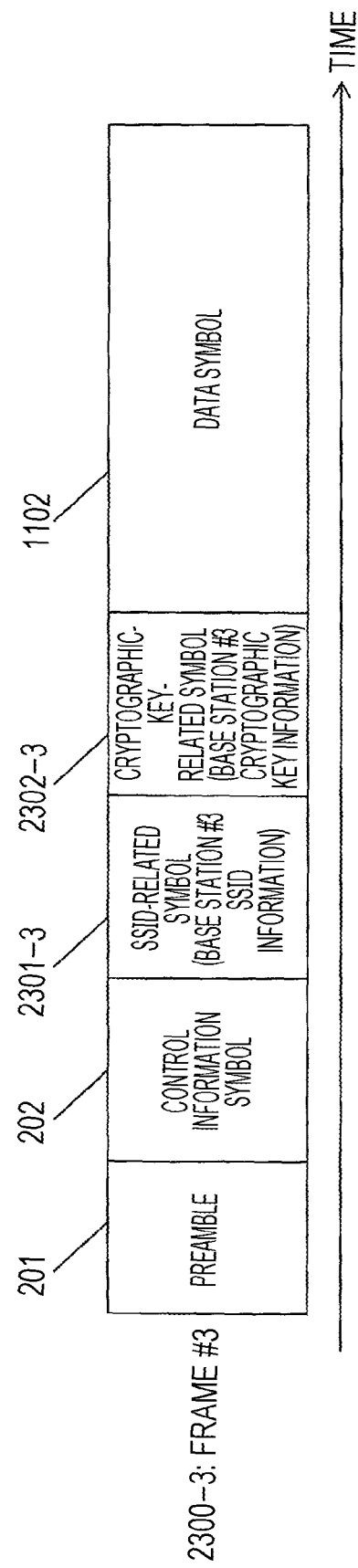
FIG. 30 is a diagram illustrating an example frame configuration of a modulated signal transmitted by the fifth apparatus according to Embodiment 7.

In the case of FIG. 27, there are three types of frame configurations of the modulated signal transmitted by the fifth apparatus 1000. FIG. 28 illustrates a frame 2300-1 (frame #1), which is one of the three types of frame configurations, FIG. 29 illustrates a frame 2300-2 (frame configuration #2), which is one of the three types of frame configurations, and FIG. 30 illustrates a frame 2300-3 (frame configuration #3), which is one of the three types of frame configurations.

FIG. 28 illustrates an example of the configuration of the frame 2300-1 (frame #1) of the modulated signal transmitted by the fifth apparatus 1000. In FIG. 28, the horizontal axis indicates time. In FIG. 28, the symbols similar to those in FIG. 2 or 16 are denoted by the same numerals, and the description thereof is omitted. The frame 2300-1 (frame #1) in FIG. 28 is a frame for transmitting information on the SSID of the base station 470-1 (base station #1) in FIG. 27 and information on the encryption key of the base station 470-1 (base station #1) (the encryption key for accessing the base station 470-1).

An SSID-related symbol 2301-1 is a symbol for transmitting the SSID-related information 1001-1 in FIG. 27. The SSID-related symbol 2301-1 is a symbol by which the fifth apparatus 1000 in FIG. 27 transmits the SSID of the base station 470-1 (base station #1).

A encryption-key-related symbol 2302-1 is a symbol for transmitting the encryption-key-related information 1001-2 in FIG. 27. The encryption-key-related symbol 2302-1 is a symbol by which the fifth apparatus 1000 in FIG. 27 transmits the encryption key of the base station 470-1 (base station #1) (the encryption key for accessing the base station 470-1).

The fifth apparatus 1000 transmits the preamble 201, the control information symbol 202, the SSID-related symbol 2301-1, the encryption-key-related symbol 2302-1, and the data symbol 1102. The fifth apparatus 1000 may transmit the frame 2300-1 (frame #1) including a symbol other than the symbols illustrated in FIG. 28. The configuration of the frame 2300-1 (frame #1), including the order in which the symbols are transmitted, is not limited to the configuration in FIG. 28.

FIG. 29 illustrates an example of the configuration of the frame 2300-2 (frame #2) of the modulated signal transmitted by the fifth apparatus 1000. In FIG. 29, the horizontal axis indicates time. In FIG. 29, the symbols similar to those in FIG. 2 or 16 are denoted by the same numerals, and the description thereof is omitted. The frame 2300-2 (frame #2) in FIG. 29 is a frame for transmitting information on the SSID of the base station 470-2 (base station #2) in FIG. 27 and information on the encryption key of the base station 470-2 (base station #2) (the encryption key for accessing the base station 470-2).

An SSID-related symbol 2301-2 is a symbol for transmitting the SSID-related information 1001-1 in FIG. 27. The SSID-related symbol 2301-2 is a symbol by which the fifth apparatus 1000 in FIG. 27 transmits the SSID of the base station 470-2 (base station #2).

A encryption-key-related symbol 2302-2 is a symbol for transmitting the encryption-key-related information 1001-2 in FIG. 27. The encryption-key-related symbol 2302-2 is a symbol by which the fifth apparatus 1000 in FIG. 27 transmits the encryption key of the base station 470-2 (base station #2) (the encryption key for accessing the base station 470-2).

The fifth apparatus 1000 transmits the preamble 201, the control information symbol 202, the SSID-related symbol 2301-2, the encryption-key-related symbol 2302-2, and the data symbol 1102. The fifth apparatus 1000 may transmit the frame 2300-2 (frame #2) including a symbol other than the symbols illustrated in FIG. 29. The configuration of the frame 2300-2 (frame #2), including the order in which the symbols are transmitted, is not limited to the configuration in FIG. 29.

FIG. 30 illustrates an example of the configuration of the frame 2300-3 (frame #3) of the modulated signal transmitted by the fifth apparatus 1000. In FIG. 30, the horizontal axis indicates time. In FIG. 30, the symbols similar to those in FIG. 2 or 16 are denoted by the same numerals, and the description thereof is omitted. The frame 2300-3 (frame #3) in FIG. 30 is a frame for transmitting information on the SSID of the base station 470-3 (base station #3) in FIG. 27 and information on the encryption key of the base station 470-3 (base station #3) (the encryption key for accessing the base station 470-3).

An SSID-related symbol 2301-3 is a symbol for transmitting the SSID-related information 1001-1 in FIG. 27. The SSID-related symbol 2301-3 is a symbol by which the fifth apparatus 1000 in FIG. 27 transmits the SSID of the base station 470-3 (base station #3).

A encryption-key-related symbol 2302-3 is a symbol for transmitting the encryption-key-related information 1001-2 in FIG. 27. The encryption-key-related symbol 2302-3 is a symbol by which the fifth apparatus 1000 transmits the encryption key of the base station 470-3 (base station #3) (the encryption key for accessing the base station 470-3).

The fifth apparatus 1000 transmits the preamble 201, the control information symbol 202, the SSID-related symbol 2301-3, the encryption-key-related symbol 2302-3, and the data symbol 1102. The fifth apparatus 1000 may transmit the frame 2300-3 (frame #3) including a symbol other than the symbols illustrated in FIG. 30. The configuration of the frame 2300-3 (frame #3), including the order in which the symbols are transmitted, is not limited to the configuration in FIG. 30.

Figure 31:
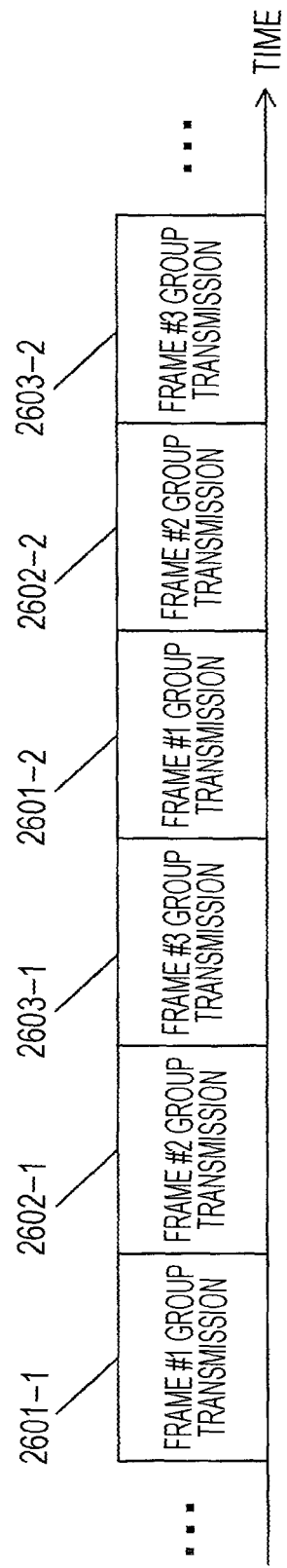
FIG. 31 is a diagram illustrating an example of a frame transmission method by the fifth apparatus according to Embodiment 7.

FIG. 31 illustrates an example of a transmission method in which the fifth apparatus 1000 transmits "frame 2300-1 (frame #1) in FIG. 28", "frame 2300-2 (frame #2) in FIG. 29", and "frame 2300-3 (frame #3) in FIG. 30". In FIG. 31, the horizontal axis indicates time.

Referring to FIG. 31, in "frame #1 group transmission" 2601-1 and 2601-2, one or more frames 2300-1 (frames #1), each being the one in FIG. 28, are transmitted. In "frame #2 group transmission" 2602-1 and 2602-2, one or more frames 2300-2 (frames #2), each being the one in FIG. 29, are transmitted. In "frame #3 group transmission" 2603-1 and 2603-2, one or more frames 2300-3 (frames #3), each being the one in FIG. 30, are transmitted.

A detailed description of this case will be described below.

First, a description will be given of "frame #1 group transmission" 2601-1 and 2601-2 in which one or more frames 2300-1 (frames #1), each being the one in FIG. 28, are transmitted.

For example, when an image sensor, such as a CMOS sensor or an organic CMOS sensor, is used in the light receiver 151, there is a possibility that a reception signal is processed in units of frames in a video or still image. For example, "4K30p" in a video means that the number of pixels per frame is 3840×2160 and that the number of frames per second is 30.

Thus, when the fifth apparatus 1000 transmits a modulated signal having a configuration in which one frame includes "frame 2300-1 (frame #1) in FIG. 28", "frame 2300-2 (frame #2) in FIG. 29", and "frame 2300-3 (frame #3) in FIG. 30", it is difficult for the terminal 1050 in FIG. 27 to select the base station 470 to be accessed from among the plurality of base stations 470-1, 470-2, and 470-3.

Accordingly, in the present embodiment, the frame configuration illustrated in FIG. 31 is proposed.

<Method 1-1>

In method 1-1, a plurality of frames 2300-1 (frames #1), each being the one in FIG. 28, are included in each of "frame #1 group transmission" 2601-1 and 2601-2, so that the time section occupied by each of "frame #1 group transmission" 2601-1 and 2601-2 is longer than that of a frame in a video or still image.

Accordingly, the terminal 1050 is able to prevent receiving, from the fifth apparatus 1000, a modulated signal in which one frame in a video or still image includes "frame 2300-1 (frame #1) in FIG. 28", "frame 2300-2 (frame #2) in FIG. 29", and "frame 2300-3 (frame #3) in FIG. 30", that is, different SSIDs and encryption keys. Thus, the terminal 1050 in FIG. 27 is able to easily select the base station 470 to be accessed from among the plurality of base stations 470-1, 470-2, and 470-3.

<Method 2-1>

In method 2-1, the time section occupied by the frame 2300-1 (frame #1) in FIG. 28 is made longer than that of a frame in a video or still image.

For example, the SSID-related symbol 2301-1 in FIG. 28 may include a plurality of pieces of "base station #1 SSID information" (i.e., "base station #1 SSID information" is repeatedly included), and the encryption-key-related symbol 2302-1 may include a plurality of pieces of "base station #1 encryption key information (information on the encryption key for connecting to the base station #1)" (i.e. "base station #1 encryption key information (information on the encryption key for connecting to the base station #1)" is repeatedly included).

Accordingly, the terminal 1050 is able to prevent receiving, from the fifth apparatus 1000, a modulated signal in which one frame in a video or still image includes "frame 2300-1 (frame #1) in FIG. 28", "frame 2300-2 (frame #2) in FIG. 29", and "frame 2300-3 (frame #3) in FIG. 30", that is, different SSIDs and encryption keys. Thus, the terminal 1050 is able to easily select the base station 470 to be accessed from among the plurality of base stations 470-1, 470-2, and 470-3.

Similarly, "frame #2 group transmission" 2602-1 and 2602-2 may have the following configuration.

<Method 1-2>

In method 1-2, a plurality of frames 2300-2 (frames #2), each being the one in FIG. 29, are included in each of "frame #2 group transmission" 2602-1 and 2602-2, so that the time section occupied by "frame #2 group transmission" is longer than that of a frame in a video or still image.

<Method 2-2>

In method 2-2, the time section occupied by the frame 2300-2 (frame #2) in FIG. 29 is made longer than that of a frame in a video or still image.

For example, the SSID-related symbol 2301-2 in FIG. 29 may include a plurality of pieces of "base station #2 SSID information" (i.e., "base station #2 SSID information" is repeatedly included), and the encryption-key-related symbol 2302-2 may include a plurality of pieces of "base station #2 encryption key information (information on the encryption key for connecting to the base station #2)" (i.e. "base station #2 encryption key information (information on the encryption key for connecting to the base station #2)" is repeatedly included).

Similarly, "frame #3 group transmission" 2603-1 and 2603-2 may have the following configuration.

<Method 1-3>

In method 1-3, a plurality of frames 2300-3 (frames #3), each being the one in FIG. 30, are included in each of "frame #3 group transmission" 2603-1 and 2603-2, so that the time section occupied by "frame #3 group transmission" is longer than that of a frame in a video or still image.

<Method 2-3>

In method 2-3, the time section occupied by the frame 2300-3 (frame #3) in FIG. 30 is made longer than that of a frame in a video or still image.

For example, the SSID-related symbol 2301-3 in FIG. 30 may include a plurality of pieces of "base station #3 SSID information" (i.e., "base station #3 SSID information" is repeatedly included), and the encryption-key-related symbol 2302-3 may include a plurality of pieces of "base station #3 encryption key information (information on the encryption key for connecting to the base station #3)" (i.e. "base station #3 encryption key information (information on the encryption key for connecting to the base station #3)" is repeatedly included).

Next, a description will be given of an effect in a case where the fifth apparatus 1000 transmits frames in the manner illustrated in FIGS. 28 to 31.

Figure 32:
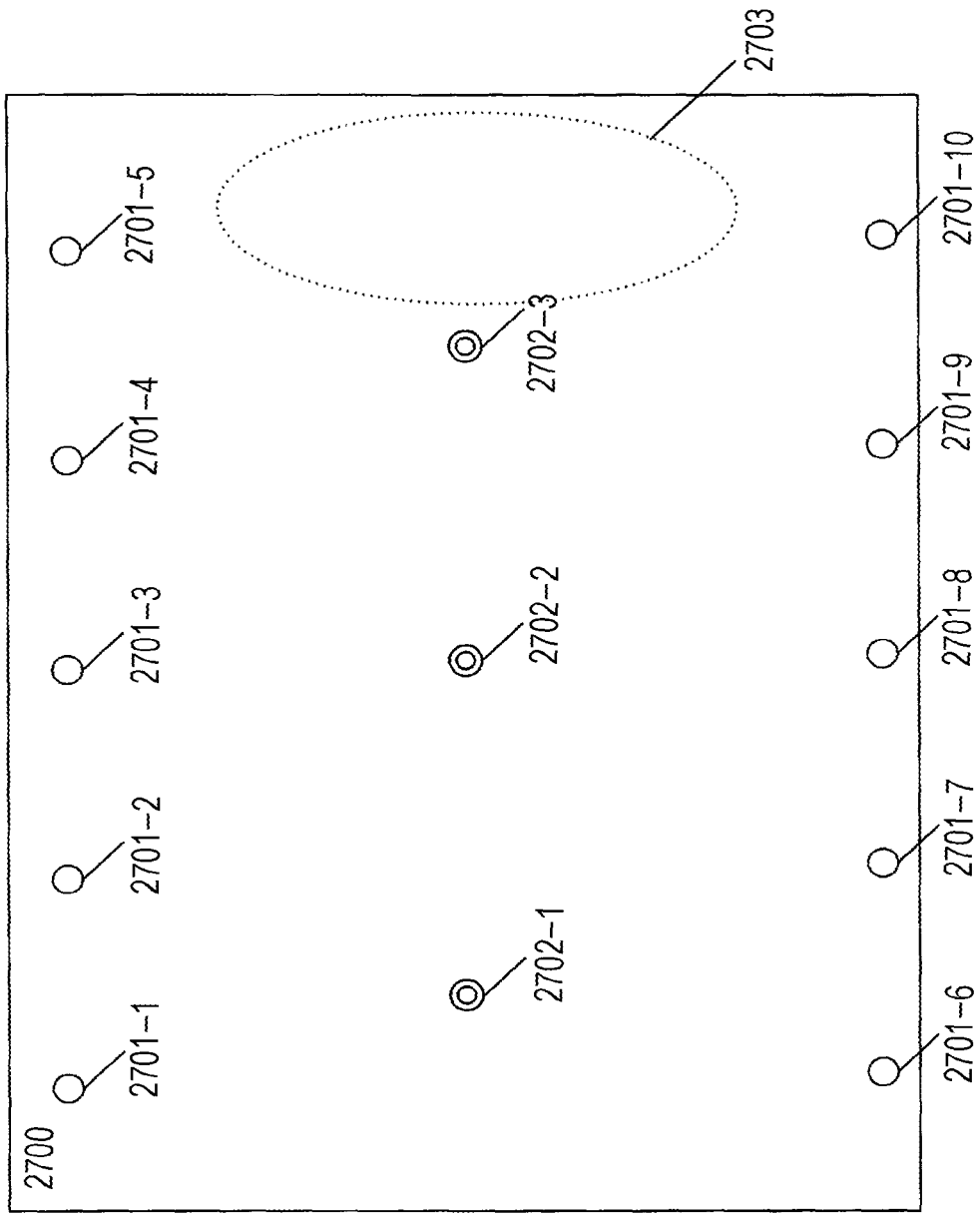
FIG. 32 is a diagram illustrating an example of a space in which the communication system according to Embodiment 7 is disposed.

For example, an area 2700 in FIG. 32 is considered. In FIG. 32, the fifth apparatus 1000 is located at each of the positions of single circles 2701-1, 2701-2, 2701-3, 2701-4, 2701-5, 2701-6, 2701-7, 2701-8, 2701-9, and 2701-10. Also, the base station 470-1 (base station #1) is located at the position of a double circle 2702-1, the base station 470-2 (base station #2) is located at the position of a double circle 2702-2, and the base station 470-3 (base station #3) is located at the position of a double circle 2702-3.

In addition, for example, it is assumed that there are 99 terminals, each having a configuration similar to the configuration of the terminal 1050, (hereinafter simply referred to as terminals 1050) in an area 2703.

At this time, for example, both the fifth apparatuses 1000 located at the positions of the single circles 2701-5 and 2701-10 transmit information on the SSID of the base station 470-3 (base station #3) and transmit information on the encryption key for accessing the base station 470-3 (base station #3). This is because the base station that is the nearest to the positions of the single circles 2701-5 and 2701-10 is the base station 470-3 (base station #3).

In this case, all the 99 terminals 1050 access the base station 470-3 (base station #3). Accordingly, the access concentration increases the possibility that there is a terminal 1050 having difficulty in accessing the base station 470-3 (base station #3).

Taking this point into consideration, the number of terminals 1050 having difficulty in accessing the base station 470 as described above can be reduced by performing control to allow the 99 terminals 1050 to access the base station 470-1 (base station #1) (the position of the single circle 2702-1), the base station 470-2 (base station #2) (the position of the single circle 2702-2), and the base station 470-3 (base station #3) (the position of the single circle 2702-3) as evenly as possible.

For example, the timings at which the 99 terminals 1050 access the fifth apparatus 1000 are typically different. Thus, as in the present embodiment, when the fifth apparatus 1000 transmits frames in the manner illustrated in FIGS. 28 to 31, each of the 99 terminals 1050 obtains the SSID and the encryption key of any one of the base stations 470-1, 470-2, and 470-3 in accordance with the timing to access the fifth apparatus 1000. Accordingly, "control to allow the 99 terminals 1050 to access the base stations 470-1, 470-2, and 470-3 as evenly as possible" is performed. Accordingly, the number of terminals 1050 having difficulty in accessing the base station 470 described above can be reduced.

FIG. 31 illustrates an example of a transmission method in which the fifth apparatus 1000 transmits "frame 2300-1 (frame #1) in FIG. 28", "frame 2300-2 (frame #2) in FIG. 29", and "frame 2300-3 (frame #3) in FIG. 30". However, the transmission method in which the fifth apparatus 1000 transmits "frame 2300-1 (frame #1) in FIG. 28", "frame 2300-2 (frame #2) in FIG. 29", and "frame 2300-3 (frame #3) in FIG. 30" is not limited thereto.

For example, FIG. 31 illustrates a configuration in which the fifth apparatus 1000 repeatedly performs transmission in the order of "frame #1 group transmission", "frame #2 group transmission", and "frame #3 group transmission". However, "frame #1 group transmission", "frame #2 group transmission", and "frame #3 group transmission" need not necessarily be performed in the order illustrated in FIG. 31. Alternatively, for example, the fifth apparatus 1000 may perform "frame #1 group transmission", "frame #2 group transmission", and "frame #3 group transmission" temporarily randomly, or may perform "frame #1 group transmission", "frame #2 group transmission", and "frame #3 group transmission" in a regular order different from the order in FIG. 31. It is sufficient that the fifth apparatus 1000 at least perform "frame #1 group transmission", "frame #2 group transmission", and "frame #3 group transmission".

In FIG. 31, the fifth apparatus 1000 consecutively performs "frame #1 group transmission", "frame #2 group transmission", and "frame #3 group transmission", but such consecutive transmission need not necessarily be performed. For example, in FIG. 31, there may be a time interval between the frame #1 group 2601-1 and the frame #2 group transmission 2602-2.

In FIG. 31, there are only "frame #1 group transmission", "frame #2 group transmission", and "frame #3 group transmission", but there may be other symbols and other frames. Furthermore, in FIGS. 31 and 27, the number of base stations 470 is three, but the number of base stations 470 is not limited thereto. Also when the number of base stations 470 is two or more, an operation similar to that when the number of base stations 470 is three can be performed. Thus, for example, when the number of base stations 470 is N (N is n integer greater than or equal to 2) and the fifth apparatus 1000 performs the transmission as illustrated in FIG. 31, "frame #k group transmission" is performed. Note that k is an integer greater than or equal to 1 and smaller than or equal to N. Also, "frame #k group transmission" includes an SSID-related symbol (information on the SSID of a base station #k) and includes a encryption-key-related symbol (information on the encryption key for accessing the base station #k).

The frame configuration of the modulated signal transmitted by the radio device 453 included in the terminal 1050 in FIG. 27 is similar to the frame configuration in FIG. 17 described in Embodiment 4. That is, as illustrated in FIG. 17, the radio device 453 included in the terminal 1050 in FIG. 27 transmits, for example, the preamble 1201, and then transmits the control information symbol 1202 and the information symbol 1203.

The preamble 1201 is a symbol by which the base stations 470-1, 470-2, and 470-3 that receive the modulated signal transmitted by radio device 453 of the terminal 1050 perform, for example, signal detection, time synchronization, frame synchronization, frequency synchronization, frequency offset estimation, and the like.

The control information symbol 1202 is a symbol including, for example, data of information about an error-correction coding scheme and a modulation scheme that are used to generate the modulated signal, information about the frame configuration, and information about a transmission method. The base stations 470-1, 470-2, and 470-3 perform demodulation or the like on the modulated signal based on the information included in the control information symbol 1202.

The information symbol 1203 is a symbol by which the radio device 453 of the terminal 1050 transmits data.

The radio device 453 of the terminal 1050 in FIG. 27 may transmit a frame including a symbol other than the symbols illustrated in FIG. 17 (for example, a frame in which a pilot symbol (reference symbol) is included in a middle of the information symbol 1203). The frame configuration, including the order in which the symbols are transmitted, is not limited to the configuration in FIG. 17. In FIG. 17, a plurality of symbols may exist in the frequency axis direction. That is, symbols may exist at a plurality of frequencies (a plurality of carriers).

The frame configuration of the modulated signal transmitted by the base stations 470-1, 470-2, and 470-3 in FIG. 27 is similar to the frame configuration in FIG. 12 described in Embodiment 3. That is, as illustrated in FIG. 12, the base stations 470-1, 470-2, and 470-3 transmit, for example, the preamble 701, and then transmit the control information symbol 702 and the information symbol 703.

The preamble 701 is a symbol by which the radio device 453 of the terminal 1050 that receives the modulated signals transmitted by the base stations 470-1, 470-2, and 470-3 performs, for example, signal detection, time synchronization, frame synchronization, frequency synchronization, frequency offset estimation, and the like.

The control information symbol 702 is a symbol including, for example, data of information about an error-correction coding scheme and a modulation scheme that are used to generate the modulated signal, information about the frame configuration, and information about a transmission method. The radio device 453 of the terminal 1050 performs demodulation or the like on the modulated signal based on the information of the control information symbol 702.

The information symbol 703 is a symbol by which the base stations 470-1, 470-2, and 470-3 transmit data.

The base stations 470-1, 470-2, and 470-3 may transmit a frame including a symbol other than the symbols illustrated in FIG. 12. For example, the base stations 470-1, 470-2, and 470-3 may transmit a frame in which a pilot symbol (reference symbol) is included in a middle of the information symbol 703. The frame configuration, including the order in which the symbols are transmitted, is not limited to the configuration in FIG. 12. In FIG. 12, a plurality of symbols may exist in the frequency axis direction. That is, symbols may exist at a plurality of frequencies (a plurality of carriers) in FIG. 12.

Figure 33:
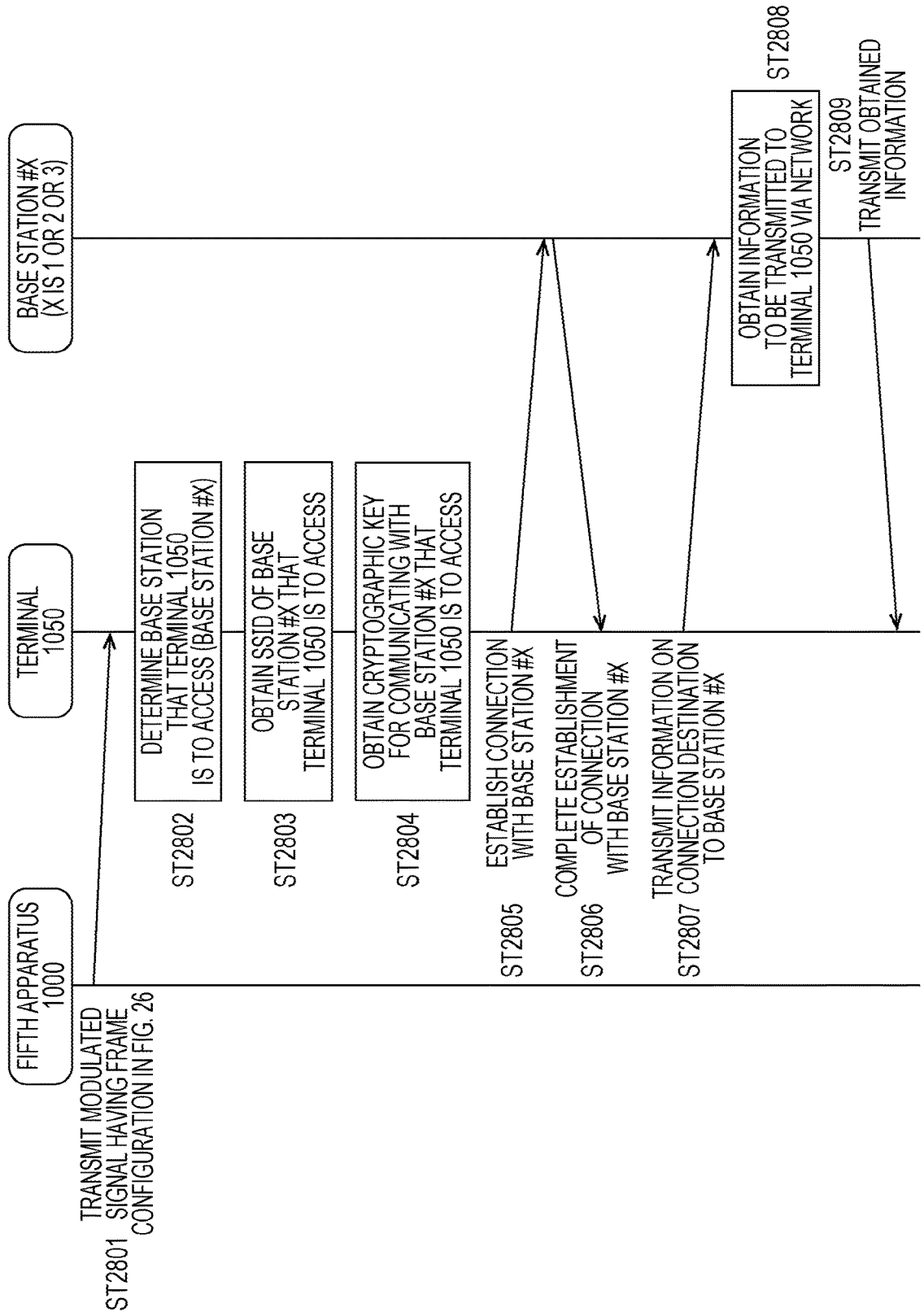
FIG. 33 is a flowchart illustrating an example process in the communication system according to Embodiment 7.

FIG. 33 is a flowchart illustrating an example of a process performed by the "fifth apparatus 1000", the "terminal 1050", and the "base station #X". X is 1, 2, or 3.

First, the fifth apparatus 1000 transmits a modulated signal having the frame configuration in FIG. 31 (ST2801).

The terminal 1050 receives the modulated signal transmitted by the fifth apparatus 1000 and selects the base station that the terminal 1050 is to access from among the base station 470-1 (base station #1), the base station 470-2 (base station #2), and the base station 470-3 (base station #3) in FIG. 27 (ST2802).

Hereinafter, this point will be described. The terminal 1050 receives the modulated signal transmitted by the fifth apparatus 1000 to access any of the base stations 470. At this time, the terminal 1050 obtains any of "frame #1 group transmission", "frame #2 group transmission", and "frame #3 group transmission" in FIG. 31 in a certain frame of a video or still image, for example. Subsequently, the terminal 1050 determines any of the base station 470-1 (base station #1), the base station 470-2 (base station #2), and the base station 470-3 (base station #3) as the base station 470 that the terminal 1050 is to access, based on the obtained information on the base station (for example, the SSID).

Subsequently, the terminal 1050 receives the modulated signal transmitted by the fifth apparatus 1000 and obtains the SSID of the base station #X that the terminal 1050 is to access (ST2803).

Also, the terminal 1050 obtains the encryption key that is used for communication with the base station #X that the terminal 1050 is to access (ST2804).

Subsequently, the terminal 1050 establishes a connection through a radio wave with the base station #X (ST2805). Upon receipt of a response from the base station #X by the terminal 1050, the establishment of the connection between the terminal 1050 and the base station #X is completed (ST2806).

Subsequently, the terminal 1050 transmits information on the connection destination to the base station #X by using a radio wave (ST2807).

The base station #X obtains information to be transmitted to the terminal 1050 through a network (ST2808).

Subsequently, the base station #X transmits the obtained information to the terminal 1050 by using a radio wave, and the terminal 1050 obtains the information (ST2809). The terminal 1050 obtains necessary information through the network via the base station #X when necessary, for example.

As described above, based on the SSID information and the encryption key information transmitted by the fifth apparatus 1000, the terminal 1050 establishes a connection with the base station 470 and obtains information, thereby being able to safely obtain the information via the base station 470 that is safety-guaranteed. This is because, when the terminal 1050 obtains information from a modulated signal of visible light, the user is able to easily determine whether or not the source of the information is safe because the modulated signal is visible light. In contrast, for example, when the SSID is obtained from a modulated signal of a radio wave transmitted through a wireless LAN, it is difficult for the user to determine the apparatus that has transmitted the radio wave. Therefore, visible light communication is more suitable for obtaining the SSID than wireless LAN communication in terms of ensuring the safety of information.

In the present embodiment, a description has been given of a case where the fifth apparatus 1000 transmits encryption key information. However, for example, when the base station 470 does not perform encrypted communication using an encryption key, it is sufficient that the fifth apparatus 1000 transmit only SSID-related information, not encryption key information. In this case, a similar operation can be performed only by removing the component related to the encryption key among the above-described components.

The configuration of the fifth apparatus is not limited to the configuration of the fifth apparatus 1000 illustrated in FIG. 27, the configuration of the terminal is not limited to the configuration of the terminal 1050 illustrated in FIG. 27, and the connection destinations and the configurations of the base stations #1, #2, and #3 are not limited to the connection destinations and the configurations of the base stations 470-1, 470-2, and 470-3 illustrated in FIG. 27.

According to the present embodiment, even when there are a plurality of terminals 1050 in a certain area, the number of terminals 1050 having difficulty in accessing the base station 470 can be reduced.

In FIG. 32, all the frame configurations of the modulated signals transmitted by the fifth apparatuses 1000 located at the positions of the single circles 2701-1, 2701-2, 2701-3, 2701-4, 2701-5, 2701-6, 2701-7, 2701-8, 2701-9, and 2701-10 may be similar to the configuration in FIG. 31, or the frame configurations of the modulated signals transmitted by the fifth apparatuses 1000 may be different from each other, or there may be a plurality of fifth apparatuses 1000 that transmit modulated signals of the same frame configuration.

Embodiment 8

In the present embodiment, a description will be given of a case where the above-described communication system is applied to the inside of an aircraft.

Hereinafter, it is assumed that a seat area in an aircraft is divided in accordance with classes of services provided to passengers. For example, hereinafter, it is assumed that the seat area is divided into areas associated with three classes: a class of higher-level services (for example, first class), a class of middle-level services (for example, business class), and a class of lower-level services (for example, economy class). The categorization of service classes is not limited thereto. For example, the service classes may be categorized more finely.

Figure 34:
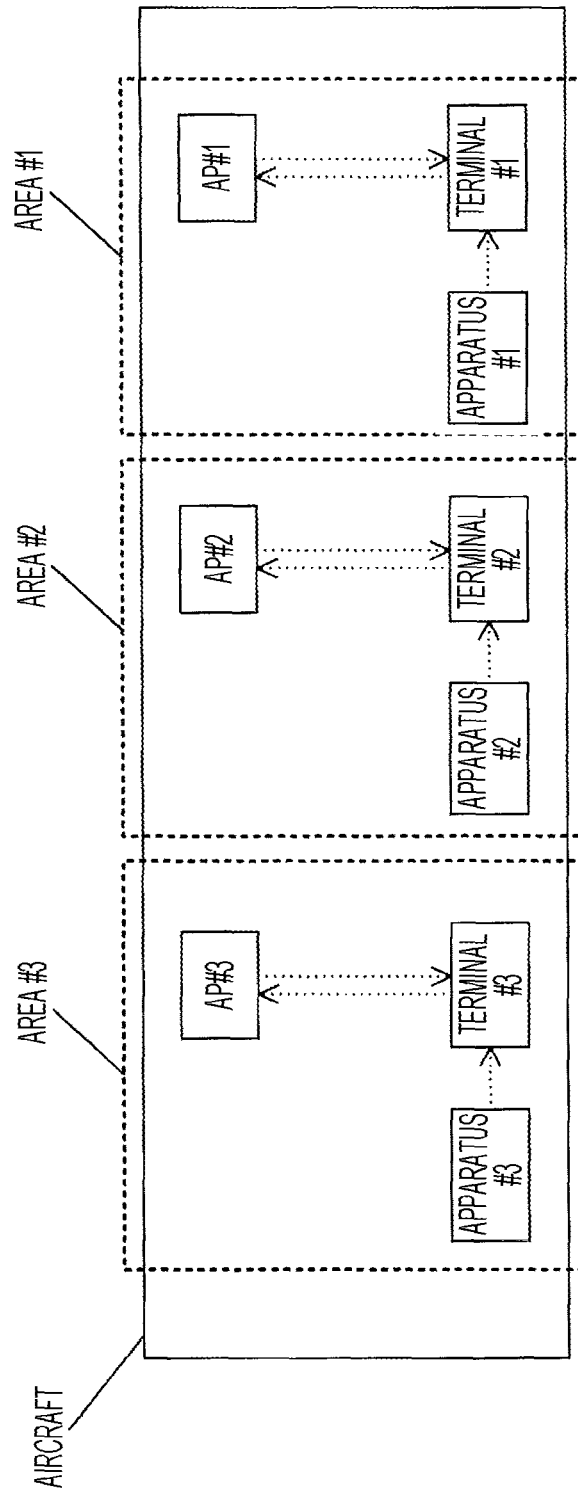
FIG. 34 is a diagram illustrating an example of an AP connection method according to Embodiment 8 (Application Example 1).

As illustrated in FIG. 34, the seat area in the aircraft is divided into an area #1 including seats for passengers provided with higher-level services, an area #2 including seats for passengers provided with middle-level services, and an area #3 including seats for passengers provided with lower-level services.

In the following application examples, an apparatus, a terminal, and an AP (base station) constituting a communication system may have a configuration similar to that of, for example, the apparatus 400, 1000, 1400, or 2001, the terminal 450 or 1050, and the AP (base station, radio device) 470 or 2002 illustrated in FIGS. 9, 15, 19, 25, and 27, respectively.

That is, the apparatuses in the present embodiment (for example, apparatuses #1, #2, and #3) each transmit (emit) a light signal including the SSID (identifier) of at least one AP (base station). The terminals in the present embodiment (for example, terminals #1, #2, and #3) each receive the light signal emitted by the apparatus, selects one AP based on the SSID included in the light signal, establishes a wireless connection with the AP by using the SSID of the selected AP, and performs wireless communication. The AP (base station) in the present embodiment wirelessly communicates with a terminal, and also communicates with various servers via a network within the aircraft (local network) or a network outside the aircraft (for example, the Internet).

Application Example 1

In Application Example 1, as illustrated in FIG. 34, one or more APs #1 supporting a first wireless LAN scheme are installed in the area #1, one or more APs #2 supporting a second wireless LAN scheme are installed in the area #2, and one or more APs #3 supporting a third wireless LAN scheme are installed in the area #3. Each AP is associated with the class of services provided in the area in which the AP is installed.

It is assumed that the maximum transmission speed of the first wireless LAN scheme is higher than the maximum transmission speed of the second wireless LAN scheme, and that the maximum transmission speed of the second wireless LAN scheme is higher than the maximum transmission speed of the third wireless LAN scheme. That is, as the rank of a class providing services increases, the maximum transmission speed of the wireless LAN scheme (wireless communication scheme) supported by the AP associated with the class increases.

For example, in Application Example 1, the first wireless LAN scheme may support IEEE 802.11ac, IEEE 802.11n, IEEE 802.11a, IEEE 802.11g, and IEEE 802.11b, the second wireless LAN scheme may support IEEE 802.11n, IEEE 802.11a, IEEE 802.11g, and IEEE 802.11b, and the third wireless LAN scheme may support IEEE 802.11a, IEEE 802.11g, and IEEE 802.11b.

That is, in Application Example 1, a wireless LAN scheme supported by a certain AP includes a wireless LAN scheme supported by an AP associated with a lower class than a service class associated with the certain AP. Specifically, the first wireless LAN scheme includes the standards supported by the second wireless LAN scheme and the third wireless LAN scheme, and the second wireless LAN scheme includes the standards supported by the third wireless LAN scheme. Note that examples of the standards supported by the first wireless LAN scheme, the standards supported by the second wireless LAN scheme, and the standards supported by the third wireless LAN scheme are not limited to the above-described standards.

As illustrated in FIG. 34, one or more apparatuses #1, each including a visible light, a lighting device, a light source, or a light, such as an LED, are installed in the area #1. One or more apparatuses #2, each including a visible light, a lighting device, a light source, or a light, such as an LED, are installed in the area #2. One or more apparatuses #3, each including a visible light, a lighting device, a light source, or a light, such as an LED, are installed in the area #3. For example, the apparatus #1, the apparatus #2, and the apparatus #3 may be apparatuses that use a lighting device or a monitor screen installed in each seat as a light source.

In Application Example 1, the apparatus #1 existing in the area #1 transmits information on the SSID of one or more APs #1 supporting the first wireless LAN scheme. The apparatus #2 existing in the area #2 transmits information on the SSID of one or more APs #2 supporting the second wireless LAN scheme. The apparatus #3 existing in the area

3 transmits information on the SSID of one or more APs #3 supporting the third wireless LAN scheme.

The terminal positioned in each area uses information on the SSID of an AP obtained by receiving a light signal emitted by any of the apparatus #1, the apparatus #2, and the apparatus #3 to establish a connection with the AP corresponding to the obtained SSID through a wireless LAN. Specifically, as illustrated in FIG. 34, the terminal #1 positioned in the area #1 (for example, first class) obtains information on the SSID of the AP #1 from the apparatus #1 and establishes a wireless connection with the AP #1 by using the obtained SSID. Likewise, as illustrated in FIG. 34, the terminal #2 positioned in the area #2 (for example, business class) obtains information on the SSID of the AP #2 from the apparatus #2 and establishes a wireless connection with the AP #2 by using the obtained SSID. Also, as illustrated in FIG. 34, the terminal #3 positioned in the area #3 (for example, economy class) obtains information on the SSID of the AP #3 from the apparatus #3 and establishes a wireless connection with the AP #3 by using the obtained SSID.

Accordingly, in Application Example 1, a terminal positioned in an area of a higher service class is able to wirelessly communicate with an AP associated with the class at a higher transmission speed. An AP associated with a certain service class supports a wireless LAN scheme supported by an AP associated with a lower class, and thus a terminal positioned in an area of a higher service class is able to select not only a high-speed wireless LAN scheme but also an appropriate wireless LAN scheme among wireless LAN schemes supported by the terminal.

In addition, in Application Example 1, each of the apparatus #1, the apparatus #2, and the apparatus #3 transmits information on an SSID (modulated signal) by using visible light, and thus the terminal capable of receiving the information on the SSID is limited to a terminal within a range where the light signal can be received from each apparatus. That is, each of users of terminals positioned in the areas corresponding to service classes is able to receive a light signal from an apparatus installed in the corresponding area (any of the apparatus #1, the apparatus #2, and the apparatus #3) and to receive services corresponding to the class of the area. Accordingly, services that vary according to a service class (here, wireless communication services of different transmission speeds) can be provided.

Application Example 2

Figure 35:
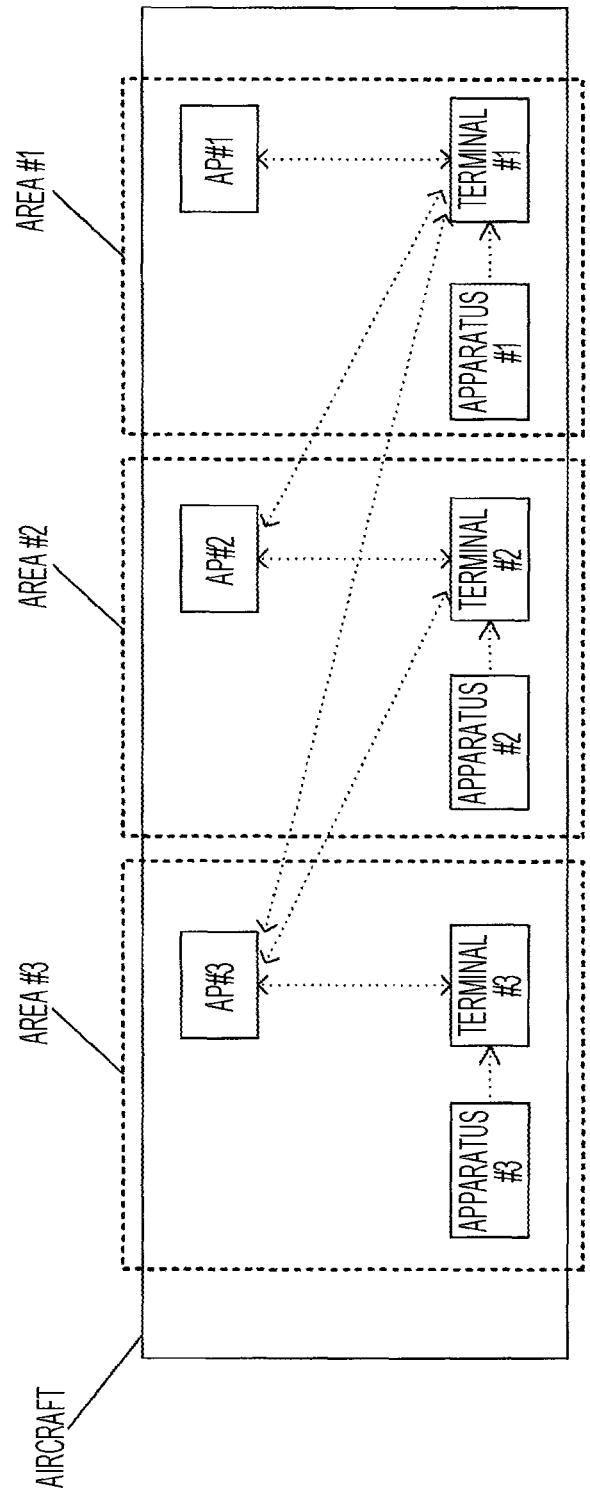
FIG. 35 is a diagram illustrating an example of an AP connection method according to Embodiment 8 (Application Example 2).

In Application Example 2, as in Application Example 1, it is assumed that, as illustrated in FIG. 35, one or more APs #1 supporting the first wireless LAN scheme are installed in the area #1, one or more APs #2 supporting the second wireless LAN scheme are installed in the area #2, and one or more APs #3 supporting the third wireless LAN scheme are installed in the area #3. Each AP is associated with the class of services provided in the area in which the AP is installed.

It is assumed that the maximum transmission speed of the first wireless LAN scheme supported by the AP #1 is higher than the maximum transmission speed of the second wireless LAN scheme supported by the AP #2, and that the maximum transmission speed of the second wireless LAN scheme supported by the AP #2 is higher than the maximum transmission speed of the third wireless LAN scheme supported by the AP #3. For example, in Application Example 2, the first wireless LAN scheme may support IEEE 802.11ac, the second wireless LAN scheme may support IEEE 802.11n, and the third wireless LAN scheme may support IEEE 802.11a, IEEE 802.11g, and IEEE 802.11b. Note that examples of the standards supported by the first wireless LAN scheme, the standards supported by the second wireless LAN scheme, and the standards supported by the third wireless LAN scheme are not limited to the above-described standards.

As illustrated in FIG. 35, one or more apparatuses #1, each including a visible light, a lighting device, a light source, or a light, such as an LED, are installed in the area #1. One or more apparatuses #2, each including a visible light, a lighting device, a light source, or a light, such as an LED, are installed in the area #2. One or more apparatuses #3, each including a visible light, a lighting device, a light source, or a light, such as an LED, are installed in the area #3. For example, the apparatus #1, the apparatus #2, and the apparatus #3 are apparatuses that use a lighting device or a monitor screen installed in each seat as a light source.

In Application Example 2, the apparatus #1 existing in the area #1 transmits information on the SSID of one or more APs #1 supporting the first wireless LAN scheme, and the apparatus #2 transmits information on the SSID of one or more APs #2 supporting the second wireless LAN scheme and information on the SSID of one or more APs #3 supporting the third wireless LAN scheme.

The apparatus #2 existing in the area #2 transmits information on the SSID of one or more APs #2 supporting the second wireless LAN scheme and information on the SSID of one or more APs #3 supporting the third wireless LAN scheme.

The apparatus #3 existing in the area #3 transmits information on the SSID of one or more APs #3 supporting the third wireless LAN scheme.

The terminal positioned in each area uses information on the SSID of an AP obtained by receiving a light signal emitted by any of the apparatus #1, the apparatus #2, and the apparatus #3 to establish a connection with the AP corresponding to the obtained SSID through a wireless LAN.

Specifically, as illustrated in FIG. 35, the terminal #1 positioned in the area #1 (for example, first class) obtains information on the SSID of the AP #1, information on the SSID of the AP #2, and information on the SSID of the AP #3 from the apparatus #1. Subsequently, the terminal #1 positioned in the area #1 establishes a wireless connection with an AP by using at least any one of the information on the SSID of the AP #1, the information on the SSID of the AP #2, and the information on the SSID of the AP #3 that have been obtained.

Likewise, the terminal #2 positioned in the area #2 (for example, business class) obtains information on the SSID of the AP #2 and information on the SSID of the AP #3 from the apparatus #2. Subsequently, the terminal #2 positioned in the area #2 establishes a wireless connection with an AP by using at least any one of the information on the SSID of the AP #2 and the information on the SSID of the AP #3 that have been obtained.

The terminal #3 positioned in the area #3 (for example, economy class) obtains information on the SSID of the AP #3 from the apparatus #3. Subsequently, the terminal #3 positioned in the area #3 establishes a wireless connection with the AP #3 by using the obtained SSID of the AP #3.

That is, in Application Example 2, a terminal receives, from an apparatus (transmitter) existing in an area where the terminal is positioned, a light signal including the SSID of the AP associated with the class of services provided in the area and the SSID of the AP associated with a lower class.

Subsequently, the terminal selects the AP to be connected based on the SSIDs included in the light signal.

Figure 36A:
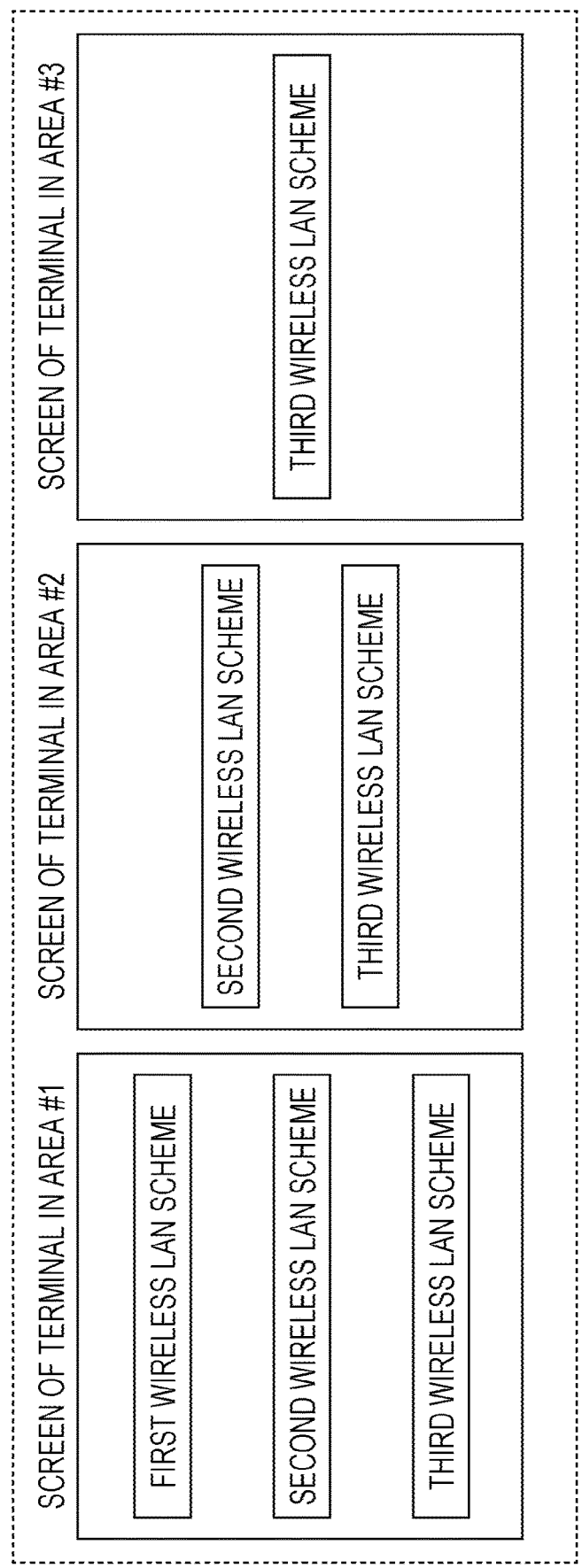
FIG. 36A is a diagram illustrating a display example of a display of a terminal according to Embodiment 8.

FIG. 36A illustrates an example of a display screen of a terminal when the terminal obtains information on the SSID of an AP.

For example, after obtaining information on an AP (SSID) transmitted by the apparatus #1, the terminal existing in the area #1 (for example, first class) may display a selection window for "first wireless LAN scheme", "second wireless LAN scheme", and "third wireless LAN scheme" on the screen (display) of the terminal, as illustrated in FIG. 36A. When the user of the terminal selects "first wireless LAN scheme", the terminal selects an SSID from information on the SSID of one or more APs #1 supporting the first wireless LAN scheme, and establishes a connection with the AP #1 through a wireless LAN. When the user of the terminal selects "second wireless LAN scheme", the terminal selects an SSID from information on the SSID of one or more APs #2 supporting the second wireless LAN scheme, and establishes a connection with the AP #2 through a wireless LAN. When the user of the terminal selects "third wireless LAN scheme", the terminal selects an SSID from information on the SSID of one or more APs #3 supporting the third wireless LAN scheme, and establishes a connection with the AP #3 through a wireless LAN.

Also, for example, after obtaining information on an AP (SSID) transmitted by the apparatus #2, the terminal existing in the area #2 (for example, business class) displays a selection window for "second wireless LAN scheme" and "third wireless LAN scheme" on the screen (display) of the terminal, as illustrated in FIG. 36A. When the user of the terminal selects "second wireless LAN scheme", the terminal selects an SSID from information on the SSID of one or more APs #2 supporting the second wireless LAN scheme, and establishes a connection with the AP #2 through a wireless LAN. When the user of the terminal selects "third wireless LAN scheme", the terminal selects an SSID from information on the SSID of one or more APs #3 supporting the third wireless LAN scheme, and establishes a connection with the AP #3 through a wireless LAN.

Also, for example, after obtaining information on an AP (SSID) transmitted by the apparatus #3, the terminal existing in area #3 (for example, economy class) displays a selection window for "third wireless LAN scheme" on the screen (display) of the terminal, as illustrated in FIG. 36A. When the user of the terminal selects "third wireless LAN scheme", the terminal selects an SSID from information on the SSID of one or more APs #3 supporting the third wireless LAN scheme, and establishes a connection with the AP #3 through a wireless LAN.

That is, the user is able to establish a wireless connection between a terminal and an AP by performing a simple operation of selecting a wireless LAN scheme displayed on the terminal.

A description has been given above of a case where "first wireless LAN scheme", "second wireless LAN scheme", and "third wireless LAN scheme" are displayed on the screen of the terminal as illustrated in FIG. 36A. However, it is not necessary that "first wireless LAN scheme", "second wireless LAN scheme", and "third wireless LAN scheme" be actually displayed, and it is sufficient that display related to (corresponding to) the first wireless LAN scheme, display related to (corresponding to) the second wireless LAN scheme, and display related to (corresponding to) the third wireless LAN scheme be performed.

Figure 36B:
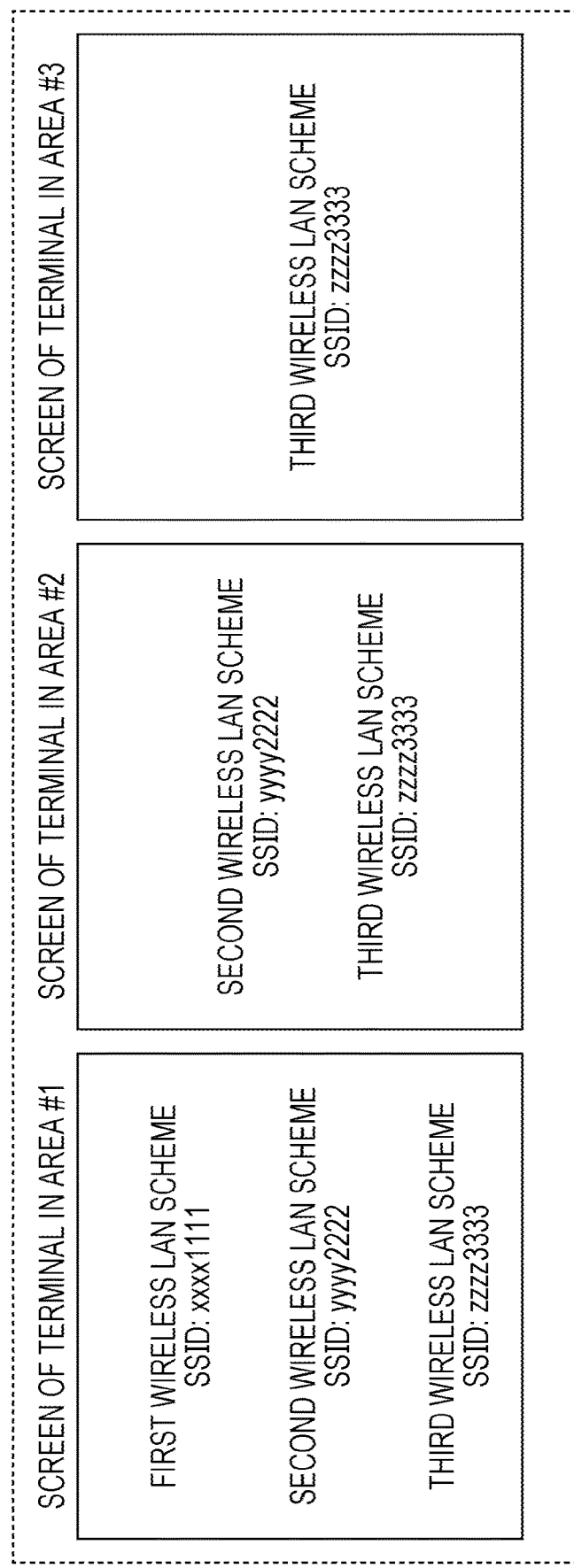
FIG. 36B is a diagram illustrating another display example of the display of the terminal according to Embodiment 8.

The display on the screen of the terminal is not limited to the example illustrated in FIG. 36A. For example, the display of the terminal may display the SSIDs of individual wireless LAN schemes, as illustrated in FIG. 36B. In this case, the SSID of an AP may be selected by the user by inputting the SSID displayed on the screen to an input field (not illustrated) for the SSID.

In this way, in Application Example 2, a terminal positioned in an area of a higher service class is able to wirelessly communicate with an AP associated with the class at a higher transmission speed. A terminal positioned in an area of a class of certain services is able to connect to not only an AP associated with the class but also an AP associated with a lower class. Thus, a terminal positioned in an area of a higher service class is able to select not only a high-speed wireless LAN scheme but also an appropriate wireless LAN scheme (i.e., AP) among wireless LAN schemes supported by the terminal.

In addition, in Application Example 2, each of the apparatus #1, the apparatus #2, and the apparatus #3 transmits information on an SSID (modulated signal) by using visible light, and thus the terminal capable of receiving the information on the SSID is limited to a terminal within a range where the light signal can be received from each apparatus. That is, each of users of terminals positioned in the areas corresponding to service classes is able to receive a light signal from an apparatus installed in the corresponding area (any of the apparatus #1, the apparatus #2, and the apparatus #3) and to receive services corresponding to the class of the area. Accordingly, wireless LAN services that vary according to a service class (here, wireless communication services of different transmission speeds) can be provided.

In Application Examples 1 and 2, each of the apparatuses #1, #2, and #3 may transmit an encryption key for accessing each AP in addition to information on an SSID, and may transmit location information on each apparatus.

In Application Examples 1 and 2, Usage Examples 1 and 2 described below may be applied in accordance with a class of services.

Figure 37:
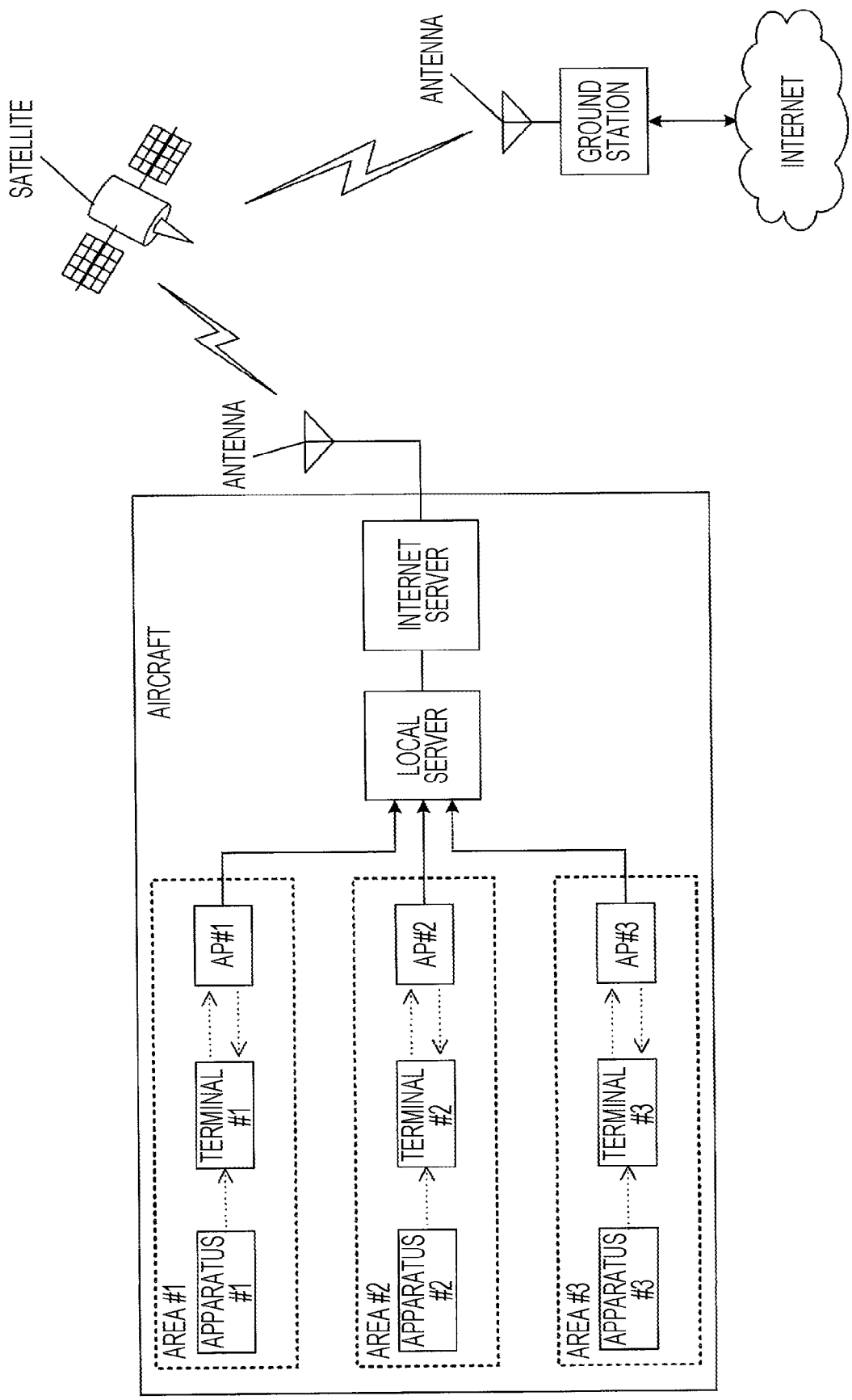
FIG. 37 is a diagram illustrating an example configuration of a communication system within an aircraft and an outside network according to Embodiment 8.

Hereinafter, as illustrated in FIG. 37, a communication system in an aircraft includes the apparatuses #1, #2, and #3 and the APs (base stations) #1, #2, and #3 installed in the areas #1, #2, and #3, respectively, and a local server accessible to each AP. The local server may store, for example, information, content, and the like to be provided to passengers in the aircraft.

Also, the communication system in the aircraft includes devices (an Internet server, an antenna, and the like) that are used to access the Internet (i.e., an outside network) via a satellite line or a ground station.

Usage Example 1

In Usage Example 1, when a terminal is connected to the AP #1 by the first wireless LAN scheme, the terminal is capable of accessing the local server in the aircraft and to access the Internet via a satellite line.

When the terminal is connected to the AP #2 by the second wireless LAN scheme, the terminal is capable of accessing the local server in the aircraft and to access the Internet via the satellite line.

When the terminal is connected to the AP #3 by the third wireless LAN scheme, the terminal is capable of accessing the local server in the aircraft and is incapable of accessing the Internet via the satellite line.

Usage Example 2

In Usage Example 2, when a terminal is connected to the AP #1 by the first wireless LAN scheme, the terminal is capable of accessing the local server in the aircraft and to access the Internet via the satellite line.

When the terminal is connected to the AP #2 by the second wireless LAN scheme, the terminal is capable of accessing the local server in the aircraft and is incapable of accessing the Internet via the satellite line.

When the terminal is connected to the AP #3 by the third wireless LAN scheme, the terminal is capable of accessing the local server in the aircraft and is incapable of accessing the Internet via the satellite line.

That is, the range of a network accessible to a terminal varies in accordance with an AP connected to the terminal, the AP being associated with a class of services provided in an area. Specifically, as the rank of a service class associated with an AP wirelessly connected to the terminal increases, the range of a network accessible to the terminal becomes larger. In this way, as a result of varying the range (the local server within the aircraft or the Internet) accessible to the terminal in accordance with the AP connected to the terminal, communication services that vary in each service class can be provided to the user.

Next, a description will be given of an example of a procedure of accessing an AP from a terminal.

<Access Procedure 1>

(1) The terminal obtains information on the SSID (and the encryption key) of an AP from any one of the apparatus #1, the apparatus #2, and the apparatus #3, and attempts to establish a connection with the AP through a wireless LAN based on the obtained information.

(2-1) After establishing a connection with the AP, the terminal communicates with the connected AP.

(2-2) When it is impossible to establish a connection with the AP, the terminal obtains information on the SSID (and the encryption key) of another AP and attempts to establish a connection with the AP through a wireless LAN based on the obtained information. The other AP is an AP that is installed in the area identical to the area including the AP with which a connection is not established (i.e., an AP associated with the same class). At this time, the apparatus that emits a light signal including information on the SSID may transmit the SSIDs (and the encryption keys) of a plurality of APs associated with the same class regularly or irregularly.

(3-1) After establishing a connection with the AP, the terminal communicates with the connected AP.

(3-2) When it is impossible to establish a connection with the AP, the terminal performs an operation similar to that in the procedure (2-2).

<Access Procedure 2>

The terminal recognizes, in advance, the SSID of an AP to which a modulated signal has been transmitted (note that the SSID may be a plurality of SSIDs).

After that, the terminal obtains information on the SSID (and the encryption key) of the AP from any one of the apparatus #1, the apparatus #2, and the apparatus #3.

When the SSID obtained at this time matches the recognized SSID, the terminal establishes a connection with the AP corresponding to the SSID through a wireless LAN.

On the other hand, when the SSID obtained at this time does not match the recognized SSID, the terminal obtains information on the SSID (and the encryption key) of the AP from another apparatus. The other AP is an AP that is installed in the area identical to the area including the AP with which a connection is not established (i.e., an AP associated with the same class). At this time, the apparatus that emits a light signal including information on the SSID may transmit the SSIDs (and the encryption keys) of a plurality of APs associated with the same class regularly or irregularly.

A description has been given of the procedure of accessing the AP from the terminal.

After the connection between the terminal and the AP has been established, an authentication process is performed in the terminal when a web browser is started, for example. For example, upon a seat number, a name, a password, and the like being input by the user, the terminal becomes capable of performing data communication.

As described above, a terminal establishes, based on information on an SSID (and an encryption key) included in a light signal transmitted (emitted) by an apparatus, a connection with one of APs installed in areas corresponding to service classes and obtains information, thereby being able to safely obtain information via the AP that is safety-guaranteed.

When the user uses the above-described communication system in the aircraft, it is necessary for the user to download an application for performing visible light communication to the terminal in advance.

For a terminal that has not downloaded the application for performing light communication, the communication system may include, for example, an apparatus that displays information on the SSIDs (and the encryption keys) of APs, which are connection destinations in individual service classes. This apparatus may be carried by a crew member of the aircraft, for example, and may display, for a user of a terminal that has not downloaded the application for performing light communication, the SSID (and the encryption key) of the AP corresponding to the service class of the user.

The embodiments of the present disclosure have been described above.

Figure 38:
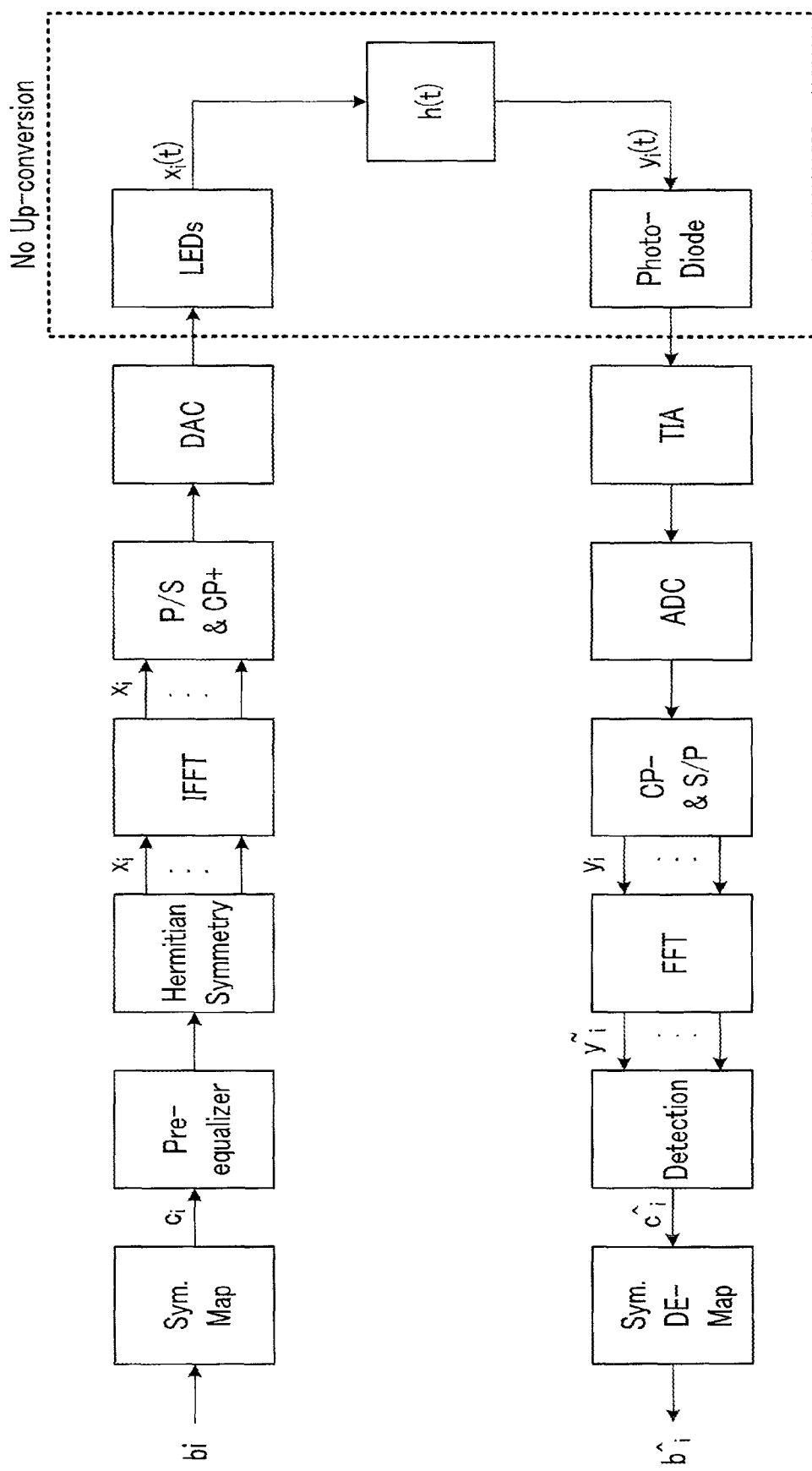
FIG. 38 is a diagram illustrating an example configuration of another communication system that performs visible light communication.

The configuration in FIG. 5 has been described as an example of a communication system that performs visible light communication, but the configuration of a communication system that performs visible light communication is not limited to the configuration illustrated in FIG. 5. For example, the configuration illustrated in FIG. 38 may be adopted (see, for example, "IEEE 802.11-16/1499r1"). In FIG. 38, a transmission signal is not upconverted and is transmitted as a light signal in a baseband. That is, an apparatus that transmits a light signal of the present embodiment (i.e., an apparatus including a light source) may have the configuration on the transmission side illustrated in FIG. 38, and a terminal that receives the light signal of the present embodiment may have the configuration on the reception side illustrated in FIG. 38.

Obviously, a plurality of elements of the embodiments or the like described in this specification may be executed in combination.

Each of the embodiments is merely an example. For example, when "a modulation scheme, an error-correction coding scheme (an error-correction code, code length, code rate, and the like to be used), control information, and the like" are used as an example, "another modulation scheme, another error-correction coding scheme (an error-correction code, code length, coding rate, and the like to be used), other control information, and the like" may also be applied to implement the embodiments with a similar configuration.

Regarding a modulation scheme, a modulation scheme other than the modulation scheme described in this specification may be used to implement the embodiments and the like described in this specification. For example, Amplitude Phase Shift Keying (APSK) (for example, 16APSK, 64APSK, 128APSK, 256APSK, 1024APSK, 4096APSK, or the like), Pulse Amplitude Modulation (PAM) (for example, 4PAM, 8PAM, 16PAM, 64 PAM, 128PAM, 256PAM, 1024PAM, 4096PAM, or the like), Phase Shift Keying (PSK) (for example, BPSK, QPSK, 8PSK, 16PSK, 64PSK, 128PSK, 256PSK, 1024PSK, 4096PSK or the like), Quadrature Amplitude Modulation (QAM) (for example, 4QAM, 8QAM, 16QAM, 64QAM, 128QAM, 256QAM, 1024QAM, 4096QAM, or the like) may be applied, and uniform mapping or non-uniform mapping may be used in each modulation scheme. A method for arranging 2, 4, 8, 16, 64, 128, 256, or 1024 signal points in the I-Q plane (a modulation scheme with 2, 4, 8, 16, 64, 128, 256, or 1024 signal points) is not limited to the signal point arrangement method of the modulation scheme described in this specification.

An apparatus including the radio device described in this specification may be, for example, a communication/broadcast apparatus, such as a broadcast station, a base station, an access point, a terminal, or a mobile phone, or a communication apparatus, such as a television set, a radio, a terminal, a personal computer, a mobile phone, an access point, or a base station. The radio device described in this specification is a device having a communication function, and the device may be configured to be connected to an apparatus that executes an application, such as a television set, a radio, a personal computer, or a mobile phone, via a certain interface.

An apparatus including the receiver described in this specification may be, for example, a communication/broadcast apparatus, such as a broadcast station, a base station, an access point, a terminal, or a mobile phone, or a communication apparatus, such as a television set, a radio, a terminal, a personal computer, a mobile phone, an access point, or a base station.

In wireless communication using a radio wave in the present embodiment, symbols other than data symbols, for example, pilot symbols (a preamble, a unique word, a postamble, a reference symbol, and the like), symbols for control information, and the like may be arranged in a frame in any manner. Here, the terms "pilot symbols" and "symbols for control information" are used, but any other terms may be used. The roles of individual symbols are important.

A pilot symbol may be, for example, a known symbol modulated by using PSK modulation in a transmitter/receiver (or a receiver may be able to recognize a symbol transmitted by a transmitter by achieving synchronization). The receiver performs frequency synchronization, time synchronization, channel estimation (estimation of channel state information (CSI)) (of each modulated signal), signal detection, and the like by using this symbol.

A symbol for control information is a symbol for transmitting information, other than data (such as an application), which needs to be transmitted to a communication partner for realizing communication (for example, a modulation scheme, an error-correction coding scheme, and a coding rate of the error-correction coding scheme used for communication, setting information in an upper layer, and the like).

The present disclosure is not limited to the foregoing embodiments, and various changes can be applied. For example, in each embodiment, a description is given of the case of a communication apparatus, but the embodiment is not limited thereto. This communication method can be implemented by software, hardware, or software that cooperates with hardware.

For example, a program that executes the above-described communication method may be stored in a read only memory (ROM) in advance, and the program may be operated by a central processing unit (CPU).

The program that executes the above-described communication method may be stored in a computer-readable storage medium, and the program stored in the storage medium may be recorded on a random access memory (RAM) of the computer, so that the computer may operate in accordance with the program.

Some or all of the individual functional blocks used in the description of the foregoing embodiments may be implemented as a large scale integration (LSI), which is an integrated circuit, and some or all of the individual processes described in the foregoing embodiments may be controlled by a single LSI or a combination of LSIs. The LSI may be constituted by individual chips, or may be constituted by a single chip including some or all of the functional blocks. The LSI may include an input and an output of data. The LSI may be called an integrated circuit (IC), a system LSI, a super LSI, or an ultra LSI in accordance with the degree of integration. The technique of circuit integration is not limited to the LSI, and the circuit integration may be realized by a dedicated circuit, a general-purpose processor, or a dedicated processor. After the LSI is manufactured, a field programmable gate array (FPGA) that is programmable or a reconfigurable processor capable of reconfiguring the connection and setting of the circuit cell in the LSI may be used. The present disclosure may be implemented as digital processing or analog processing. Furthermore, if a circuit integration technology that replaces the LSI emerges from the progress of the semiconductor technologies or other technologies derived therefrom, integration of the functional blocks may of course be achieved by using the technology. Application of biotechnologies or the like is possible.

(Supplement 1)

A description will be given of a communication method for the transmission device and the receiving device in FIG. 38. The components from a symbol mapper (Sym.Map) to LEDs in an upper part of FIG. 38 constitute the transmission device. The components from a photodiode unit (PhotoDiode) to a symbol demapper (Sym.DE-Map) in a lower part of FIG. 38 constitute the receiving device.

First, a description will be given of the configuration of the transmission device in the upper part of FIG. 38. This transmission device includes a symbol mapper (Sym.Map), a pre-equalizer, an Hermitian symmetry processing unit (Hermitian Symmetry), an inverse (fast) Fourier transform unit (IFFT), a parallel/serial and cyclic prefix addition unit (P/S&CP+), a digital-to-analog converter (DAC), and a light source (LEDs).

The symbol mapper (Sym.Map) receives transmission data (bi) as input and performs mapping based on a modulation scheme, thereby outputting a symbol sequence (ci). The pre-equalizer receives the symbol sequence (ci) as input, performs pre-equalization on the symbol sequence (ci) to reduce an equalization process on the reception side, and outputs the pre-equalized symbol sequence. The Hermitian symmetry processing unit (Hermitian Symmetry) receives the pre-equalized symbol sequence as input, allocates sub-carriers to the pre-equalized symbol sequence so that Hermitian symmetry can be ensured, and outputs parallel signals.

The inverse (fast) Fourier transform unit (IFFT) receives the parallel signals as input, performs inverse (fast) Fourier transform on the parallel signals, and outputs the signals that have undergone inverse (fast) Fourier transform. The parallel/serial and cyclic prefix addition unit (P/S&CP+) receives the signals that have undergone inverse (fast) Fourier transform as input, performs parallel-to-serial conversion, and cyclic prefix addition, and outputs a signal resulting from the signal processing.

The digital-to-analog converter (DAC) receives the processed signal as input, performs digital-to-analog conversion, and outputs an analog signal. The analog signal is output as a light modulated signal from one or more light sources, for example, LEDs.

The transmission device in the upper part of FIG. 38 includes the pre-equalizer and the Hermitian symmetry processing unit, but the transmission device need not necessarily include the pre-equalizer and the Hermitian symmetry processing unit. That is, the transmission device that performs visible light communication does not necessarily perform signal processing in the pre-equalizer and the Hermitian symmetry processing unit.

Next, a description will be given of the receiving device in the lower part of FIG. 38. This receiving device includes a photodiode, a transimpedance amplifier (TIA), an analog-to-digital converter (ADC), a cyclic prefix removal and serial/parallel conversion unit (CP-&S/P), a (fast) Fourier transform unit (FFT), a detection unit (Detection), and a symbol demapper (Sym.DE-Map).

The photodiode receives a light modulated signal as input and performs light-to-current conversion to convert the light signal into a current signal. The transimpedance amplifier (TIA) performs impedance conversion and amplification on the current signal output from the photodiode to obtain a voltage signal. The analog-to-digital converter (ADC) performs analog-to-digital conversion on the voltage signal and outputs a digital signal.

The cyclic prefix removal and serial/parallel conversion unit (CP-&S/P) receives the digital signal as input, performs cyclic prefix removal and then serial-to-parallel conversion, and outputs parallel signals. The (fast) Fourier transform unit (FFT) receives the parallel signals as input, performs (fast) Fourier transform, and outputs a signal that has undergone (fast) Fourier transform.

The detection unit (Detection) receives the Fourier-transformed signal as input, performs detection, and outputs a reception symbol sequence. The symbol demapper (Sym.DE-Map) receives the reception symbol sequence as input, performs demapping, and obtains a reception data sequence.

As described above, with use of the transmission device for transmitting a light modulated signal and the receiving device that receives the light modulated signal, described as an example using FIG. 38, the individual embodiments in this specification can be carried out similarly.

(Supplement 2)

In the present disclosure, a terminal establishes a wireless connection with a base station or an access point of a wireless LAN. The apparatus connected to the terminal is not limited to the base station or the access point of the wireless LAN, and any other apparatus may be connected to the terminal as long as the apparatus is wirelessly connectable. For example, the apparatus may be a base station or a relay station of a mobile phone or the like. In the present disclosure, a description has been given of an example in which information on an SSID is included in a modulated signal, but the SSID is an example and the embodiment is not limited thereto. That is, the identification information included in the modulated signal is not limited to an SSID, and any other information may be included as long as the information enables the terminal to identify a safe base station to be connected.

The whole or part of software that is necessary to implement the communication method described in the present disclosure may be downloaded by at least one of a field programmable gate array (FPGA) and a central processing unit (CPU) through wireless communication or wired communication. Furthermore, the whole or part of update software may be downloaded through wireless communication or wired communication. The downloaded software may be stored in a storage unit, and at least one of the FPGA and the CPU may be operated based on the stored software, thereby executing digital signal processing described in the present disclosure.

At this time, an apparatus including at least one of the FPGA and the CPU may establish a wireless or wired connection with a communication modem, and the apparatus and the communication modem may implement the communication method described in the present disclosure. For example, a communication apparatus such as a base station, an AP, or a terminal described in this specification may include at least one of the FPGA and the CPU, and may include an interface for obtaining, from the outside, software for operating at least one of the FPGA and the CPU. Furthermore, the communication apparatus may include a storage unit for storing software obtained from the outside, and may operate the FPGA or the CPU based on the stored software, thereby implementing the signal processing described in the present disclosure.

A server may provide an application for processing related to the receiving device, and a terminal may install the application, thereby implementing the functions of the receiving device described in this specification. The application related to a reception process may be provided to the terminal by connecting the server to the communication apparatus including the transmission device described in this specification via a network. Alternatively, the application related to a reception process may be provided to the terminal by connecting the server to a communication apparatus having another transmission function via a network.

Also, a server may provide an application for processing related to the transmission device, and a communication apparatus may install the application, thereby implementing the functions of the transmission device described in this specification. The application related to a transmission process may be provided to the communication apparatus by connecting the server to another communication apparatus via a network, but another method may also be used.

Software related to a light source included in the transmission device, and software related to a light receiver included in the receiving device may be provided by the server. When each of the transmission device and the receiving device obtains necessary software, the light source included in the transmission device is able to transmit a light modulated signal, and the light receiver included in the receiving device is able to receive the light modulated signal.

Furthermore, the transmission device in this specification may have a function of the server. In this case, an application included in the transmission device can be provided to another communication apparatus by using certain communication means. The communication apparatus may be able to serve as the receiving device in this specification by using an application that has been obtained by downloading it directly or indirectly from the transmission device.

The "lighting unit" and the "light source" in the present disclosure may be a device that emits light, such as a display or projector for displaying an image, a video, an advertisement, or the like, and the emitted light may include a light modulated signal. That is, the "lighting unit" and the "light source" in the present disclosure may have a configuration for outputting sound, an image, a video, or a signal other than light, as well as light. In addition, the "lighting unit" and the "light source" may be constituted by a plurality of "lighting units" or "light sources".

Furthermore, the transmission method used by the communication apparatus that generates and emits a light modulated signal may be a method other than the transmission method described in this specification. The light modulated signal may include information other than the information described in this specification.

The lighting device or light source, such as an LED, may have the functions of the transmission device described in this specification. Alternatively, a device that generates a light modulated signal to be transmitted may not include a lighting device or light source, and may be connected to the lighting device or light source via a certain interface.

The communication method for the transmission device and the receiving device described in this specification is not limited to the above-described example, and a wireless communication scheme using any frequencies, such as frequencies of light, visible light, infrared light, or ultraviolet light, may be similarly executed. In the description given above, an image sensor receives a light modulated signal, but a photodiode may be used instead of the image sensor to receive a light modulated signal. Alternatively, a device other than an image sensor and a photodiode may be used to receive a light modulated signal.

In this specification, the term "symbol" is used, for example, "location-or-position-information-related symbol", "time-information-related symbol", "SSID-related symbol", "access-destination-related symbol", and "encryption-key-related symbol". However, these symbols need not necessarily be called symbols, but may be called "data", "information", "field", "bit", or "region" to carry out the individual embodiments similarly. A term other than "symbol", "data", "information", "field", "bit", and "region" may be used. The transmission device may transmit "location-or-position-information-related symbol", "time-information-related symbol", "SSID-related symbol", "access-destination-related symbol", and "encryption-key-related symbol" by using any symbol configuration. That is, any configuration may be used for transmission as long as "location-or-position-information-related symbol", "time-information-related symbol", "SSID-related symbol", "access-destination-related symbol", and "encryption-key-related symbol" can be transmitted to a communication partner.

Again, in this specification, in the transmission device including a "light source", a "lighting unit", or the like, the "light source" and the "lighting unit" may be constituted by a plurality of "light sources" and a plurality of "lighting units", respectively.

In this specification, a description has been given of an encryption key by which a terminal establishes a wireless connection with a base station, but the encryption key is not limited to a "encryption key for wireless connection". For example, it is assumed that the base station is connected to a network, and the terminal communicates with the network via the base station. At this time, the encryption key may be a "encryption key by which the terminal establishes a connection with the network". Thus, the light modulated signal described in this specification includes information on the "encryption key". Accordingly, the embodiments described in this specification can be executed similarly, and thus the effects described in the embodiments can be similarly obtained.

The light modulated signal may include at least one of a "encryption key for establishing a connection with a base station (for example, an encryption key for an SSID)" and a "encryption key for establishing a connection with a network".

A terminal of the present disclosure includes: a light receiver that receives a light signal emitted by a transmitter, the light signal including an identifier of at least one base station; a data analyzing circuit that selects one base station based on the identifier of the at least one base station that is included in the received light signal; and a radio device that establishes a wireless connection with the selected base station by using the identifier of the base station and wirelessly communicates with the base station.

In the terminal of the present disclosure, the base station is associated with a class among classes of services, as a rank of the class increases, a maximum transmission speed of a wireless communication scheme supported by the base station associated with the class increases, the light receiver receives, from the transmitter existing in an area of a first class, the light signal including the identifier of a first base station associated with the first class, the radio device establishes a wireless connection with the first base station by using the identifier included in the light signal, and first wireless communication schemes supported by the first base station includes a second wireless communication scheme supported by a second base station associated with a second class, the second class being lower than the first class.

In the terminal of the present disclosure, the base station is associated with a class among classes of services, as a rank of the class increases, a maximum transmission speed of a wireless communication scheme supported by the base station associated with the class increases, the light receiver receives, from the transmitter existing in an area of a first class, the light signal including a first identifier of a first base station associated with the first class and a second identifier of a second base station associated with a second class, the second class being lower than the first class, and the radio device establishes a wireless connection with the base station by using one of the first identifier and the second identifier included in the light signal.

The terminal of the present disclosure further includes a display circuit that displays the first identifier and the second identifier that are included in the light signal.

The terminal of the present disclosure further includes a display circuit that displays wireless communication schemes supported by the first base station and the second base station, respectively having the first identifier and the second identifier that are included in the light signal.

In the terminal of the present disclosure, the base station is associated with a class among classes of services, and as a rank of the class associated with the base station that is wirelessly connected to the terminal increases, a range of a network accessible to the terminal becomes larger.

In the terminal of the present disclosure, the transmitter and the base station are installed in an aircraft, the terminal that is wirelessly connected to a first base station associated with a first class is capable of accessing a network within the aircraft and a network outside the aircraft, and the terminal that is wirelessly connected to a second base station associated with a second class lower than the first class is capable of accessing the network within the aircraft and is incapable of accessing the outside network.

A communication method of the present disclosure includes: receiving a light signal emitted by a transmitter, the light signal including an identifier of at least one base station; selecting one base station based on the identifier of the at least one base station that is included in the received light signal; and establishing a wireless connection with the selected base station by using the identifier of the base station and wirelessly communicating with the base station.

INDUSTRIAL APPLICABILITY

An aspect of the present disclosure is useful to a visible light communication system.

REFERENCE SIGNS LIST 100, 400, 1000, 1400A, 1400B apparatus
102, 1404-1, 1404-2 transmitter
104, 1406-1, 1406-2 light source
150, 450, 1050 terminal
151 light receiver
153 receiver
155 data analyzer
157 display
453, 2002 radio device
470, 2000 base station
2001 transmission device

The invention claimed is:

1. A terminal apparatus comprising:
a light receiver which, in operation, receives, from at least one light source, a visible light signal having a pattern of light emissions, the pattern being used to transmit location information of the at least one light source and a plurality of Service Set Identifiers (SSIDs) of a plurality of base stations available to the terminal apparatus;
a data analyzing circuit which, in operation, estimates location of the terminal apparatus based on the location information of the at least one light source and, in operation, selects a SSID among the plurality of SSIDs; and
a radio device which, in operation, establishes a wireless connection with a base station by using the selected SSID.

2. The terminal apparatus according to claim 1, wherein the selected SSID is associated with a class among classes of services, and as a rank of the class increases, a maximum transmission speed of a wireless communication scheme supported by the selected SSID associated with the class increases; and
in a case where the light receiver receives, from a transmitter existing in an area of a first class, the visible light signal including a first SSID of a first base station associated with the first class and a second SSID of a second base station associated with a second class, the radio device establishes the wireless connection with the base station by using one of the first SSID or the second SSID included in the visible light signal, the second class being lower than the first class.

3. The terminal apparatus according to claim 2, wherein in a case where the light receiver receives, from a transmitter existing in the area of the first class, the visible light signal including the first SSID of the first base station associated with the first class, the radio device establishes the wireless connection with the base station by using the first SSID, and first wireless communication schemes supported by the first base station includes a second wireless communication scheme supported by the second base station.

4. The terminal apparatus according to claim 2, further comprising:
a display which, in operation, displays the first SSID and the second SSID that are included in the visible light signal.

5. The terminal apparatus according to claim 2, further comprising:
a display which, in operation, displays wireless communication schemes supported by the first base station and the second base station.

6. The terminal apparatus according to claim 2, wherein as the rank of the class associated with the base station that is wirelessly connected to the terminal apparatus increases, a range of a network accessible to the terminal apparatus becomes larger.

7. A communication method for a terminal apparatus, the communication method comprising:
receiving, from at least one light source, a visible light signal having a pattern of light emissions, the pattern being used to transmit location information of the at least one light source and a plurality of Service Set Identifiers (SSIDs) of a plurality of base stations available to the terminal apparatus;
estimating location of the terminal apparatus based on the location information of the at least one light source;
selecting a SSID among the plurality of SSIDs; and
establishing a wireless connection with a base station by using the selected SSID.

8. The communication method according to claim 7, wherein
the base station is associated with a class among classes of services, and as a rank of the class increases, a maximum transmission speed of a wireless communication scheme supported by the base station associated with the class increases; and
in a case of receiving, from a transmitter existing in an area of a first class, the visible light signal including a first SSID of a first base station associated with the first class and a second SSID of a second base station associated with a second class, the establishing the wireless connection comprising establishing the wireless connection with the base station by using one of the first SSID or the second SSID included in the visible light signal, the second class being lower than the first class.

9. The communication method according to claim 8, wherein
in a case of receiving, from a transmitter existing in the area of the first class, the visible light signal including the first SSID of the first base station associated with the first class, the establishing a wireless connection comprises establishing the wireless connection with the first base station by using the first SSID, and first wireless communication schemes supported by the first base station includes a second wireless communication scheme supported by the second base station.

10. The communication method according to claim 8, further comprising:
displaying the first SSID and the second SSID that are included in the visible light signal.

11. The communication method according to claim 8, further comprising:
displaying wireless communication schemes supported by the first base station and the second base station.

12. The communication method according to claim 8, wherein
as the rank of the class associated with the base station that is wirelessly connected to the terminal apparatus increases, a range of a network accessible to the terminal apparatus becomes larger.

\* \* \* \* \*